(12) United States Patent
Trebi-Ollennu et al.

(10) Patent No.: US 11,382,446 B2
(45) Date of Patent: Jul. 12, 2022

(54) SIMULATED GHANA CHRISTMAS HUT

(71) Applicants: Flora Amerley Trebi-Ollennu, Alberta (CA); John Kwaku Deheer Adjaye, Alberta (CA)

(72) Inventors: Flora Amerley Trebi-Ollennu, Alberta (CA); John Kwaku Deheer Adjaye, Alberta (CA)

( * ) Notice: Subject to any disclaimer, the term of this patent is extended or adjusted under 35 U.S.C. 154(b) by 0 days.

(21) Appl. No.: 17/215,919

(22) Filed: Mar. 29, 2021

(65) Prior Publication Data

US 2021/0298510 A1 Sep. 30, 2021

Related U.S. Application Data

(60) Provisional application No. 63/000,623, filed on Mar. 27, 2020.

(51) Int. Cl.
*A47G 33/00* (2006.01)
*B62B 5/04* (2006.01)
*G09F 1/06* (2006.01)
*G09F 13/00* (2006.01)

(52) U.S. Cl.
CPC .......... *A47G 33/00* (2013.01); *B62B 5/0457* (2013.01); *G09F 1/065* (2013.01); *G09F 13/00* (2013.01)

(58) Field of Classification Search
None
See application file for complete search history.

(56) References Cited

U.S. PATENT DOCUMENTS

| | | | | |
|---|---|---|---|---|
| 2,821,621 A | * | 1/1958 | Allunario | A47G 33/02 428/3 |
| 2,890,498 A | * | 6/1959 | Bigelow | E04H 15/008 52/63 |
| 3,333,373 A | * | 8/1967 | Taylor | E04H 15/008 52/63 |
| 3,594,936 A | * | 7/1971 | Blum | G09F 5/00 40/124.19 |
| 4,145,099 A | * | 3/1979 | Mitchell | E04H 3/28 108/166 |

(Continued)

OTHER PUBLICATIONS

"Where are the Christmas huts, courtesies?"; Hadiza Nuhhu-Billa Quansah; Dec. 24, 2015; Graphic Online (graphic.com.gh) (Year: 2015).*

(Continued)

*Primary Examiner* — David R Dunn
*Assistant Examiner* — Christopher E Veraa

(57) ABSTRACT

Disclosed herein is a simulated Ghana Christmas hut, in accordance with some embodiments. Accordingly, the simulated Ghana Christmas hut comprises a base structure and huts. Further, the base structure is configured to be disposed on a surface. Further, the huts are supported on the base structure. Further, the huts are stacked on the base structure in a vertical direction based on a hut size of the huts. Further, each hut comprises a side wall and a roof corresponding to the hut size of each hut. Further, the roof is attached to the side wall along a top edge of the side wall for forming a hut interior space. Further, the side wall of each hut comprises an opening leading into the hut interior space of each hut. Further, the side wall and the roof of each hut are comprised of coconut fronds.

20 Claims, 117 Drawing Sheets

(56) References Cited

U.S. PATENT DOCUMENTS

| | | | | |
|---|---|---|---|---|
| 4,631,877 A | * | 12/1986 | Molodecki | E04H 1/1205 280/30 |
| 4,866,863 A | * | 9/1989 | Scarcello | A63H 3/52 428/3 |
| 5,085,900 A | * | 2/1992 | Hamlett | A41G 1/00 156/61 |
| 6,688,239 B1 | * | 2/2004 | Pettini | A47B 7/02 108/92 |
| 7,971,721 B1 | * | 7/2011 | McMillan | A47G 33/04 229/116.4 |
| 2003/0106472 A1 | * | 6/2003 | Lonneman | A47B 87/0223 211/186 |
| 2007/0115281 A1 | * | 5/2007 | Litzau | G09F 1/06 345/419 |
| 2010/0180530 A1 | | 7/2010 | Lee | |
| 2010/0255749 A1 | * | 10/2010 | Lines | A63H 33/42 446/72 |
| 2011/0300312 A1 | * | 12/2011 | Hickey | A63J 1/00 428/3 |
| 2013/0074369 A1 | | 3/2013 | Thomson | |
| 2018/0361906 A1 | * | 12/2018 | Devine | H02S 10/40 |
| 2020/0131756 A1 | * | 4/2020 | Devine | E03C 1/1227 |
| 2020/0391132 A1 | * | 12/2020 | McInerney | E04B 1/34336 |
| 2021/0169259 A1 | * | 6/2021 | Michalski | G09F 1/08 |

OTHER PUBLICATIONS

EIC 3600 Search Report; Electronic Information Center 3600; Scientific and Technical Information Center (Year: 2022).*

Flora Trebi-Ollennu, Christmas Hut, the Heart of Ghanaian Christmas in the Past Makes a Comeback with a Modern Twist, 24ghana. com.

Tammy Jo Anderson-Taft, Weaving, guampedia.com, Dec. 18, 2019.

* cited by examiner

503

213

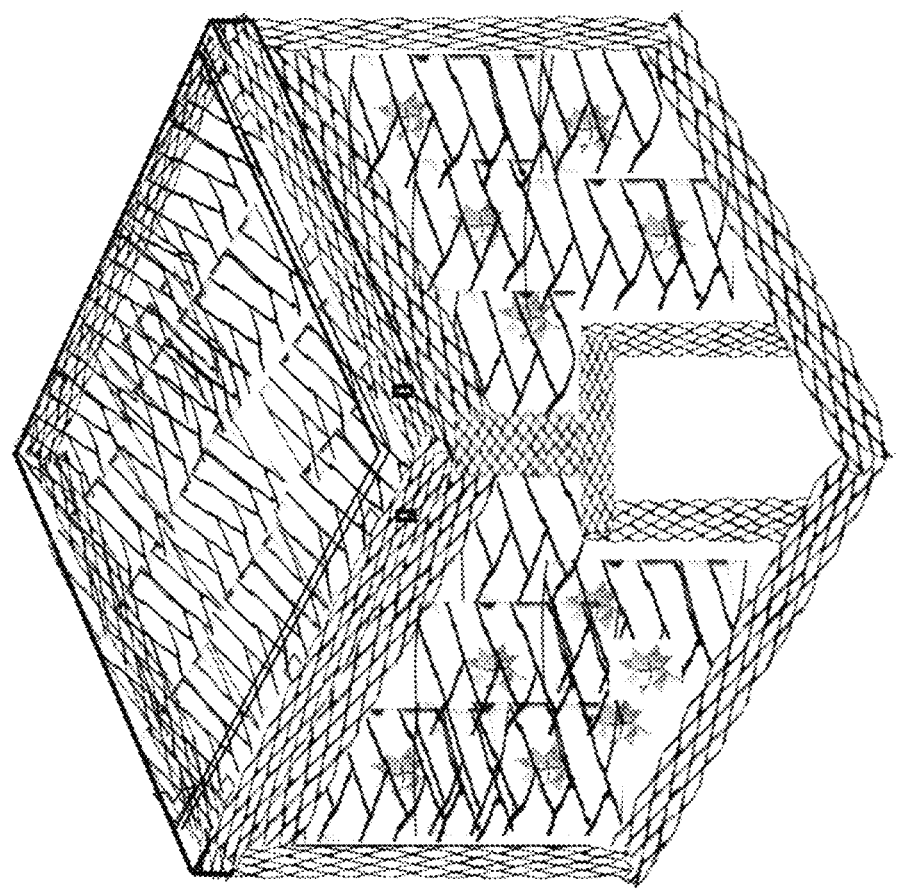
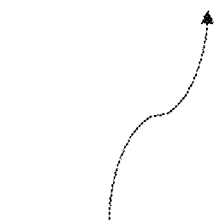
FIG. 110

SIMULATED GHANA CHRISTMAS HUT

FIELD OF THE INVENTION

Generally, the present disclosure relates to the field of miscellaneous articles. More specifically, the present disclosure relates to a simulated Ghana Christmas hut.

BACKGROUND OF THE INVENTION

The Christmas Hut has traditionally been used in Ghana to celebrate Christmas for centuries. The custom was developed in the early days of Christianity in Ghana. The hut, a single pen, is constructed by driving sturdy sticks into the ground to build a rectangular frame that is covered on all sides and the roof with woven mats of coconut fronds. The hut is usually built by youth and young adults outside in open areas around their homes. It can be decorated with lights. Children spend most of their Christmas season in the huts drumming and singing, eating, and entertaining friends. Christians use it as a symbol of heaven-come-down-to-earth where the manger and scenes of the nativity can be displayed and celebrated.

An outdoor Christmas Hut is made of fresh naturally woven coconut fronds. Such materials promote deforestation and increase our ecological footprint. Further, besides increasing ecological footprint it takes long hours to construct the Christmas hut from freshly cut coconut fronds which have to be transported from forest areas and far-away beaches. Besides the weather quickly dries out the freshly woven coconut fronds, distorting beautiful patterns, and the whole configuration becomes unsightly and unsynchronized with the spirit of Christmas and its surrounding ambiance.

Therefore, there is a need for a simulated Ghana Christmas hut that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a simulated Ghana Christmas hut, in accordance with some embodiments. Accordingly, the simulated Ghana Christmas hut may include a base structure and a plurality of huts. Further, the simulated Ghana Christmas hut may be made of a combination of several simulated weaving patterns of coconut fronds/palm branches. Further, the base structure may be configured to be disposed on at least one surface. Further, the base structure may include a bed panel parallel to the at least one surface. Further, the plurality of huts may be supported on the base structure. Further, the plurality of huts may include a bottom hut, a middle hut, and a top hut. Further, the plurality of huts may be stackable on the base structure in a vertical direction based on a hut size of the plurality of huts. Further, the plurality of huts may be configured to be transitioned between a folded state and an erected state. Further, the hut size decrease along the vertical direction from the bottom hut to the top hut. Further, each hut of the plurality of huts may include at least one side wall and a roof corresponding to the hut size of each hut. Further, the roof may be attached to the at least one side wall along at least one top edge of the at least one side wall for forming a hut interior space. Further, the at least one side wall of each hut may include at least one opening leading into the hut interior space of each hut. Further, the at least one side wall and the roof of each hut may be comprised of coconut fronds. Further, the at least one side wall and the roof of each hut may be comprised of a combination of weaving patterns of the coconut fronds. Further, the bottom hut may be disposed on the bed panel. Further, the middle hut may be disposed on a bottom roof of the bottom hut. Further, the top hut may be disposed on a middle roof of the middle hut.

Further disclosed herein is a simulated Ghana Christmas hut, in accordance with some embodiments. Accordingly, the simulated Ghana Christmas hut may include a base structure, a plurality of huts, and a plurality of skirts. Further, the simulated Ghana Christmas hut may be made of multiple combinations of simulated weaving patterns of coconut fronds/palms branches. Further, the base structure may be configured to be disposed on at least one surface. Further, the base structure may include a bed panel parallel to the at least one surface. Further, the plurality of huts may be supported on the base structure. Further, the plurality of huts may include a bottom hut, a middle hut, and a top hut. Further, the plurality of huts may be stackable on the base structure in a vertical direction based on a hut size of the plurality of huts. Further, the plurality of huts may be configured to be transitioned between a folded state and an erected state. Further, the hut size decrease along the vertical direction from the bottom hut to the top hut. Further, each hut of the plurality of huts may include at least one side wall and a roof corresponding to the hut size of each hut. Further, the roof may be attached to the at least one side wall along at least one top edge of the at least one side wall for forming a hut interior space. Further, the at least one side wall of each hut may include at least one opening leading into the hut interior space of each hut. Further, the at least one side wall and the roof of each hut may be comprised of coconut fronds. Further, the at least one side wall and the roof of each hut may be comprised of a combination of weaving patterns of the coconut fronds Further, the bottom hut may be disposed on the bed panel. Further, the middle hut may be disposed on a bottom roof of the bottom hut. Further, the top hut may be disposed on a middle roof of the middle hut. Further, the plurality of skirts attached to the plurality of huts. Further, a skirt of the plurality of skirts may include an elongated panel. Further, a first end of the elongated panel may be fastened to a second end of the elongated panel for forming the skirt using at least one fastener. Further, the elongated panel may include a fixed periphery and a free periphery. Further, the fixed periphery may be configured to be attached to the at least one side wall of a hut of the plurality of huts along at least one base edge of the at least one side wall. Further, the free periphery extends away from the at least one side wall.

Further disclosed herein is a simulated Ghana Christmas hut kit, in accordance with some embodiments. Accordingly, the simulated Ghana Christmas hut kit may include a simulated Ghana Christmas hut, a plurality of figurines, and a plurality of decorating objects. Further, the simulated Ghana Christmas hut may include a base structure, a plurality of huts, and a plurality of skirts. Further, the simulated Ghana Christmas hut may be made of a combination of simulated weaving patterns of coconut fronds/palm branches. Further, the base structure may be configured to be disposed on at least one surface. Further, the base structure may include a bed panel parallel to the at least one surface. Further, the plurality of huts may be supported on the base structure. Further, the plurality of huts may include a bottom hut, a middle hut, and a top hut. Further, the plurality of huts may be stackable on the base structure in a vertical direction based on a hut size of the plurality of huts. Further, the plurality of huts may be configured to be transitioned between a folded state and an erected state. Further, the hut size decrease along the vertical direction from the bottom hut to the top hut. Further, each hut of the plurality of huts may include at least one side wall and a roof corresponding to the hut size of each hut. Further, the roof may be attached to the at least one side wall along at least one top edge of the at least one side wall for forming a hut interior space. Further, the at least one side wall of each hut may include at least one opening leading into the hut interior space of each hut. Further, the at least one side wall and the roof of each hut may be comprised of coconut fronds. Further, the bottom hut may be disposed on the bed panel. Further, the middle hut may be disposed on a bottom roof of the bottom hut. Further, the top hut may be disposed on a middle roof of the middle hut. Further, the plurality of skirts attached to the plurality of huts. Further, a skirt of the plurality of skirts may include an elongated panel. Further, a first end of the elongated panel may be fastened to a second end of the elongated panel for forming the skirt using at least one fastener. Further, the elongated panel may include a fixed periphery and a free periphery. Further, the fixed periphery may be configured to be attached to the at least one side wall of a hut of the plurality of huts along at least one base edge of the at least one side wall. Further, the free periphery extends away from the at least one side wall. Further, the plurality of figurines may be disposable on at least one of a first ledge formed on the bed panel based on disposing of the bottom hut on the bed panel, a second ledge formed on the bottom roof based on disposing of the middle hut on the bottom roof, and a third ledge formed on the middle roof based on disposing of the top hut on the middle roof. Further, the plurality of figurines may include a plurality of flaming Harmattan Christmas angels and a Hechebi Christmas figurine. Further, the plurality of flaming Harmattan Christmas angels may be Africanized figurines accessorized with wings of flame and shrouded in Harmattan clouds. Further, the plurality of decorating objects may be configured to be attached to at least one of the plurality of huts and the base structure for decorating the simulated Ghana Christmas hut. Further, the plurality of decorating objects may include a plurality of miniature LED light Osonor Christmas lamps, a plurality of miniature African drums, a Lantikila Christmas garland, a simulated wild Maracuja LED light string Christmas wreath, and a simulated lit-able Christmas palm fruit bunch ornament.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 110 is a front perspective view of an assembled second floor hut of the simulated Ghana Christmas Hut, in accordance with some embodiments.

DETAIL DESCRIPTIONS OF THE INVENTION

Figure 1:
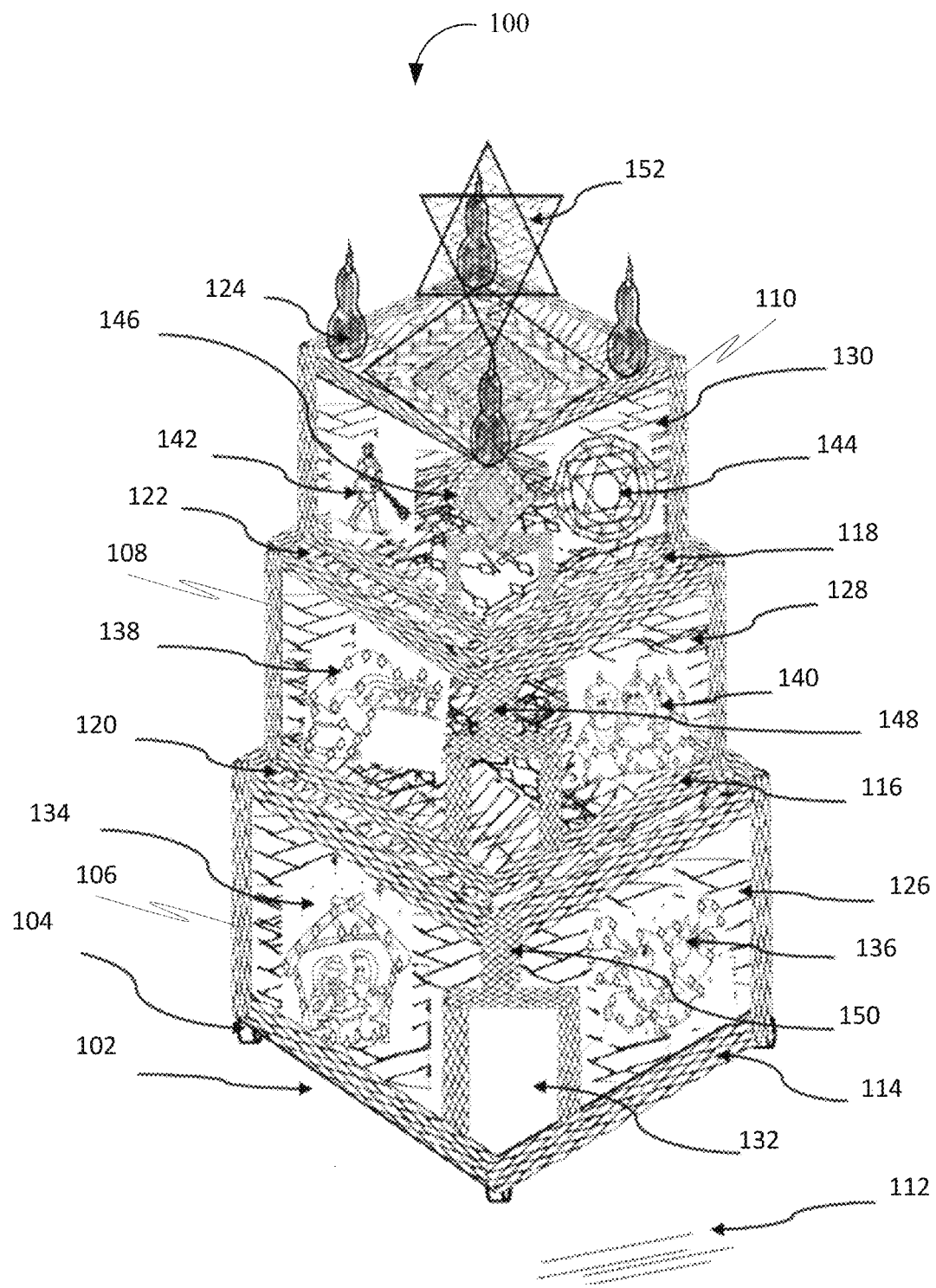
FIG. 1 is a front perspective view of a simulated Ghana Christmas hut, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a simulated Ghana Christmas hut, embodiments of the present disclosure are not limited to use only in this context.

Overview:

The present disclosure describes a simulated Ghana Christmas hut. Further, the simulated Ghana Christmas hut is a diamond-shaped three-story hut comprising of three varying huts made of a combination of simulated weaving patterns of coconut fronds and/or palm branches with matching roofs on a mobile base structure to address deforestation, promote aesthetics and provide a creative way of telling the full Christmas story.

The creative use of incorporating various simulated weaving patterns to create walls which are interwoven with various scenes and shapes from the Bible: stars, angels, crowns or the nativity, provides a good creative alternative to traditional figurines which take more space in homes.

Further, the simulated Ghana Christmas hut is an inexpensively constructed, relatively light in weight, but at the same time rugged and durable Ghana Christmas hut that may be reused year after year for both indoor and outdoor so as to reduce our ecological footprint and popularize this African tradition where the center of Christianity has shifted in recent centuries. This invention lends itself to display in store windows, counters, and tables and provides an efficient addition or creative alternative to the Christmas tree. There is copious space inside the hut for Christmas presents as well.

Further, the simulated Ghana Christmas hut is a decorative device with a realistic appearance, symmetrical and pleasing form where the entire assembly is readily dismantled and may be collapsed, folded and stored away or shipped in a relatively small space or package. Where it is desired to employ one or more Christmas huts for the purpose of outdoor decoration, a simulated Christmas hut may be more easily handled, is less time consuming, and provides uniformity, aesthetics, and symmetry unlike a building with natural coconut branches and/or palm branches from scratch. Moreover, space is at a premium in most modern urban communities and houses, and a simulated Christmas Hut may be the only way to create an Afrocentric Christmas atmosphere in any available space as its diamond shape lends to fitting it in any corner in a house or public building.

Further, the simulated Ghana Christmas hut is a decorative device that can be readily varied over a relatively wide range by merely adjusting the height and sizes of the three huts using various materials to create the look of freshly woven coconut fronds/palm branches walls of different patterns.

Further, the simulated Ghana Christmas Hut is a simulated Ghana Christmas hut that is made of various combinations of weaving patterns from simulated woven coconut fronds/palm branches. The Ghana Christmas hut may be used as an outdoor scene display device in public spaces and residential front yards or indoor spaces of the same.

Further, the simulated Ghana Christmas is a simulated Ghana Christmas Hut made of components that can be reassembled to form a diamond-shaped three-story scene displaying device. Further, the simulated Ghana Christmas Hut may include a diamond-shaped three-story hut comprising of three varying collapsible and foldable box sizes of simulated freshly woven coconut fronds of various patterns with matching roofs and skirting on a mobile base structure decorated with lamps, ladders, Lantikila Christmas garland, flaming Harmattan Christmas angels and Hechebi Christmas, lit-able simulated Christmas palm fruit bunch ornaments, and which may be additionally decorated with innumerable types of ornaments of all shapes and sizes. The three stackable huts represent the three heavens and the diamond shape a symbol of the New Jerusalem which are all found in the Bible. Further, the nativity scene is displayed in the bottom hut, where anyone who wants to meet God must first come through. There is no access from outside. The huts are flushed at the two adjoining sides at the rear and flaming Harmattan Angels guard the front narrow porches on both the front left and right sides of the middle and top huts. There is a Jacob ladder that connects the huts from the inside through a hatch hole. The present invention provides a good creative alternative to learning about the history of Christmas through an African lens.

Further, the simulated Ghana Christmas Hut is an inexpensively constructed, relatively light in weight, but at the same time rugged and durable Christmas hut that may be reused year after year for both indoor and outdoor use so as to reduce our ecological footprint and popularize this African tradition where the center of Christianity has shifted in recent centuries. Further, the simulated Ghana Christmas Hut is used as a display in store windows, on counters, tables, and the like, and provides an efficient addition or creative alternative to the Christmas tree. There is copious space inside the hut for Christmas presents as well.

Further, the simulated Ghana Christmas Hut is a decorative device with a realistic appearance, a symmetrical and pleasing form. Further, the entire assembly of the simulated Ghana Christmas Hut is readily collapsible and may be folded and stored away or shipped in a relatively small space or package. Where it is desired to employ one or more Christmas huts for the purpose of outdoor decoration, the simulated Christmas hut may be more easily handled, is less time consuming, and provides uniformity, aesthetics, and symmetry unlike building with natural coconut branches from scratch. Moreover, space is at a premium in most modern urban communities and houses, and a simulated Christmas Hut may be the only way to create an Afrocentric Christmas atmosphere in any available space as its diamond shape lends to fitting it in any 90-degree corner in a house.

Further, the simulated Ghana Christmas Hut is a decorative device that can readily be varied over a relatively wide range by merely adjusting the height and sizes of the three huts using various materials to create the look of freshly woven coconut panels of different patterns.

Further, the present disclosure describes a simulated indoor and outdoor Ghana Christmas hut that offers excellent solutions to deforestation and also provides an effect of beautification, and that is easy to install and dismantle.

Further, the present disclosure relates generally to a Christmas display. More specifically, the present disclosure describes a simulated Ghana Christmas Hut kit.

Further, the present disclosure describes a simulated Ghana Christmas hut comprising of three huts of varying sizes that decrease from bottom to top hut. Further, the simulated Ghana Christmas hut may include walls made up of woven coconut fronds from appropriate material. Further, the simulated Ghana Christmas hut may include a movable base and collapsible walls. Further, the simulated Ghana Christmas hut may include three flaming Harmattan Angels on ledges on shorter sides of the middle and top huts. Further, the simulated Ghana Christmas hut may include decorative edges and simulated coconut spines extending through the lattice for supporting or hanging Christmas ornaments. Further, the simulated Ghana Christmas hut may include an internal ladder that allows access to the middle and top huts.

Further, the huts of the simulated Ghana Christmas hut may be unfolded to hang as wall hangings in hallways as wall arts, because of the aesthetics appeal of the woven patterns in the walls of the huts.

FIG. 1 is a front perspective view of a simulated Ghana Christmas hut 100, in accordance with some embodiments. Further, the simulated Ghana Christmas hut 100 may include a base structure 102 and a plurality of huts 106-110.

Further, the base structure 102 may be configured to be disposed on at least one surface 112. Further, the base structure 102 may include a bed panel 104 parallel to the at least one surface 112.

Further, the plurality of huts 106-110 may be supported on the base structure 102. Further, the plurality of huts 106-110 may include a bottom hut 106, a middle hut 108, and a top hut 110. Further, the plurality of huts 106-110 may be stackable on the base structure 102 in a vertical direction based on a hut size of the plurality of huts 106-110. Further, the plurality of huts 106-110 may be configured to be transitioned between a folded state and an erected state. Further, the hut size decrease along the vertical direction from the bottom hut 106 to the top hut 110. Further, each hut of the plurality of huts 106-110 may include at least one side wall and a roof corresponding to the hut size of each hut. Further, the roof may be attached to the at least one side wall along at least one top edge of the at least one side wall for forming a hut interior space. Further, the at least one side wall of each hut may include at least one opening leading into the hut interior space of each hut. Further, the at least one side wall and the roof of each hut may be comprised of coconut fronds. Further, the bottom hut 106 may be disposed on the bed panel 104. Further, the middle hut 108 may be disposed on a bottom roof 120 of the bottom hut 106. Further, the top hut 110 may be disposed on a middle roof 122 of the middle hut 108. Further, the at least one side wall and the roof of the bottom hut 106 may include at least one bottom side wall 126 and the bottom roof 120 associated with the bottom hut 106. Further, the at least one side wall and the roof of the middle hut 108 may include at least one middle side wall 128 and the middle roof 122 associated with the middle hut 108. Further, the at least one side wall and the roof of the top hut 110 may include at least one top side wall 130 and a top roof 124 associated with the top hut 110. Further, the at least one opening may be associated with the bottom may include a bottom doorway 132. Further, the at least one side wall of each hut may include interwoven patterns (simulated weaving patterns) associated with at least one a scene and a shape associated with Christianity. Further, the simulated weaving patterns of the shape of faith may be incorporated into at least one wall surface of the at least one side wall. Further, the at least one bottom side wall 126 may incorporate first simulated weaving patterns of the shape of faith associated with at least one nativity scene 134-136. Further, the at least one middle side wall 128 may incorporate second simulated weaving patterns of the shape of faith may be associated with at least one church scene 138-140. Further, the at least one top side wall 130 may incorporate third simulated weaving patterns of the shape of faith may be associated with at least one New Jerusalem scene 142-144. Further, each hut may include a woven fascia. Further, the woven fascia may be attached to the roof of each hut. Further, the woven fascia may include a diamond shaped fascia 146 attached to the top roof 124. Further, the woven fascia may include a first rectangular shaped fascia 148 attached to the middle roof 122. Further, the woven fascia may include a second rectangular shaped fascia 150 attached to the bottom roof 120. Further, the plurality of huts 106-110 may include a star 152. Further, the star 152 may be disposed on the top roof 124.

Further, in some embodiments, a side wall of the at least one side wall of a hut of the plurality of huts 106-110 may include a first side wall portion and a second side wall portion. Further, the first side wall portion may be pivotally attached to the second side wall portion for pivoting in relation to the second side wall along a side wall axis. Further, the hut may be configured for collapsing based on the pivoting of the first side wall portion in relation to the second side wall portion. Further, the plurality of huts 106-110 transitioned from the erected state to the folded state based on the collapsing.

Further, in some embodiments, the base structure 102 may include a plurality of wheels. Further, a wheel of the plurality of wheels may be configured to be rotated around a wheel axis for propelling the simulated Ghana Christmas hut 100 on the at least one surface 112. Further, in an embodiment, the base structure 102 may include at least one brake operationally coupled with the plurality of wheels. Further, the at least one brake may be configured to be transitioned between an engaged state and a disengaged state. Further, the at least one brake allows at least one movement of the simulated Ghana Christmas hut 100 on the at least one surface 112 in the disengaged state. Further, the at least one brake prevents the at least one movement of the simulated Ghana Christmas hut 100 in the engaged state. Further, in an embodiment, the wheel may be configured to retractably extended from the base structure 102 for transitioning between a retracted state and an extended state. Further, the wheel does not engage with the at least one surface 112 in the retracted state. Further, the wheel engages with the at least one surface 112 in the extended state. Further, the propelling of the simulated Ghana Christmas hut 100 on the at least one surface 112 may be restricted in the disengaged state and the propelling of the simulated Ghana Christmas hut 100 on the at least one surface 112 may be allowed in the engaged state.

Further, in some embodiments, the bottom roof 120 may include a bottom roof opening and the middle roof 122 may include a middle roof opening. Further, the bottom roof opening of the bottom roof 120 provides access to a middle hut interior space of the middle hut 108 from a bottom hut interior space of the bottom hut 106. Further, the middle roof opening of the middle roof 122 provided access to a top hut interior space of the top hut 110 from the middle hut interior space of the middle hut 108. In further embodiments, at least one ladder may be disposed in the plurality of huts 106-110. Further, the at least one ladder allows access to the middle hut interior space of the middle hut 108 from the bottom hut interior space of the bottom hut 106 through the bottom roof opening of the bottom roof 120. Further, the at least one ladder allows access to the top hut interior space of the top hut 110 from the middle hut interior space of the middle hut 108 through the middle roof opening of the middle roof 122.

Further, in some embodiments, a hut of the plurality of huts 106-110 may be associated with a hut shape. Further, the at least one side wall of the hut may include a plurality of side walls. Further, the plurality of side walls of a side wall shape and the roof of a roof shape may be arranged in at least one arrangement for forming the hut shape. Further, in an embodiment, the hut shape may include at least one geometrical shape. Further, the at least one geometrical shape may include a 3-D geometrical shape.

In further embodiments, a plurality of skirts 114-118 may be attached to the plurality of huts 106-110. Further, a skirt of the plurality of skirts 114-118 may include an elongated panel. Further, a first end of the elongated panel may be fastened to a second end of the elongated panel for forming the skirt using at least one fastener. Further, the elongated panel may include a fixed periphery and a free periphery. Further, the fixed periphery may be configured to be attached to the at least one side wall of a hut of the plurality of huts 106-110 along at least one base edge of the at least one side wall. Further, the free periphery extends away from the at least one side wall. Further, in an embodiment, the plurality of skirts 114-118 may be comprised of at least one skirt material. Further, the at least one skirt material may include the coconut fronds. Further, the coconut fronds may include woven coconut fronds.

In further embodiments, a plurality of figurines may be disposable on at least one of a first ledge formed on the bed panel 104 based on disposing of the bottom hut 106 on the bed panel 104, a second ledge formed on the bottom roof 120 based on disposing of the middle hut 108 on the bottom roof 120, and a third ledge formed on the middle roof 122 based on disposing of the top hut 110 on the middle roof 122.

In further embodiments, a plurality of decorating objects may be configured to be attached to at least one of the plurality of huts 106-110 and the base structure 102 for decorating the simulated Ghana Christmas hut 100.

Further, in some embodiments, the base structure 102 may be comprised of at least one material. Further, the at least one material may include at least one of a bamboo, a wood, a cork, a fabric, a plastic, a metal, and an edible material.

Further, in some embodiments, at least one the at least one side wall and the roof of each hut may be comprised of at least one material. Further, the at least one material may include at least one of a bamboo, a wood, a cork, a fabric, a plastic, a metal, and an edible material.

Further, in some embodiments, the coconut fronds may be woven using at least one weaving technique for forming at least one of the at least one side wall and the roof.

In further embodiments, a plurality of spines extending away from the plurality of huts 106-110. Further, the plurality of spines may be configured for supporting at least one ornament on the plurality of spines.

Further, in some embodiments, the at least one side wall and the roof of each hut may be erectably foldable for transitioning the plurality of huts 106-110 between a 2D configuration and a 3D configuration. Further, the plurality of huts 106-110 in the 2D configuration may be hangable on at least one hanging member. Further, the at least one hanging member may include at least one wall.

Figure 2:
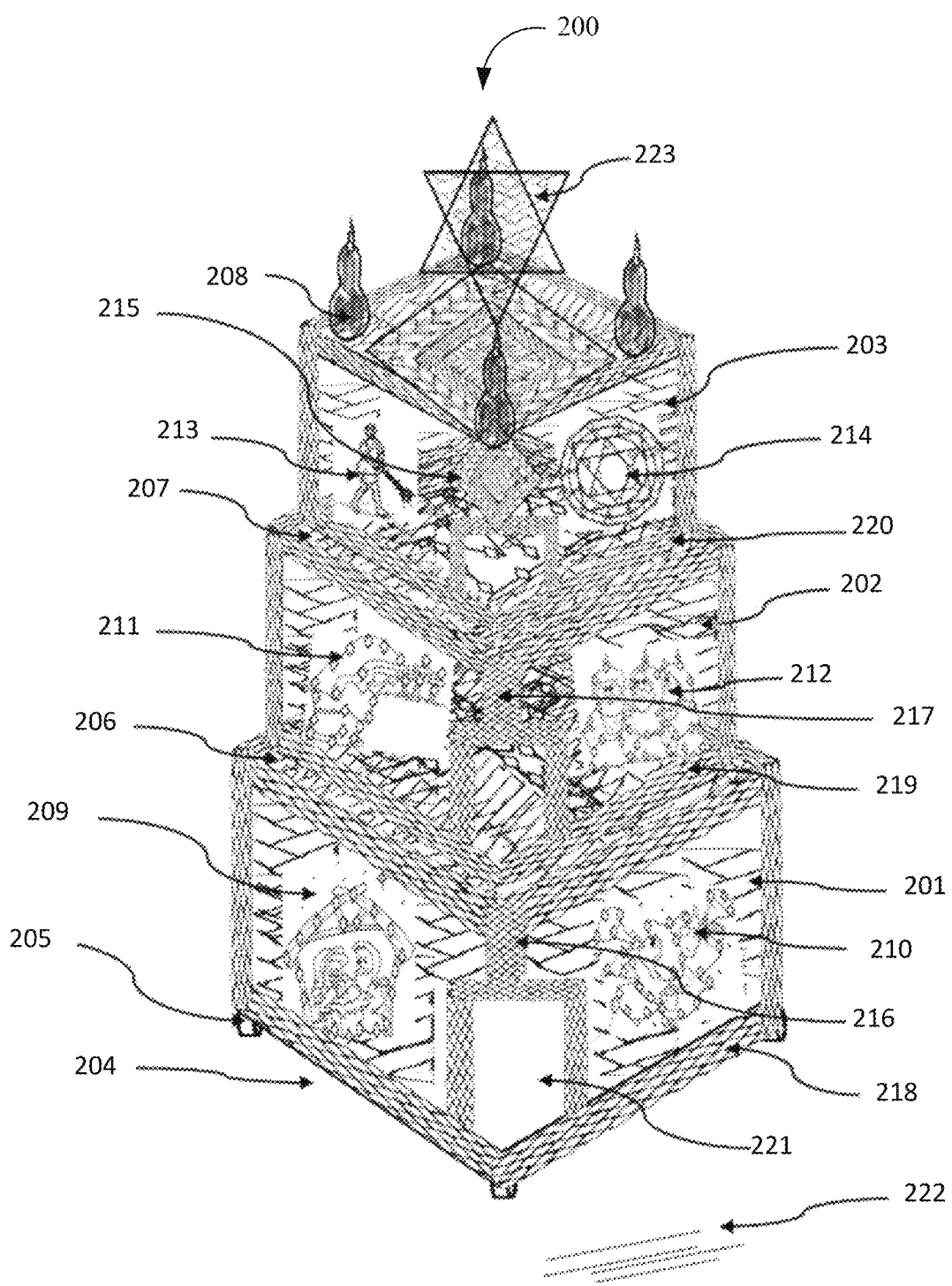
FIG. 2 is a front perspective view of a simulated Ghana Christmas hut, in accordance with some embodiments.

FIG. 2 is a front perspective view of a simulated Ghana Christmas hut 200, in accordance with some embodiments.

Figure 3:
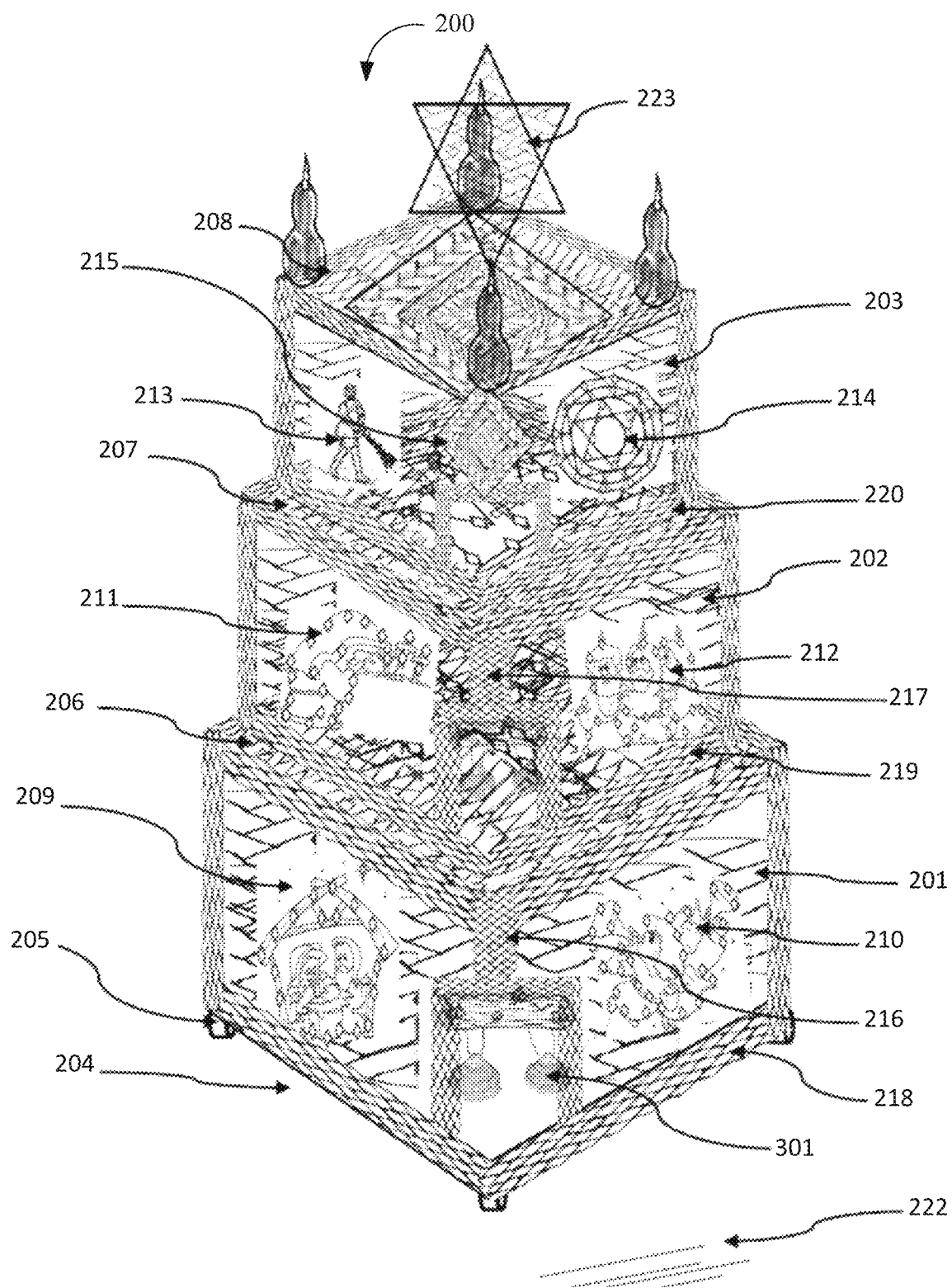
FIG. 3 is a front perspective view of the simulated Ghana Christmas hut decorated with a Heche gift log, in accordance with some embodiments.

FIG. 3 is a front perspective view of the simulated Ghana Christmas hut 200 decorated with a Heche gift log 301, in accordance with some embodiments.

Figure 4:
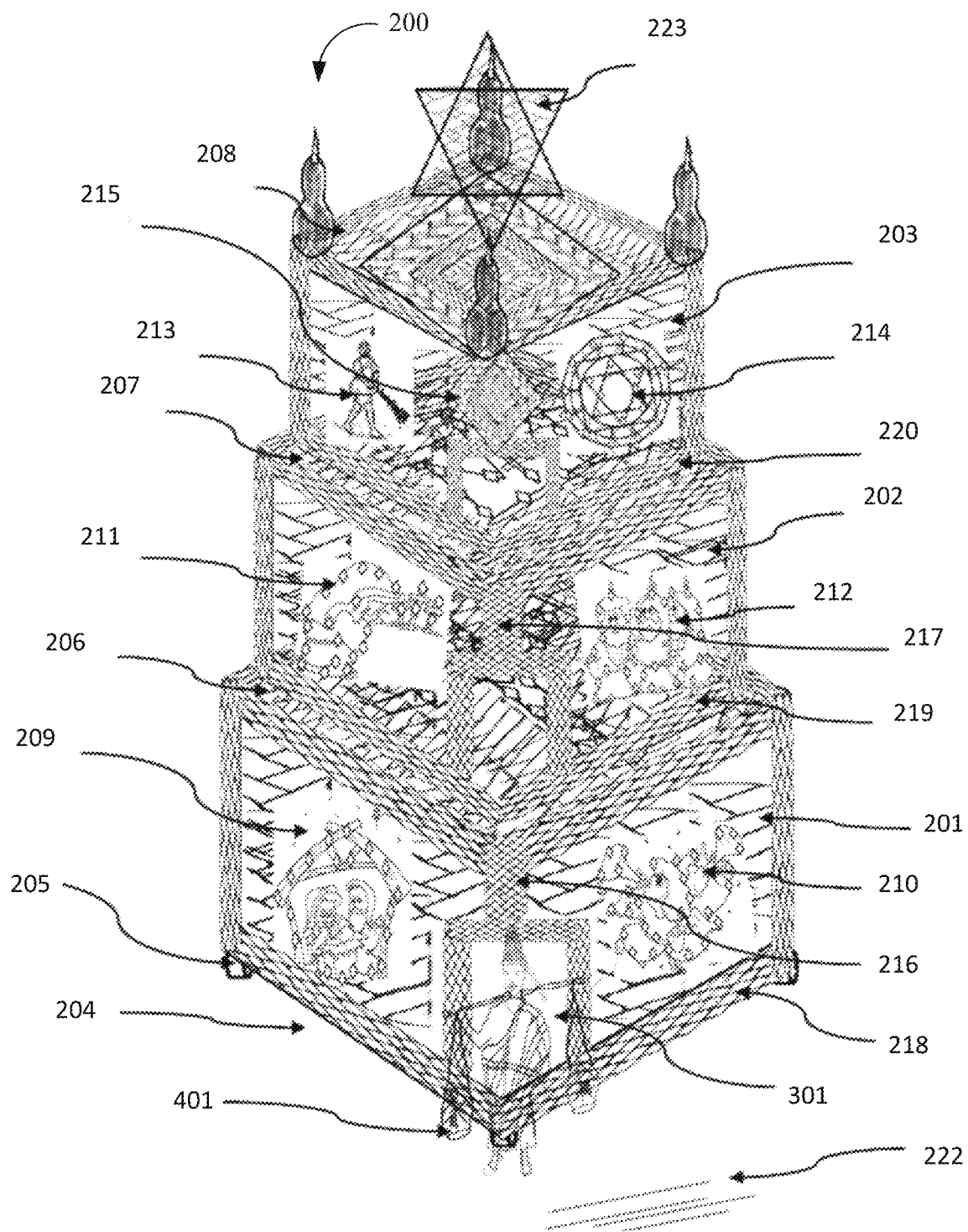
FIG. 4 is a front perspective view of the simulated Ghana Christmas hut decorated with a Hechebi Christmas figurine, in accordance with some embodiments.

FIG. 4 is a front perspective view of the simulated Ghana Christmas hut 200 decorated with a Hechebi Christmas figurine 401, in accordance with some embodiments.

Figure 5:
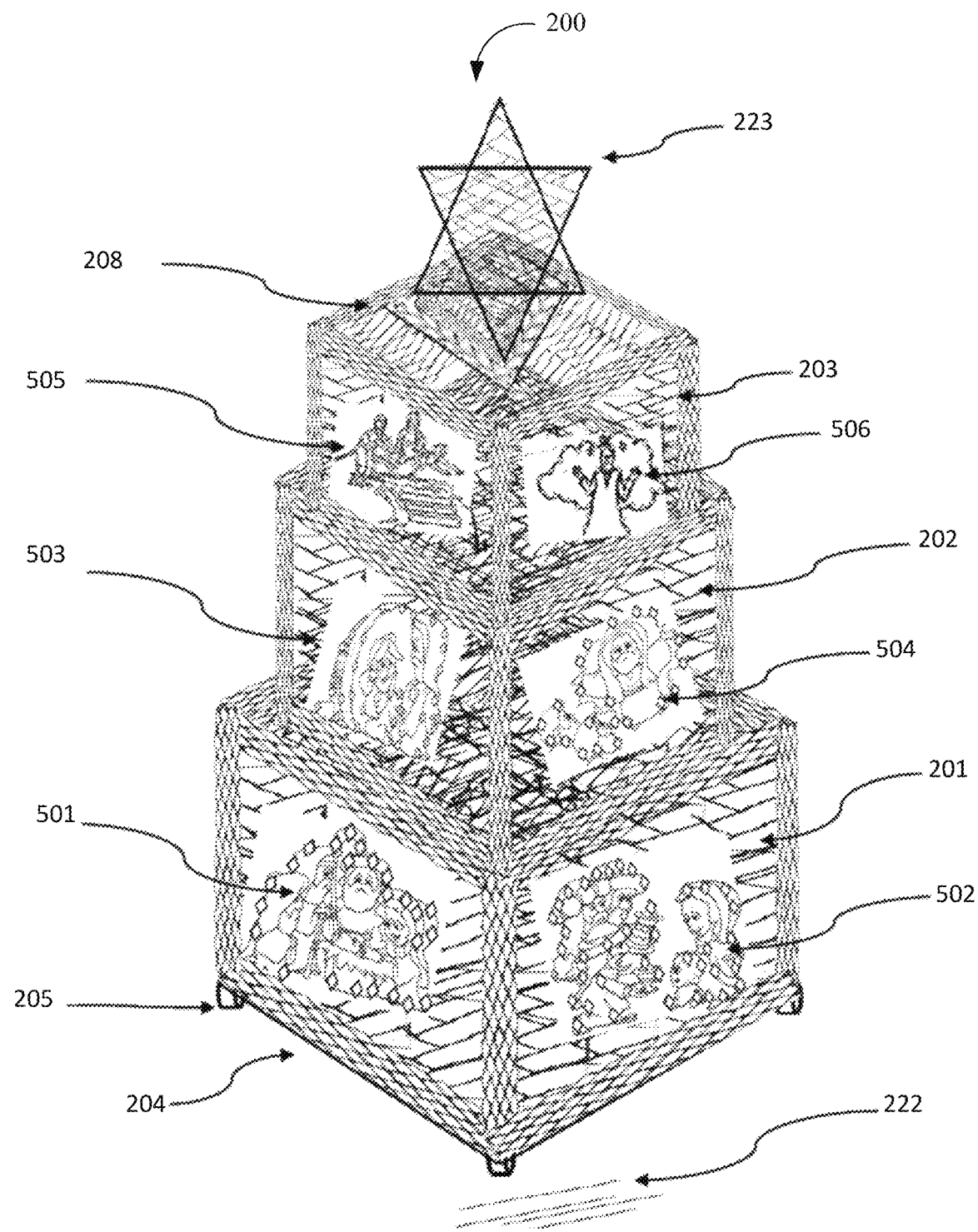
FIG. 5 is a rear perspective view of the simulated Ghana Christmas hut, in accordance with some embodiments.

FIG. 5 is a rear perspective view of the simulated Ghana Christmas hut 200, in accordance with some embodiments.

Figure 6:
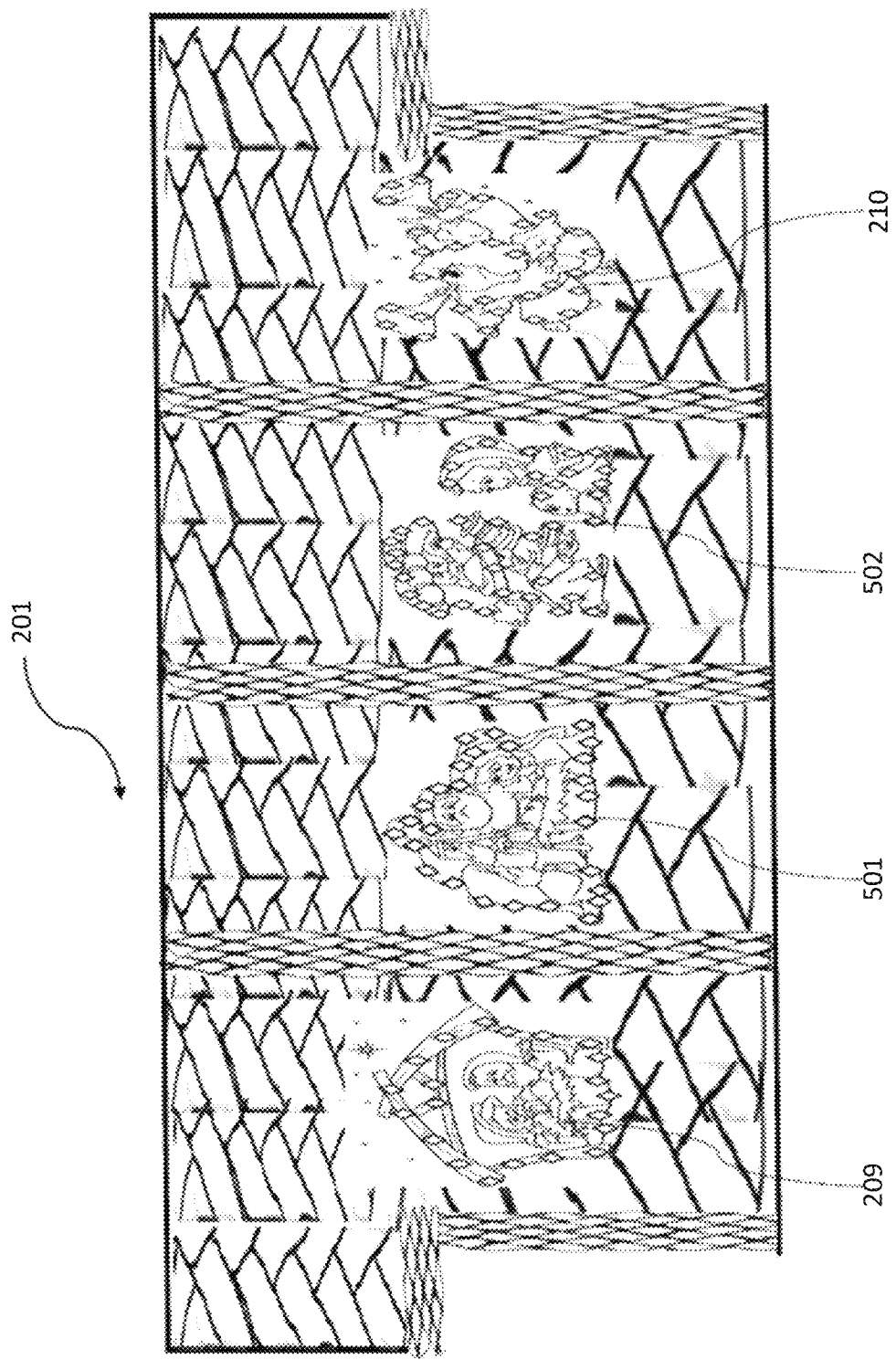
FIG. 6 is a front orthographic view of a folded out wall of the of a first floor hut, in accordance with some embodiments.

FIG. 6 is a front orthographic view of a folded out wall of the of a first floor hut, in accordance with some embodiments.

Figure 7:
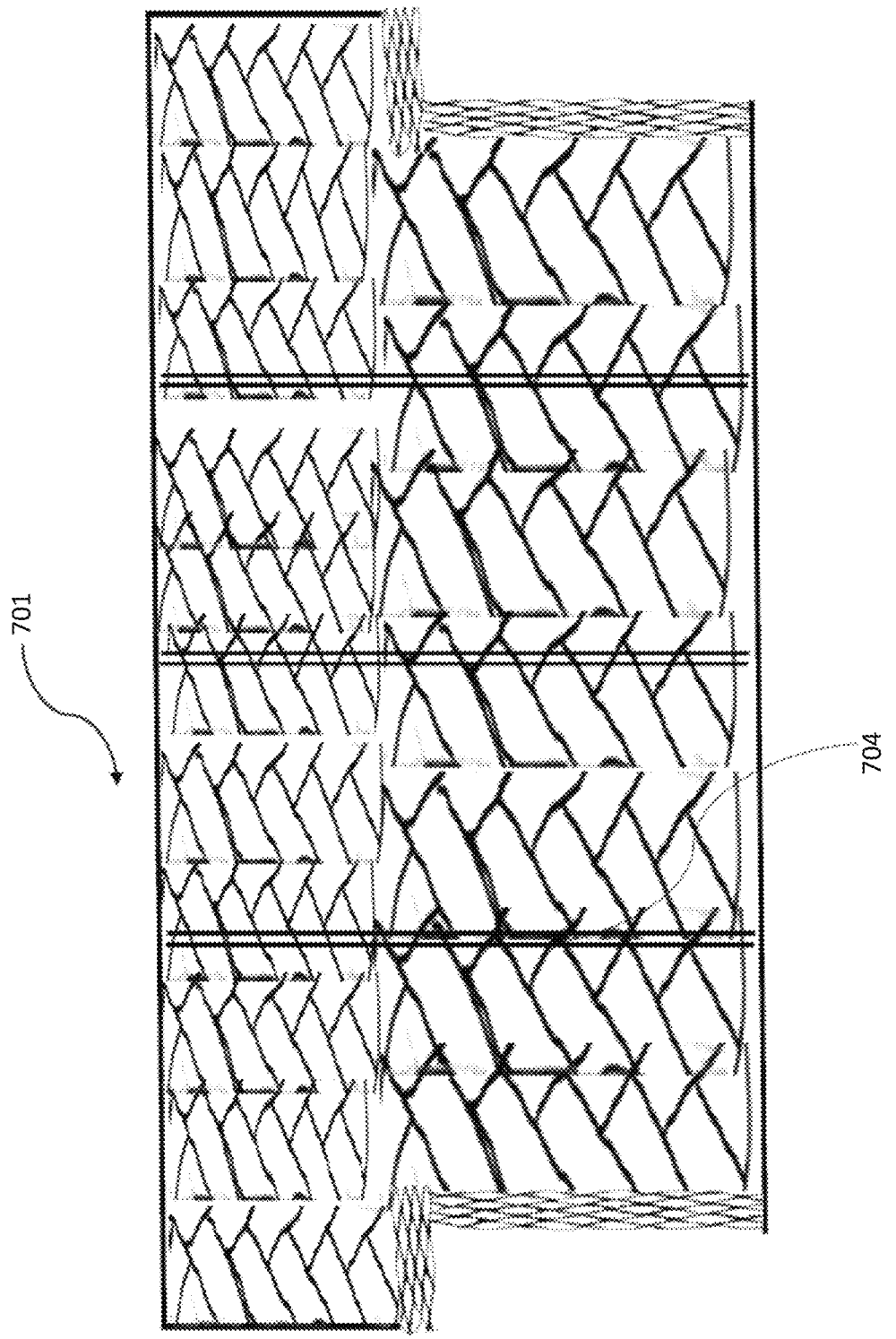
FIG. 7 is a rear orthographic view of the folded out wall of the first-floor hut, in accordance with some embodiments.

FIG. 7 is a rear orthographic view of the folded out wall 701 of the first-floor wall of a first floor hut, in accordance with some embodiments.

Figure 8:
FIG. 8 illustrates interwoven patterns of a scene into a first-floor unfolded woven wall, in accordance with some embodiments.

FIG. 8 illustrates interwoven patterns of a scene 209 into a first-floor unfolded woven wall, in accordance with some embodiments.

Figure 9:
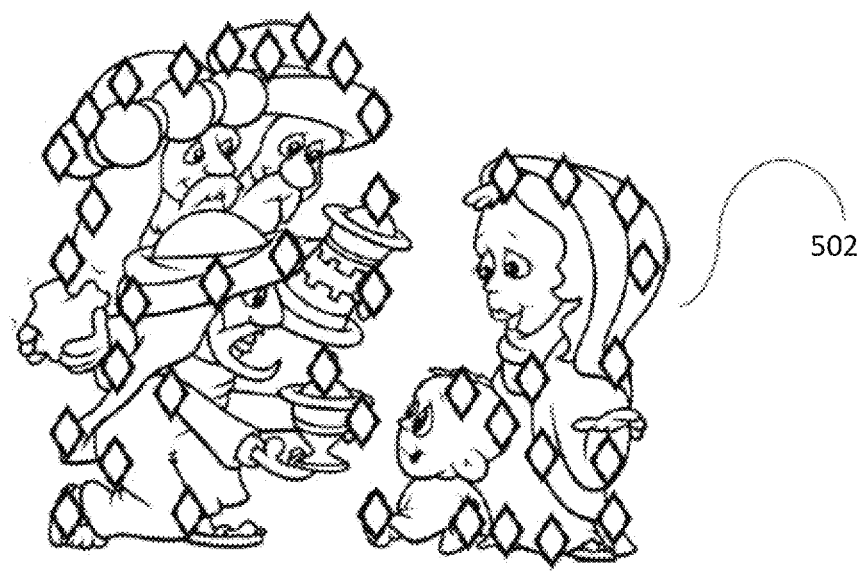
FIG. 9 illustrates interwoven patterns of a scene into the first-floor unfolded woven wall, in accordance with some embodiments.

FIG. 9 illustrates interwoven patterns of a scene 502 into the first-floor unfolded woven wall, in accordance with some embodiments.

Figure 10:
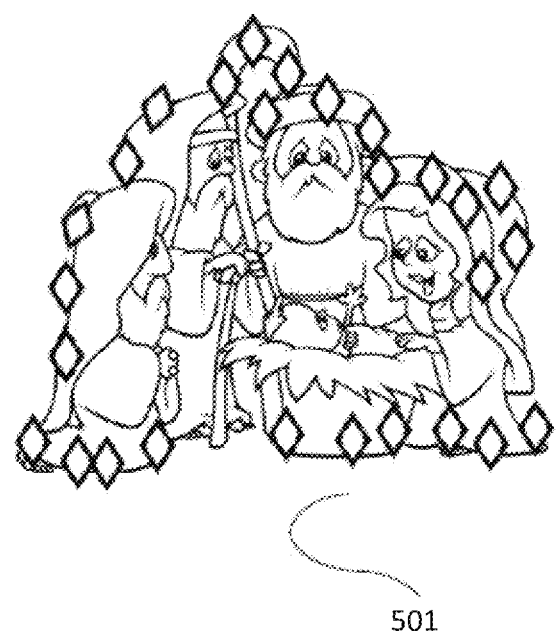
FIG. 10 illustrates interwoven patterns of a scene into the first-floor unfolded woven wall, in accordance with some embodiments.

FIG. 10 illustrates interwoven patterns of a scene 501 into the first-floor unfolded woven wall, in accordance with some embodiments.

Figure 11:
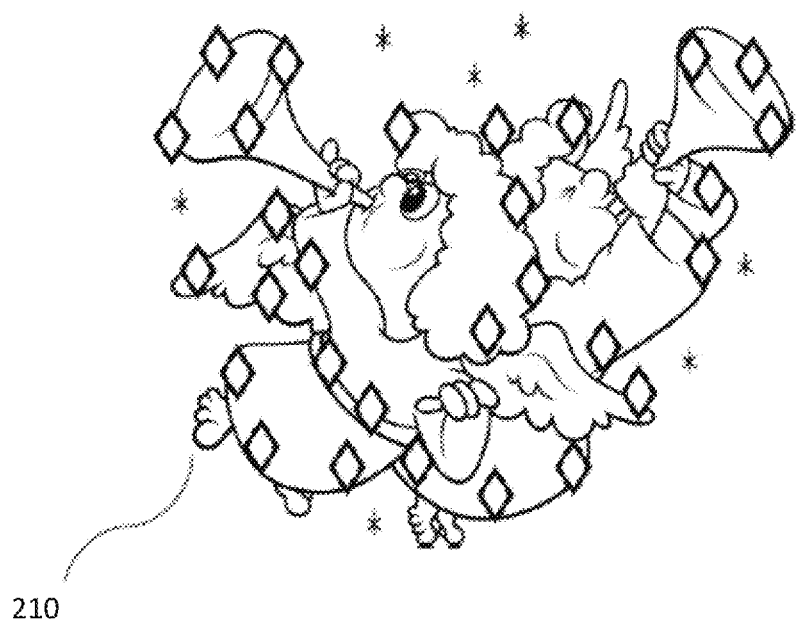
FIG. 11 illustrates interwoven patterns of a scene into the first-floor unfolded woven wall, in accordance with some embodiments.

FIG. 11 illustrates interwoven patterns of a scene 210 into the first-floor unfolded woven wall, in accordance with some embodiments.

Figure 12:
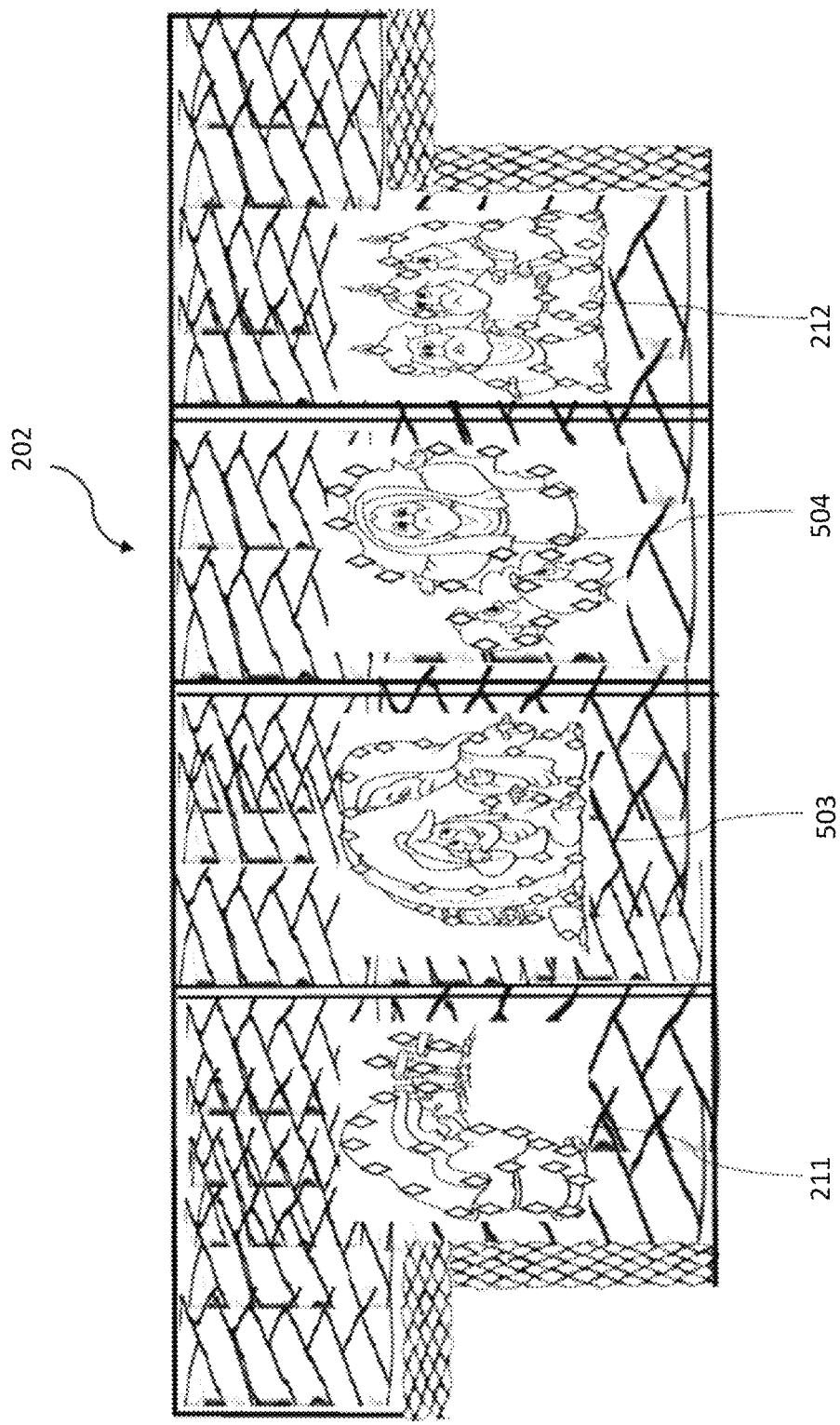
FIG. 12 is a front orthographic view of a second-floor woven wall of the simulated Ghana Christmas hut, in accordance with some embodiments.

FIG. 12 is a front orthographic view of a second-floor woven wall of the simulated Ghana Christmas hut 200, in accordance with some embodiments.

Figure 13:
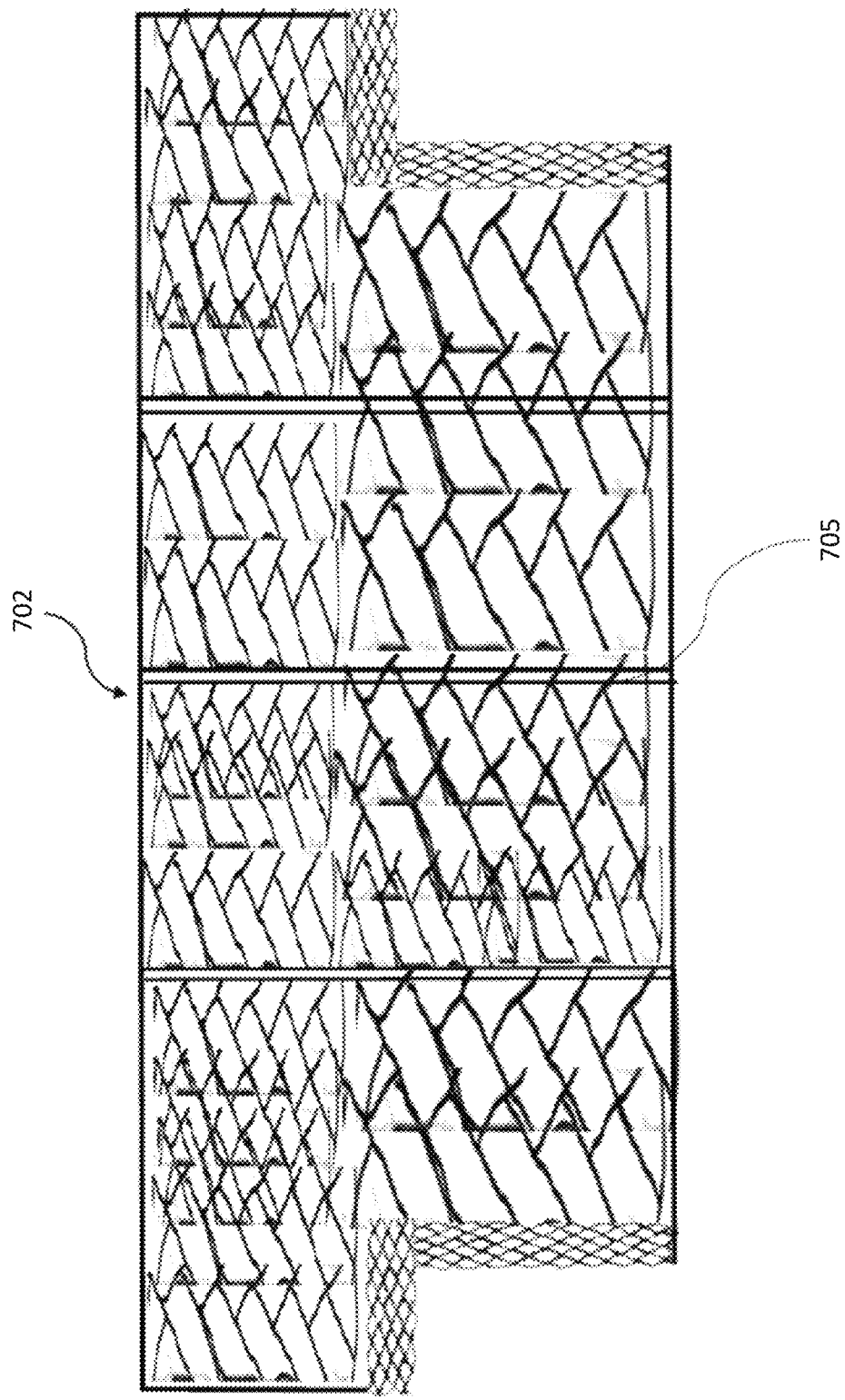
FIG. 13 is a rear orthographic view of the second-floor woven wall of the simulated Ghana Christmas hut, in accordance with some embodiments.

FIG. 13 is a rear orthographic view of the second-floor woven wall of the simulated Ghana Christmas hut 200, in accordance with some embodiments.

Figure 14:
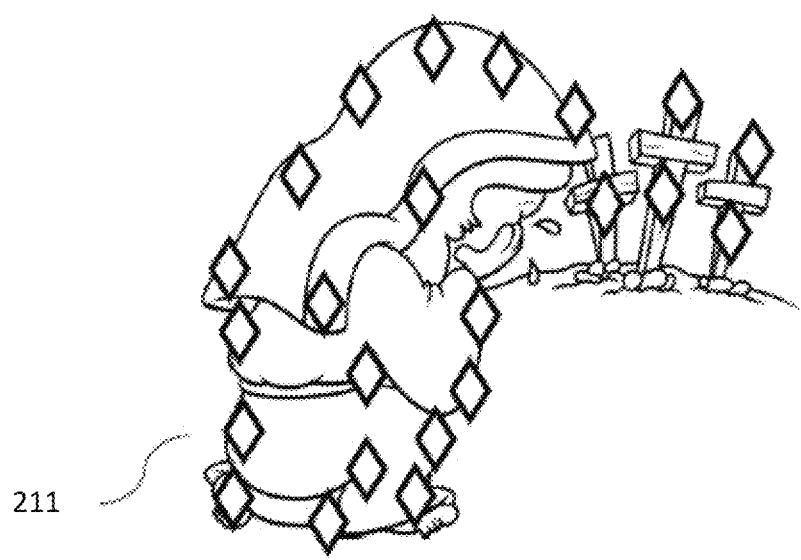
FIG. 14 illustrates interwoven patterns of a scene into the second-floor unfolded woven wall, in accordance with some embodiments.

FIG. 14 illustrates interwoven patterns of a scene 211 into a second-floor unfolded woven wall, in accordance with some embodiments.

Figure 15:
FIG. 15 illustrates interwoven patterns of a scene into the second-floor unfolded woven wall, in accordance with some embodiments.

FIG. 15 illustrates interwoven patterns of a scene 504 into the second-floor unfolded woven wall, in accordance with some embodiments.

Figure 16:
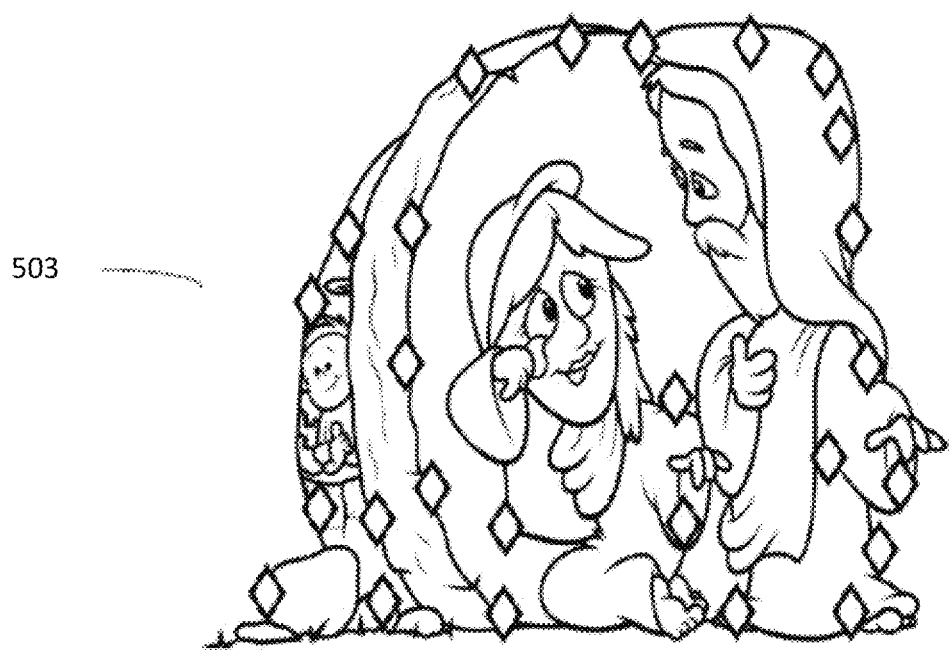
FIG. 16 illustrates interwoven patterns of a scenes into the second-floor unfolded woven wall, in accordance with some embodiments.

FIG. 16 illustrates interwoven patterns of a scene 503 into the second-floor unfolded woven wall, in accordance with some embodiments.

Figure 17:
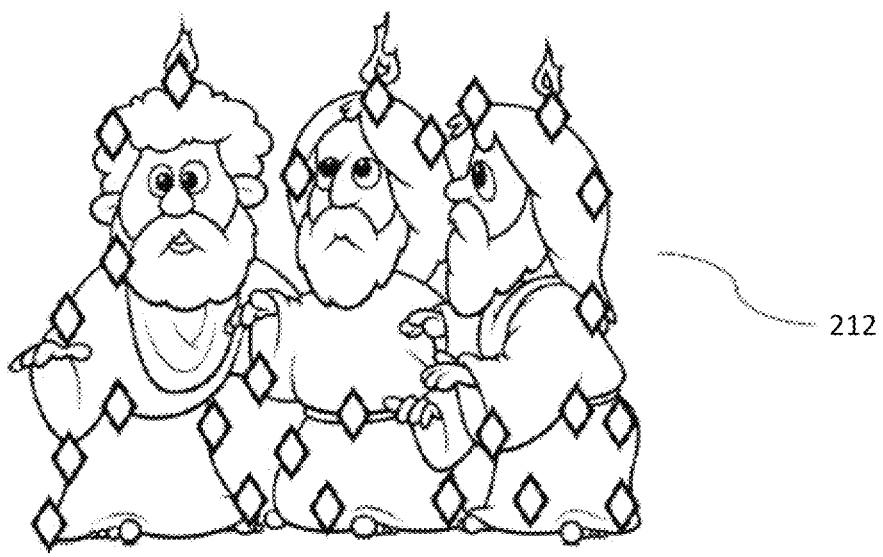
FIG. 17 illustrates interwoven patterns of a scene into the second-floor unfolded woven wall, in accordance with some embodiments.

FIG. 17 illustrates interwoven patterns of a scene 212 into the second-floor unfolded woven wall, in accordance with some embodiments.

Figure 18:
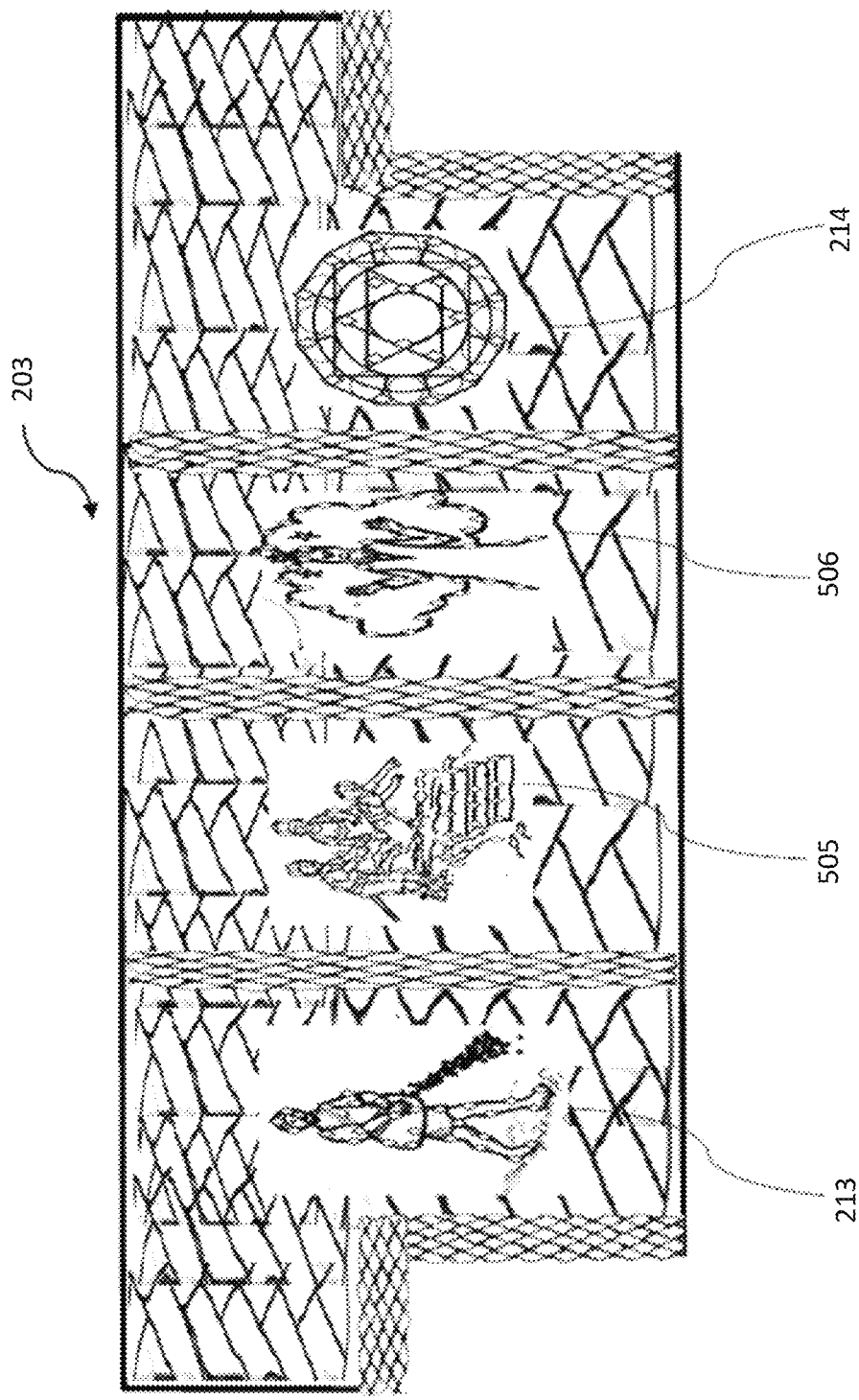
FIG. 18 is a front orthographic view of a third-floor woven wall of the simulated Ghana Christmas hut, in accordance with some embodiments.

FIG. 18 is a front orthographic view of a third-floor woven wall of the simulated Ghana Christmas hut 200, in accordance with some embodiments.

Figure 19:
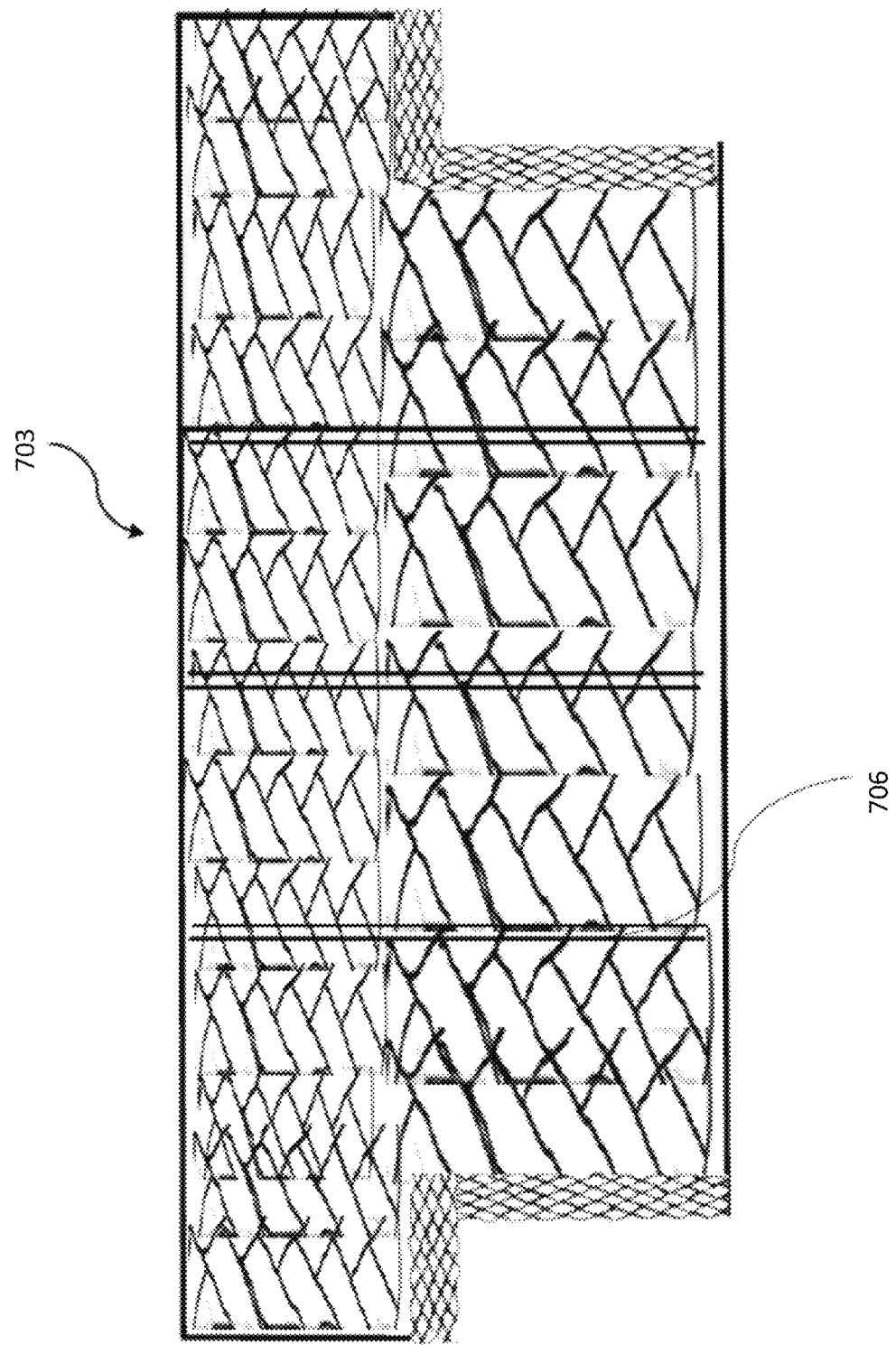
FIG. 19 is a rear orthographic view of the third-floor woven wall of the simulated Ghana Christmas hut, in accordance with some embodiments.

FIG. 19 is a rear orthographic view of the third-floor woven wall of the simulated Ghana Christmas hut 200, in accordance with some embodiments.

Figure 20:
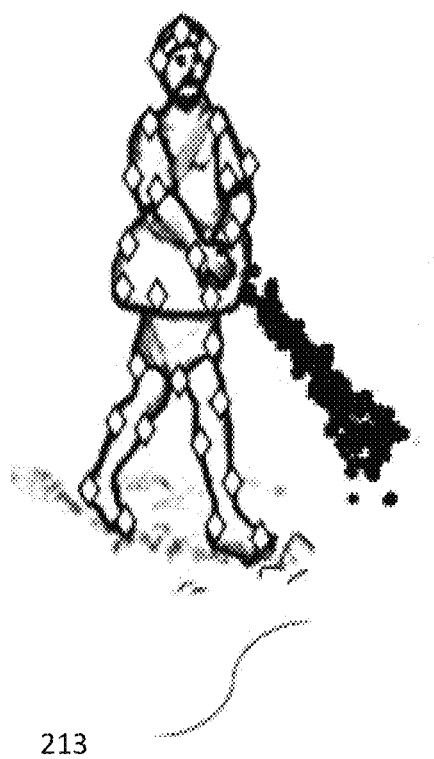
FIG. 20 illustrates interwoven patterns of a scene into the third-floor unfolded woven wall, in accordance with some embodiments.

FIG. 20 illustrates interwoven patterns of a scene 213 into a third-floor unfolded woven wall, in accordance with some embodiments.

Figure 21:
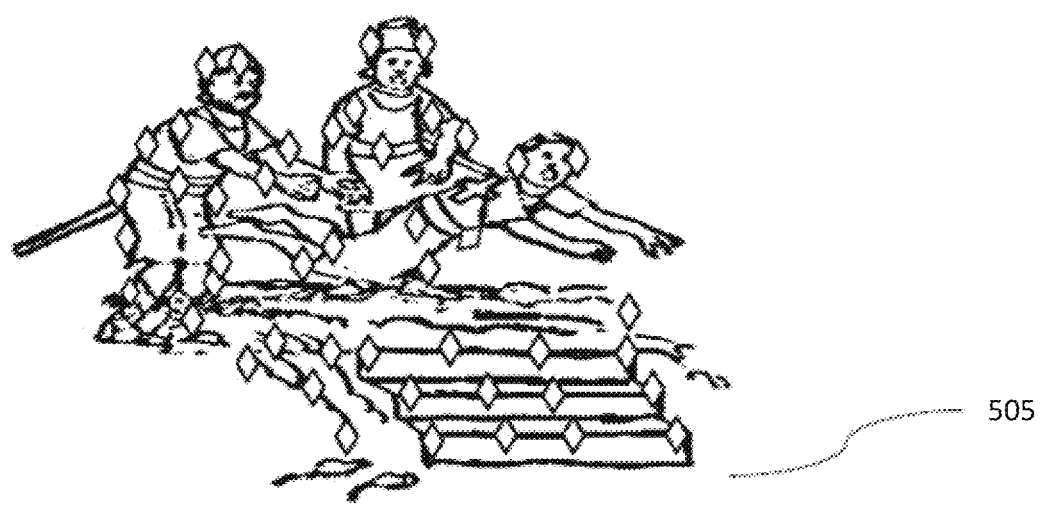
FIG. 21 illustrates interwoven patterns of a scene into the third-floor unfolded woven wall, in accordance with some embodiments.

FIG. 21 illustrates interwoven patterns of a scene 505 into the third-floor unfolded woven wall, in accordance with some embodiments.

Figure 22:
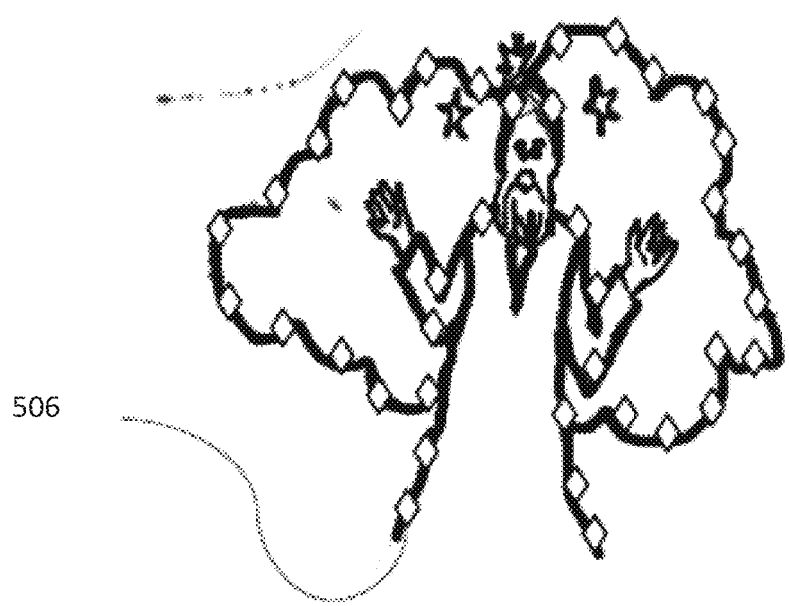
FIG. 22 illustrates interwoven patterns of a scene into the third-floor unfolded woven wall, in accordance with some embodiments.

FIG. 22 illustrates interwoven patterns of a scene 506 into the third-floor unfolded woven wall, in accordance with some embodiments.

Figure 23:
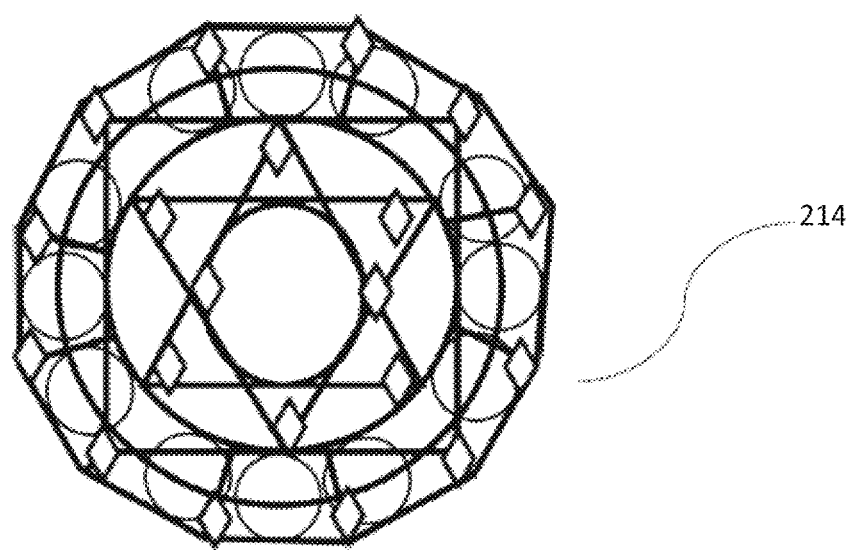
FIG. 23 illustrates interwoven patterns of a scene into the third-floor woven wall, in accordance with some embodiments.

FIG. 23 illustrates interwoven patterns of a scene 214 into the third-floor unfolded woven wall, in accordance with some embodiments.

Figure 24:
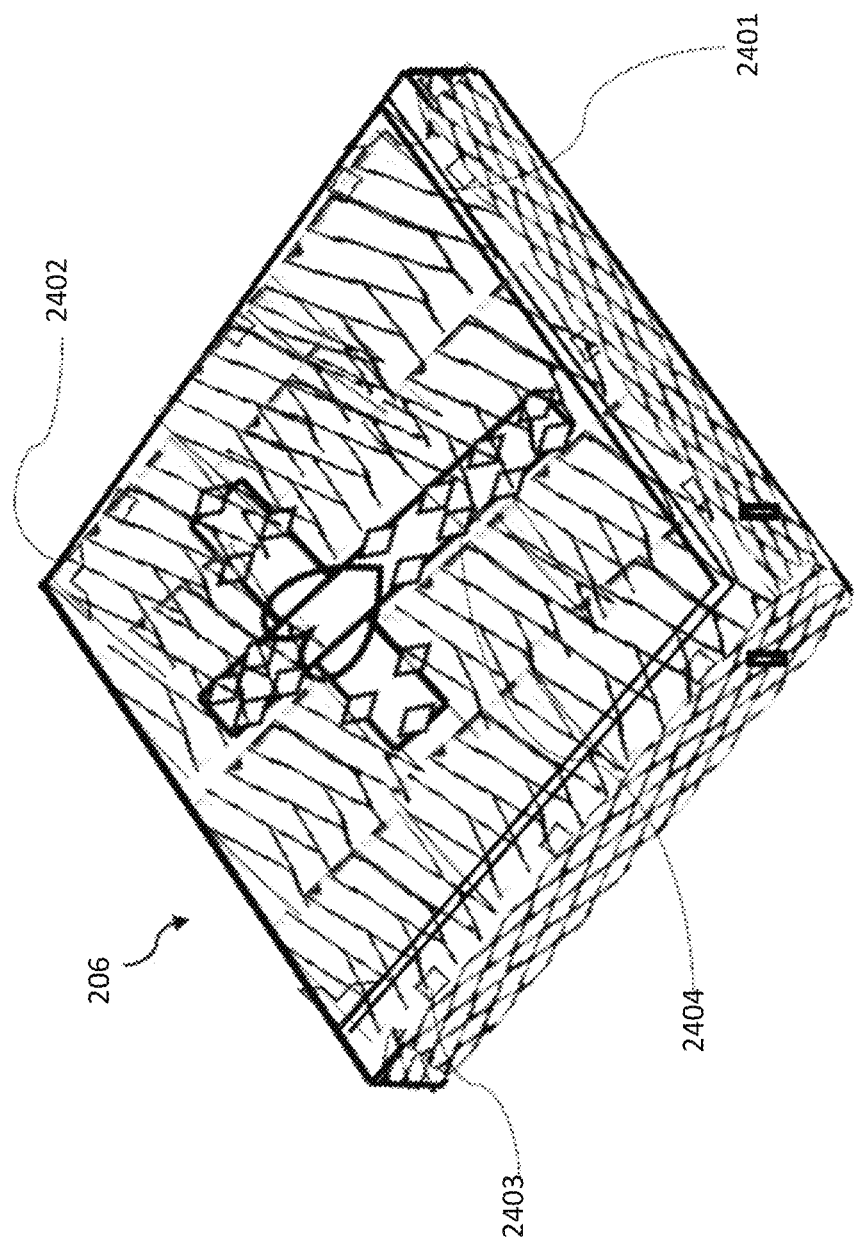
FIG. 24 is a front perspective view of a first-floor roof of the simulated Ghana Christmas hut, in accordance with some embodiments.

FIG. 24 is a front perspective view of a first-floor roof 206 of the simulated Ghana Christmas hut 200, in accordance with some embodiments.

Figure 25:
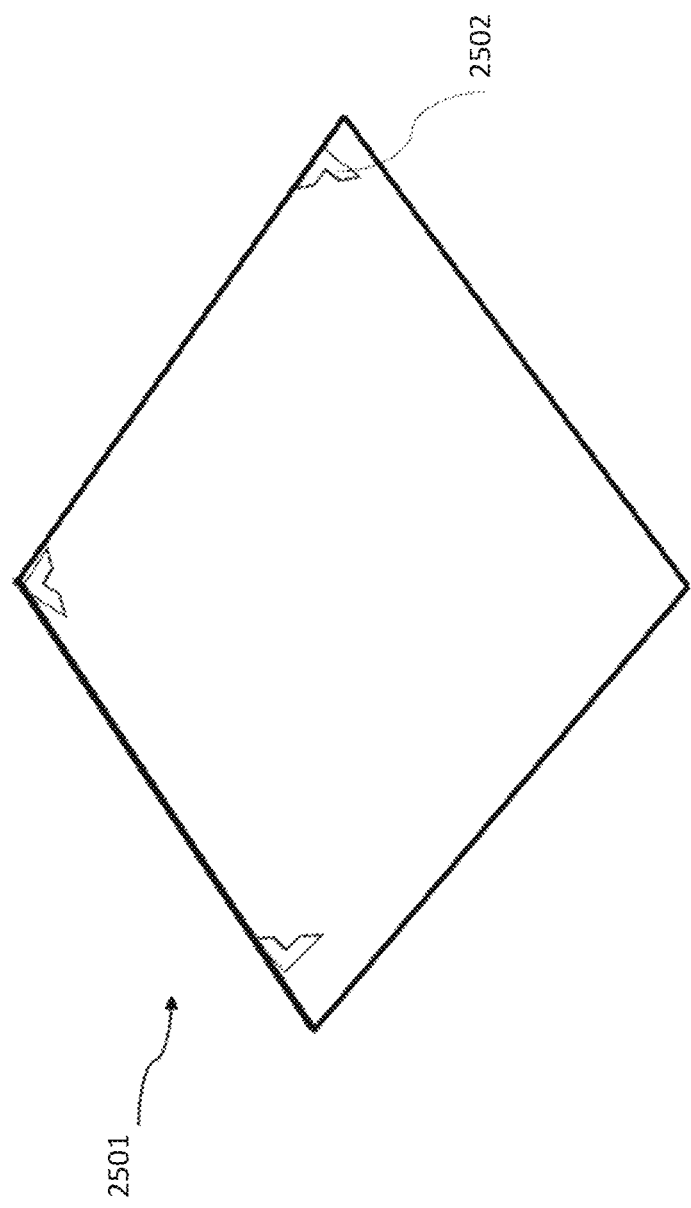
FIG. 25 is a rear perspective view of the first-floor roof of the simulated Ghana Christmas hut, in accordance with some embodiments.

FIG. 25 is a rear perspective view of the first-floor roof 206 of the simulated Ghana Christmas hut 200, in accordance with some embodiments.

Figure 26:
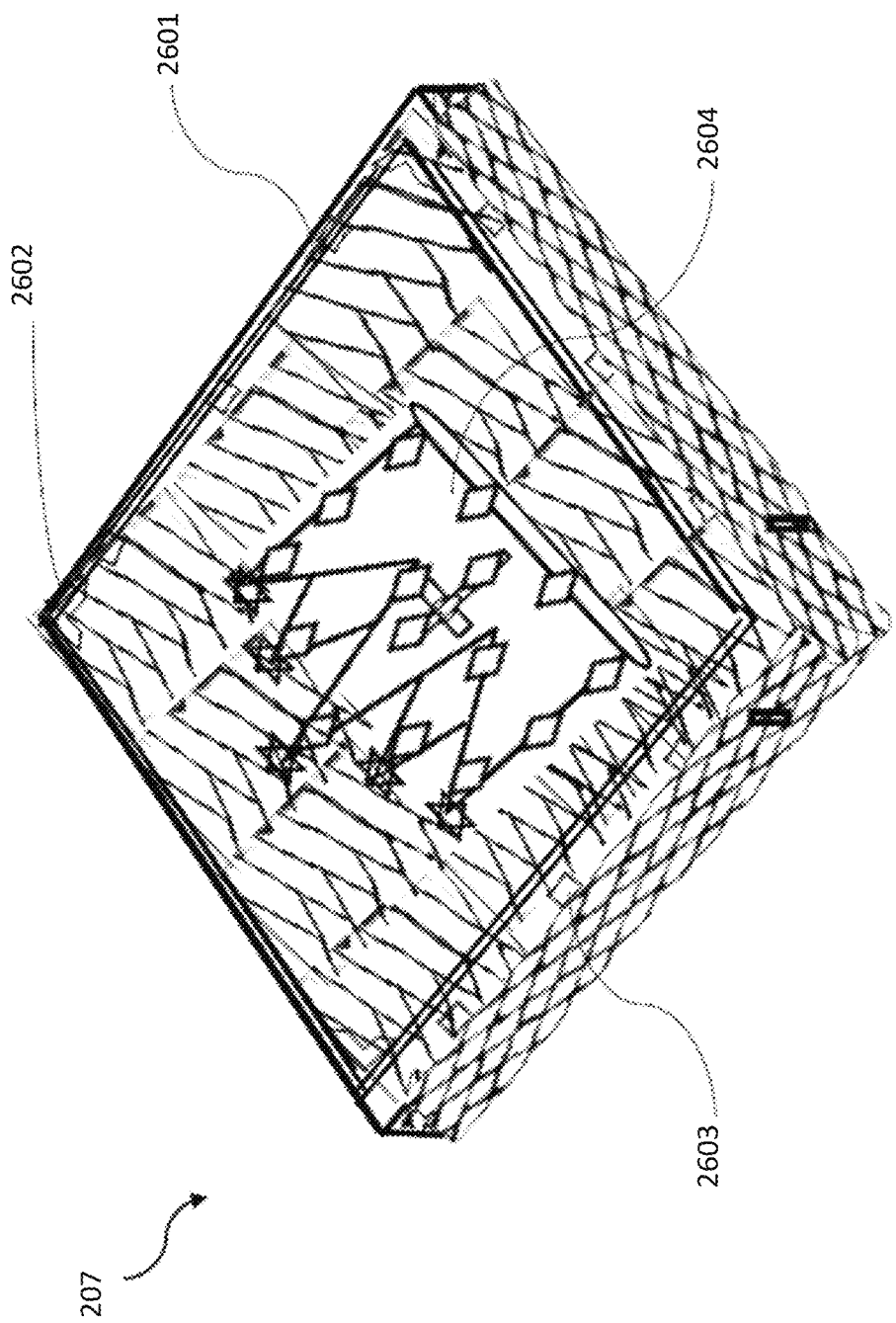
FIG. 26 is a front perspective view of a second floor roof of the simulated Ghana Christmas hut, in accordance with some embodiments.

FIG. 26 is a front perspective view of a second floor roof 207 of the simulated Ghana Christmas hut 200, in accordance with some embodiments.

Figure 27:
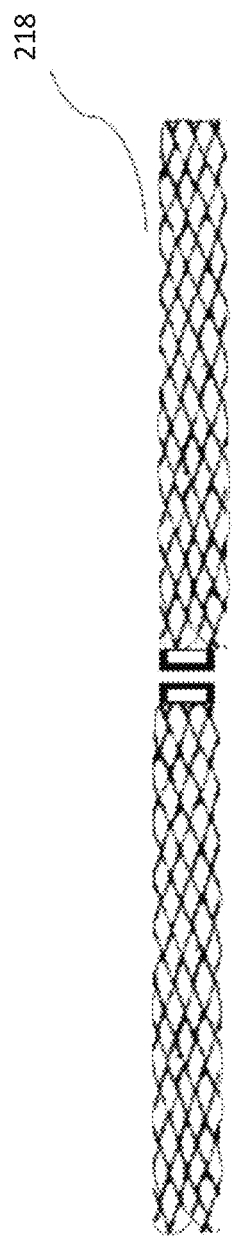
FIG. 27 is a front perspective view of a woven skirt of the simulated Ghana Christmas hut, in accordance with some embodiments.

FIG. 27 is a front perspective view of a woven skirt 218 of the simulated Ghana Christmas hut 200, in accordance with some embodiments.

Figure 28:
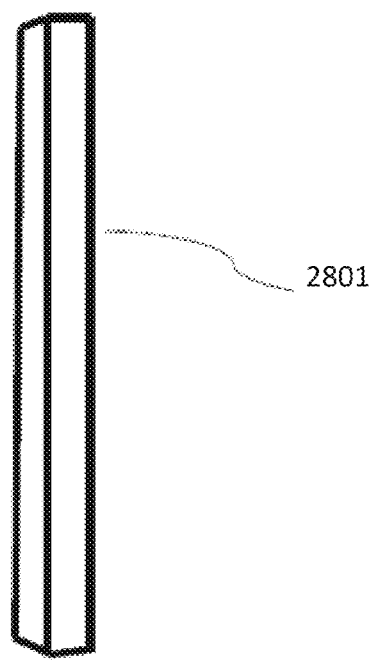
FIG. 28 is a front perspective view of a post of the simulated Ghana Christmas hut, in accordance with some embodiments.

FIG. 28 is a front perspective view of a post 2801 of the simulated Ghana Christmas hut 200, in accordance with some embodiments.

Figure 29:
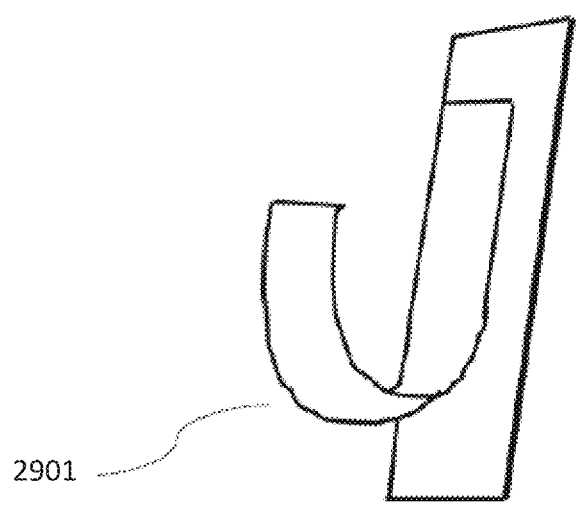
FIG. 29 is a perspective view of a hook of the simulated Ghana Christmas hut, in accordance with some embodiments.

FIG. 29 is a perspective view of a hook 2901 of the simulated Ghana Christmas hut 200, in accordance with some embodiments.

Figure 30:
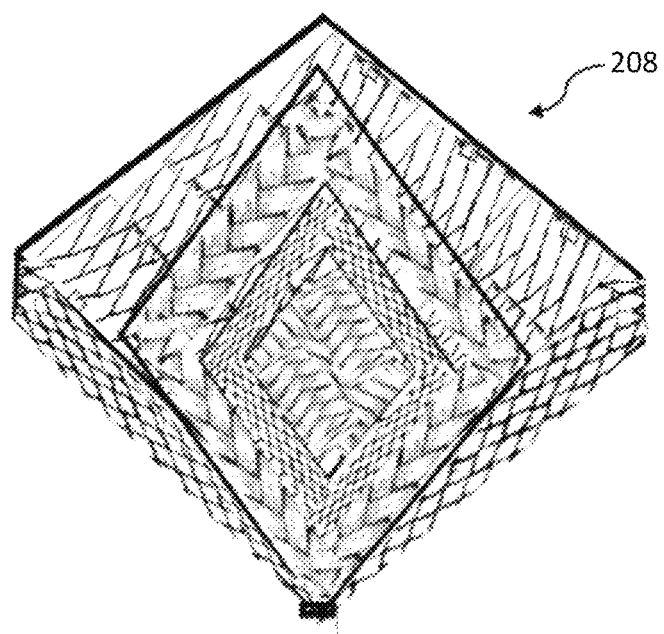
FIG. 30 is a front perspective view of a woven third floor roof of the simulated Ghana Christmas hut, in accordance with some embodiments.

FIG. 30 is a front perspective view of a woven third floor roof 208 of the simulated Ghana Christmas hut 200, in accordance with some embodiments.

Figure 31:
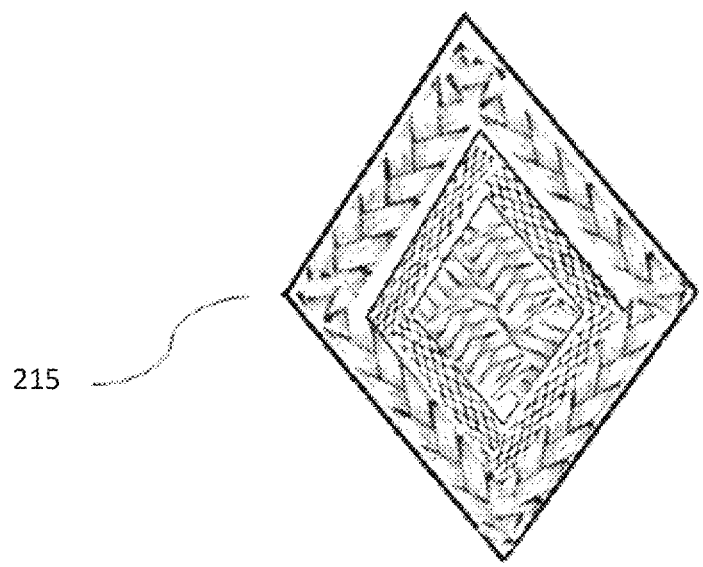
FIG. 31 is a front view of a woven diamond-shaped fascia of the third floor roof, in accordance with some embodiments.

FIG. 31 is a front view of a woven diamond-shaped fascia 215 of the third floor roof 208, in accordance with some embodiments.

Figure 32:
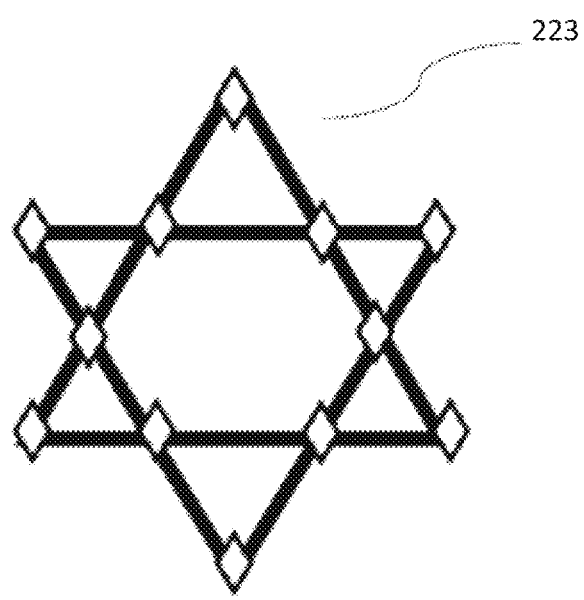
FIG. 32 illustrates interwoven patterns for a star for a third-floor woven roof, in accordance with some embodiments.

FIG. 32 illustrates interwoven patterns for a star 223 of the third floor roof woven 208, in accordance with some embodiments.

Figure 33:
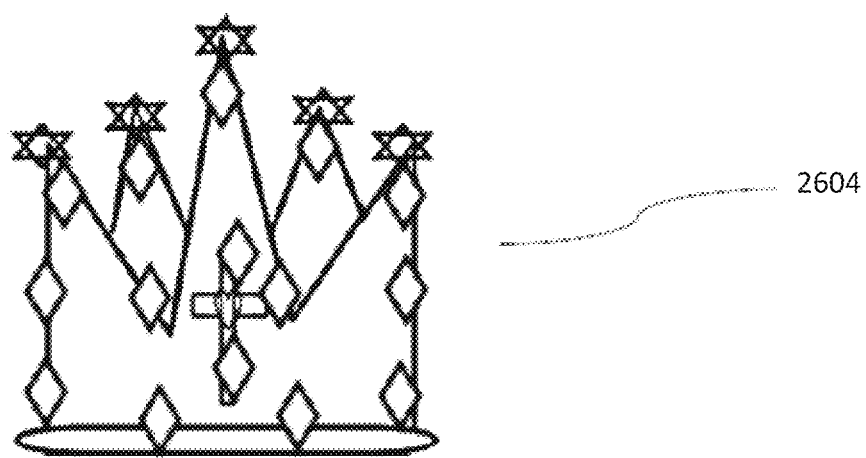
FIG. 33 illustrates interwoven patterns for a crown into the second floor woven roof, in accordance with some embodiments.

FIG. 33 illustrates interwoven patterns for a crown 2604 into the second floor woven roof 207, in accordance with some embodiments.

Figure 34:
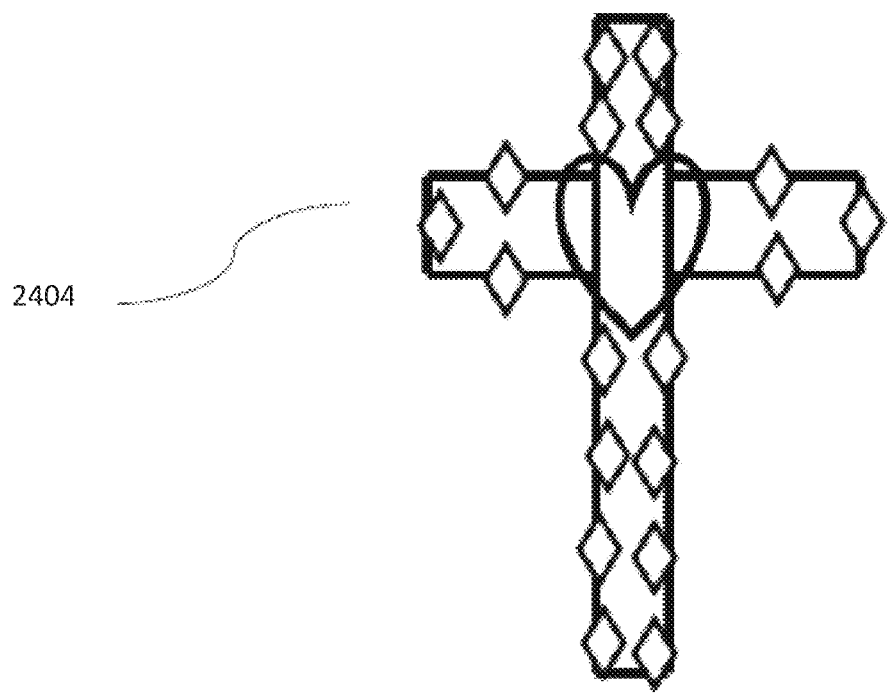
FIG. 34 illustrates interwoven patterns for a cross into the first-floor woven roof, in accordance with some embodiments

FIG. 34 illustrates interwoven patterns for a Cross 2404 of the first-floor woven roof 206, in accordance with some embodiments.

Figure 35:
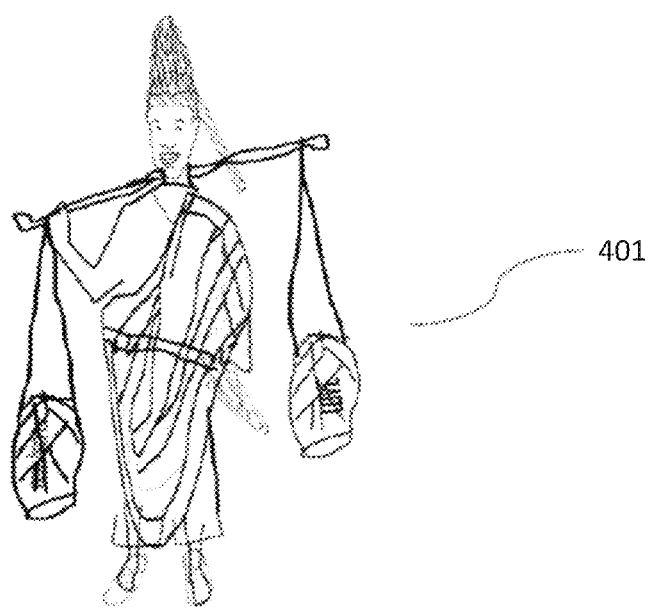
FIG. 35 is a front view of the Hechebi Christmas figurine of the simulated Ghana Christmas hut, in accordance with some embodiments.

FIG. 35 is a front view of the Hechebi Christmas figurine 401 of the simulated Ghana Christmas hut 200, in accordance with some embodiments.

Figure 36:
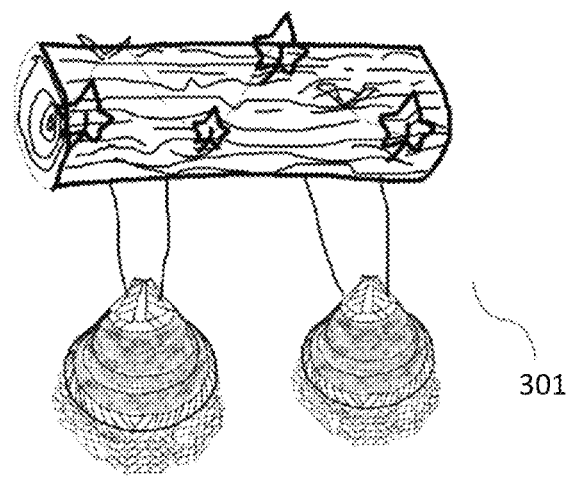
FIG. 36 is a front view of the Heche gift log of the simulated Ghana Christmas hut, in accordance with some embodiments.

FIG. 36 is a front view of the Heche gift log 301 of the simulated Ghana Christmas hut 200, in accordance with some embodiments.

Figure 37:
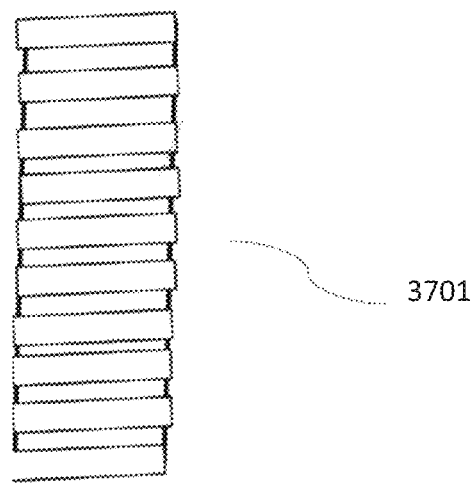
FIG. 37 is a front view of a staircase of the simulated Ghana Christmas hut, in accordance with some embodiments.

FIG. 37 is a front view of a staircase 3701 of the simulated Ghana Christmas hut 200, in accordance with some embodiments.

Figure 38:
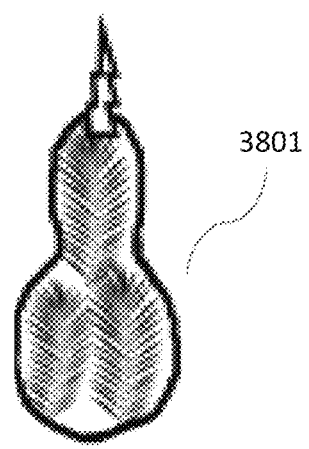
FIG. 38 is a front view of an Osornor lamp of the simulated Ghana Christmas hut, in accordance with some embodiments.

FIG. 38 is a front view of an osornor lamp 3801 of the simulated Ghana Christmas hut 200, in accordance with some embodiments.

Figure 39:
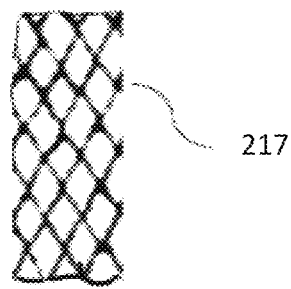
FIG. 39 is a front view of a fascia of the simulated Ghana Christmas hut, in accordance with some embodiments.

FIG. 39 is a front view of a fascia 217 of the simulated Ghana Christmas hut 200, in accordance with some embodiments.

Figure 40:
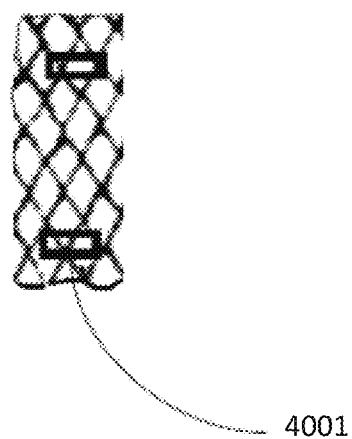
FIG. 40 is a rear view of the fascia with a fastener of the simulated Ghana Christmas hut, in accordance with some embodiments.

FIG. 40 is a rear view of the fascia 217 with a fastener 4001 of the simulated Ghana Christmas hut 200, in accordance with some embodiments.

Figure 41:
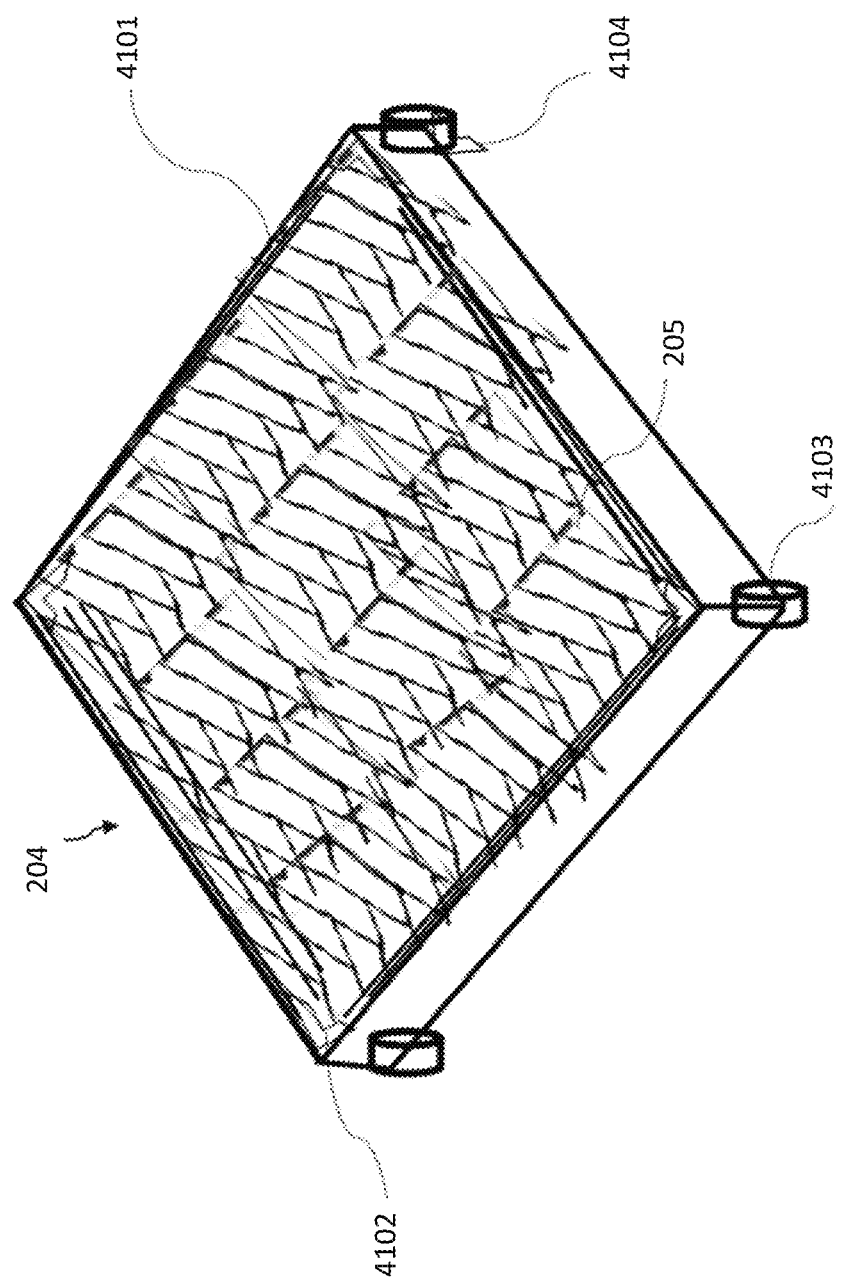
FIG. 41 is a front perspective view of a support base structure of the simulated Ghana Christmas hut, in accordance with some embodiments.

FIG. 41 is a front perspective view of a support base structure 204 of the simulated Ghana Christmas hut 200, in accordance with some embodiments.

Figure 42:
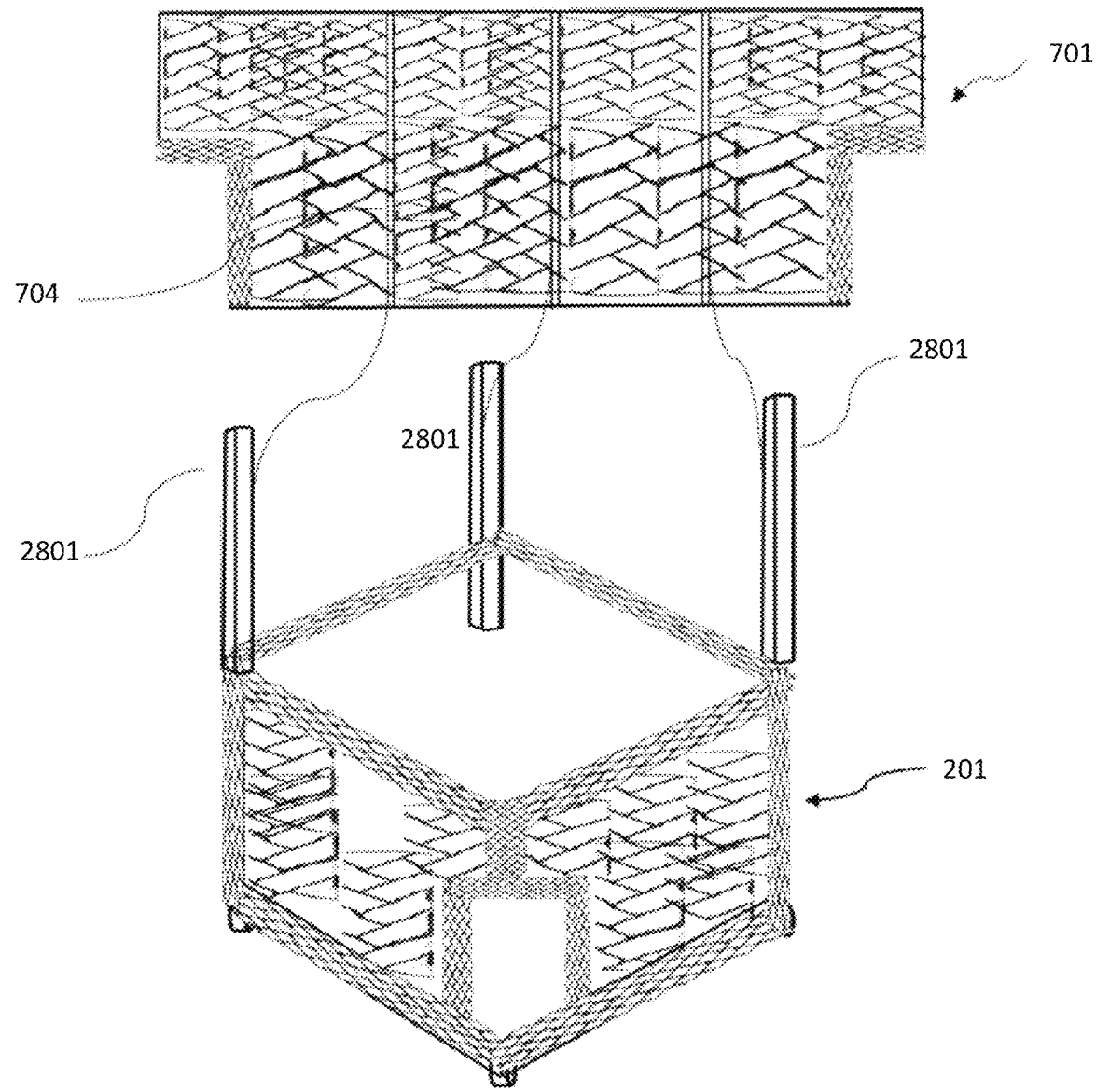
FIG. 42 is an exploded fragmented perspective view of assemblage of both collapsible and foldable forms of the simulated Ghana Christmas hut, in accordance with some embodiments.

FIG. 42 is an exploded fragmented perspective view of assemblage of both collapsible and foldable forms of the simulated Ghana Christmas hut 200, in accordance with some embodiments.

Figure 43:
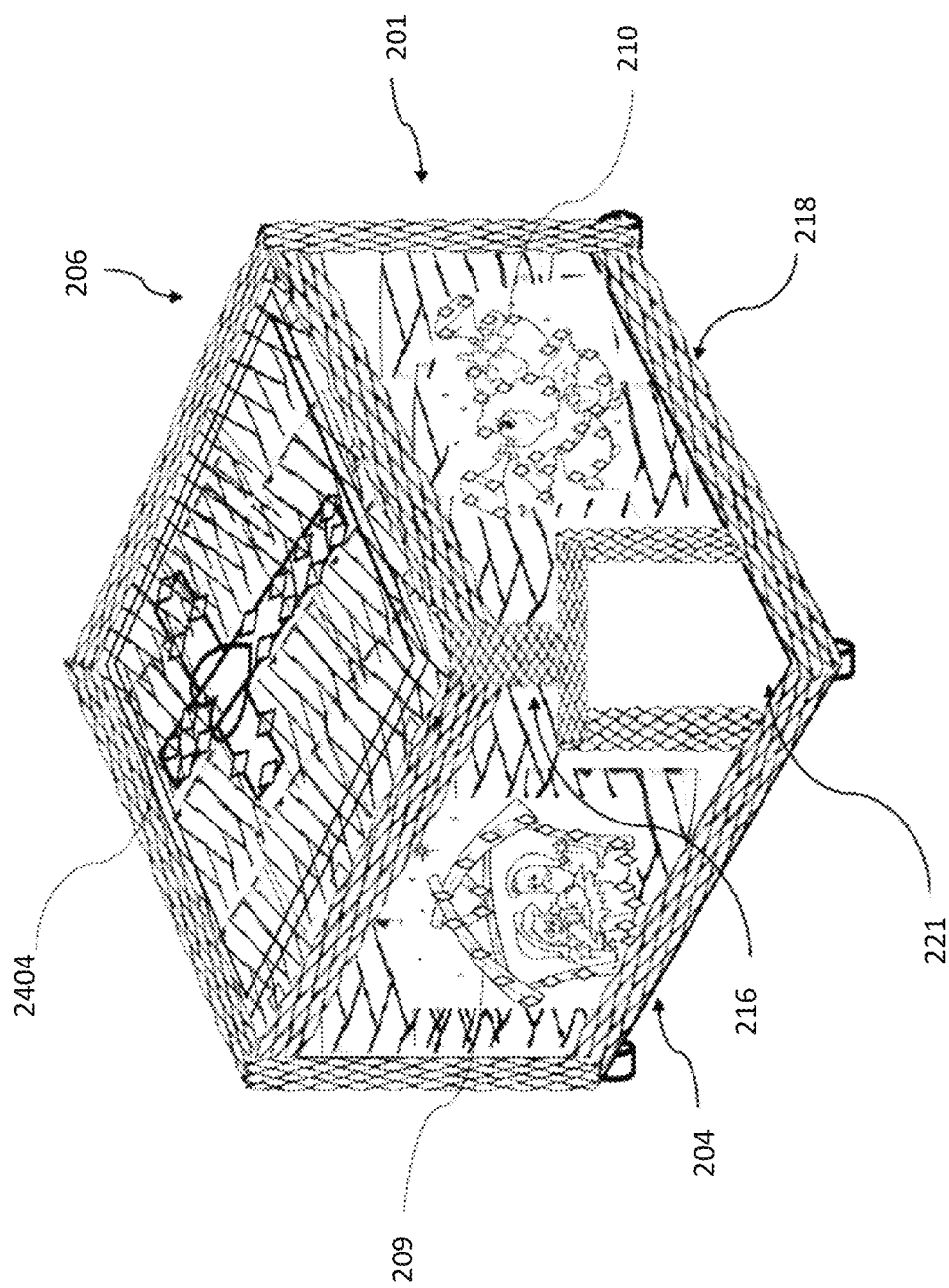
FIG. 43 is a front perspective view of an assembled bottom hut of the simulated Ghana Christmas hut, in accordance with some embodiments.

FIG. 43 is a front perspective view of an assembled bottom hut (bottom hut 201) of the simulated Ghana Christmas hut 200, in accordance with some embodiments.

Figure 44:
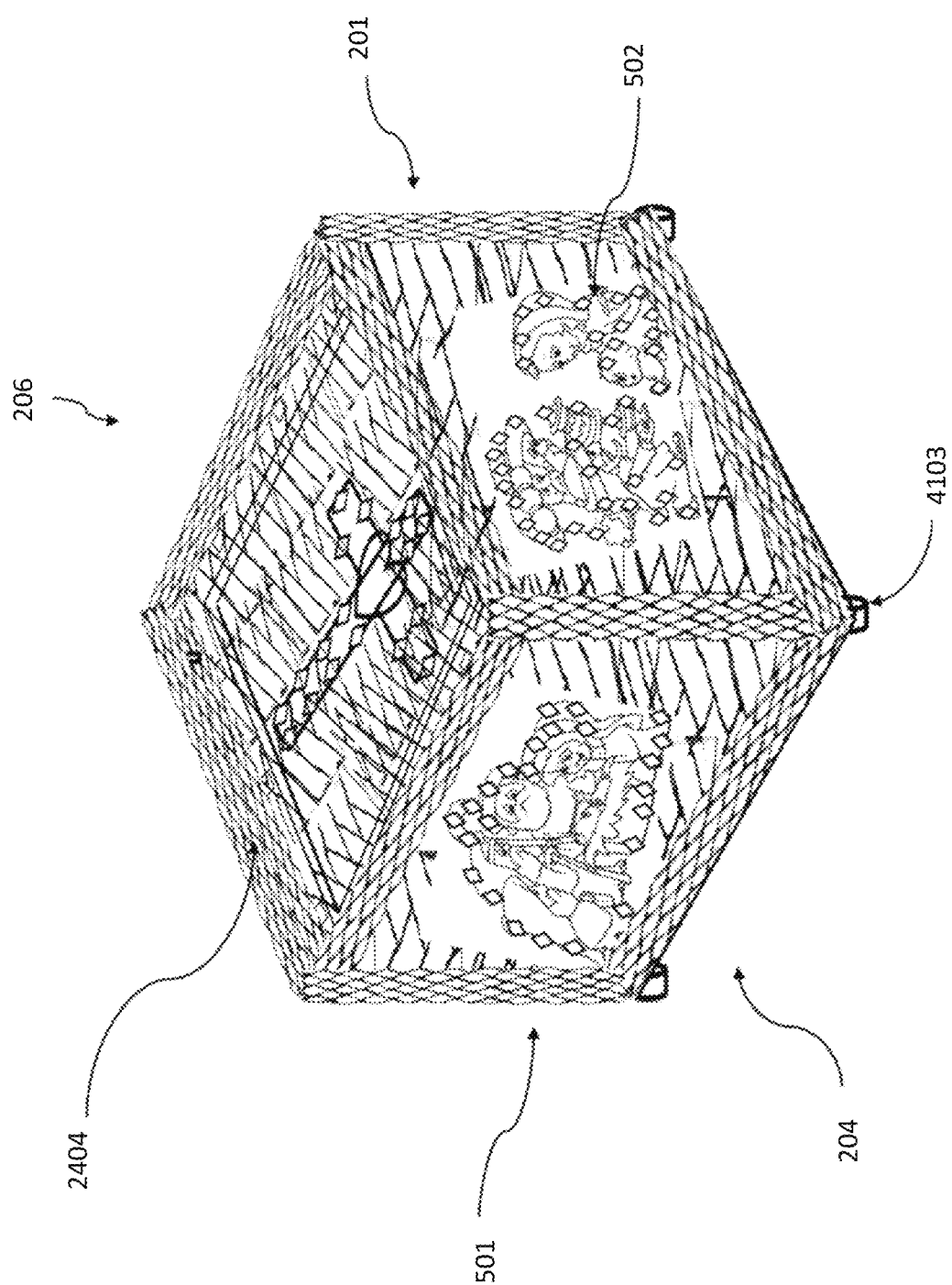
FIG. 44 is a rear perspective view of the assembled bottom hut of the simulated Ghana Christmas hut, in accordance with some embodiments.

FIG. 44 is a rear perspective view of the assembled bottom hut of the simulated Ghana Christmas hut 200, in accordance with some embodiments.

Figure 45:
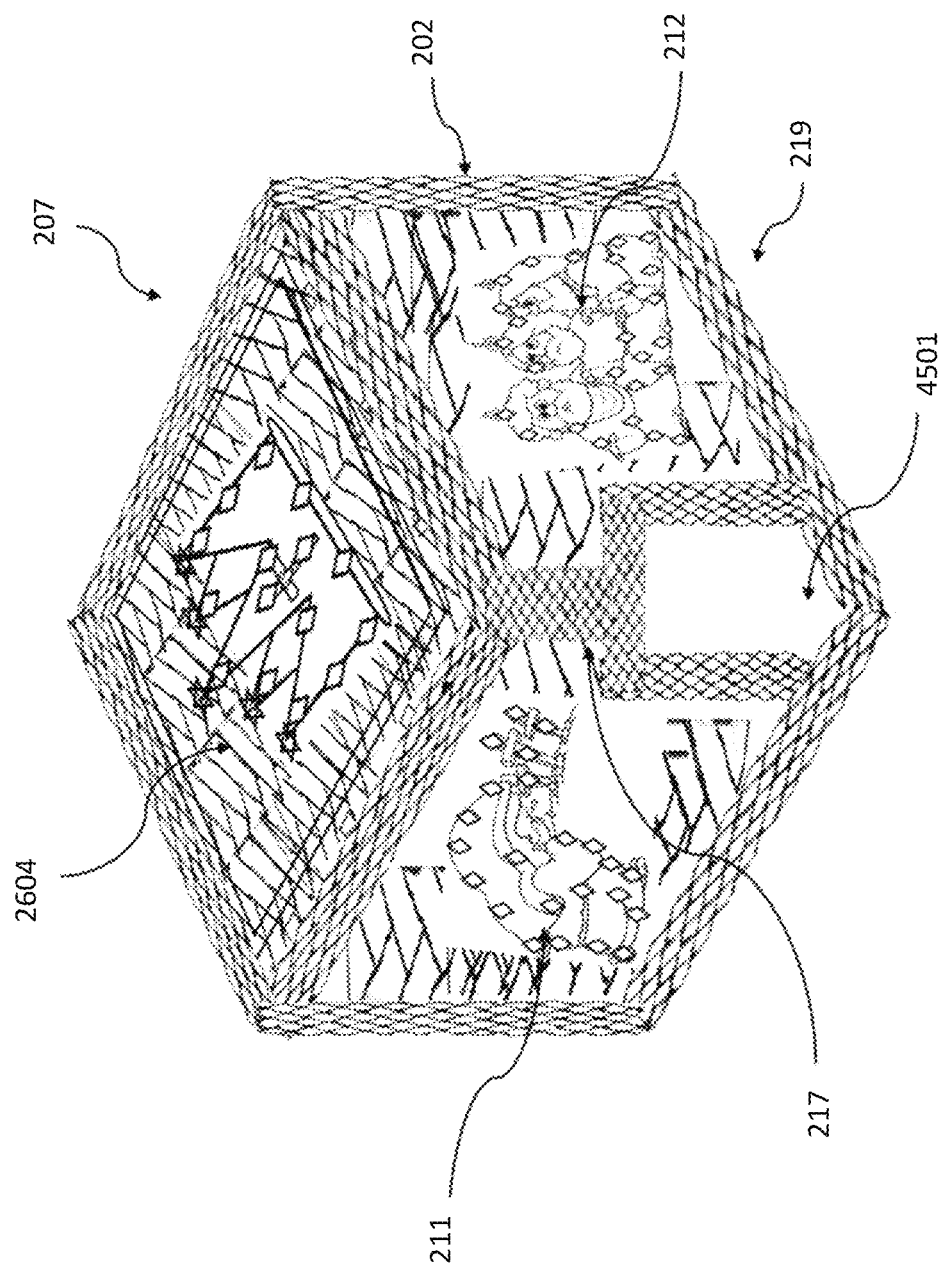
FIG. 45 is a front perspective view of an assembled middle hut of the simulated Ghana Christmas hut, in accordance with some embodiments.

FIG. 45 is a front perspective view of an assembled middle hut (middle hut 202) of the simulated Ghana Christmas hut 200, in accordance with some embodiments. Further, FIG. 45 is an assembled view of the middle hut 202.

Figure 46:
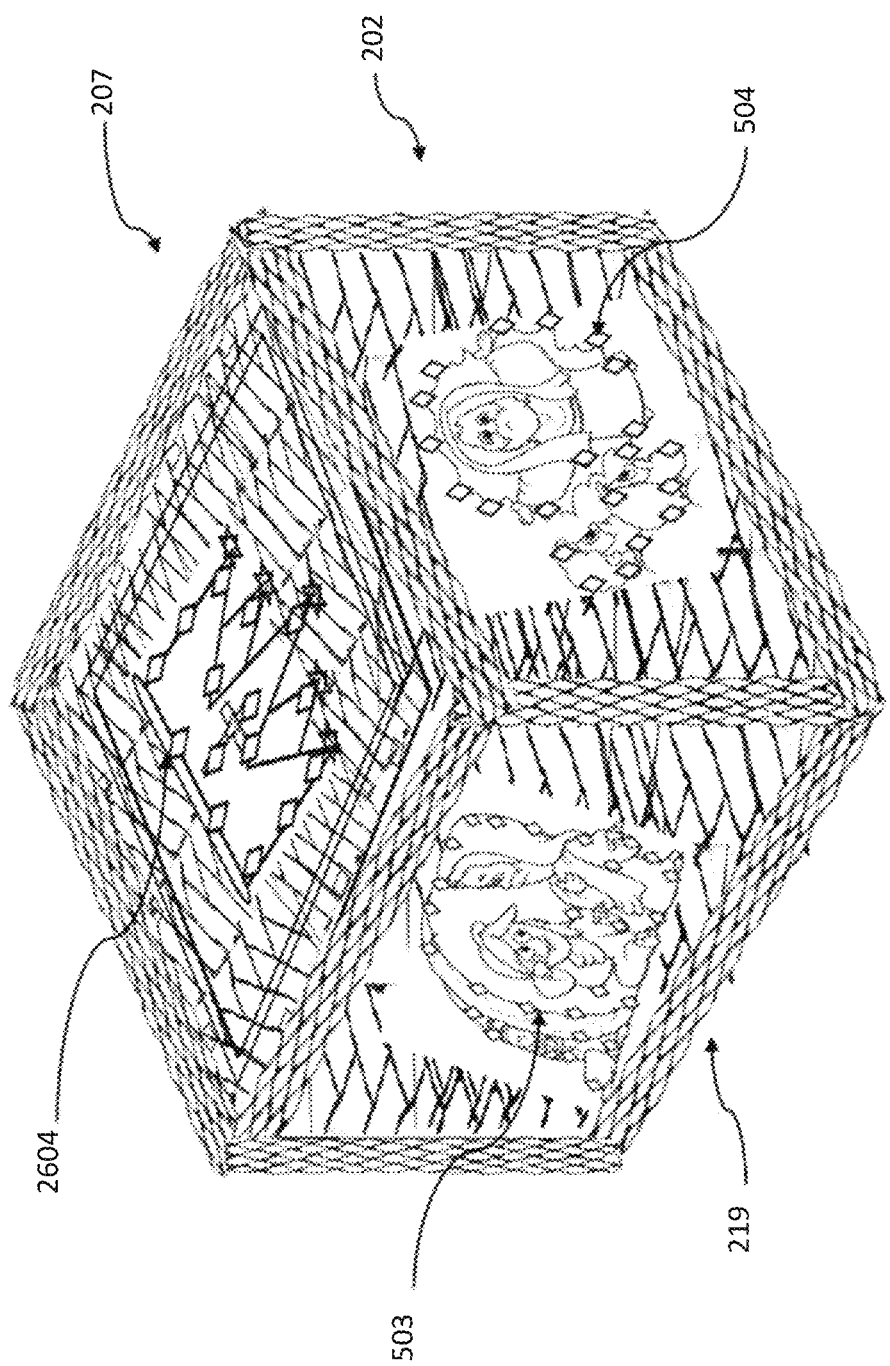
FIG. 46 is a rear perspective view of the assembled middle hut of the simulated Ghana Christmas hut, in accordance with some embodiments.

FIG. 46 is a rear perspective view of an assembled middle hut of the simulated Ghana Christmas hut 200, in accordance with some embodiments.

Figure 47:
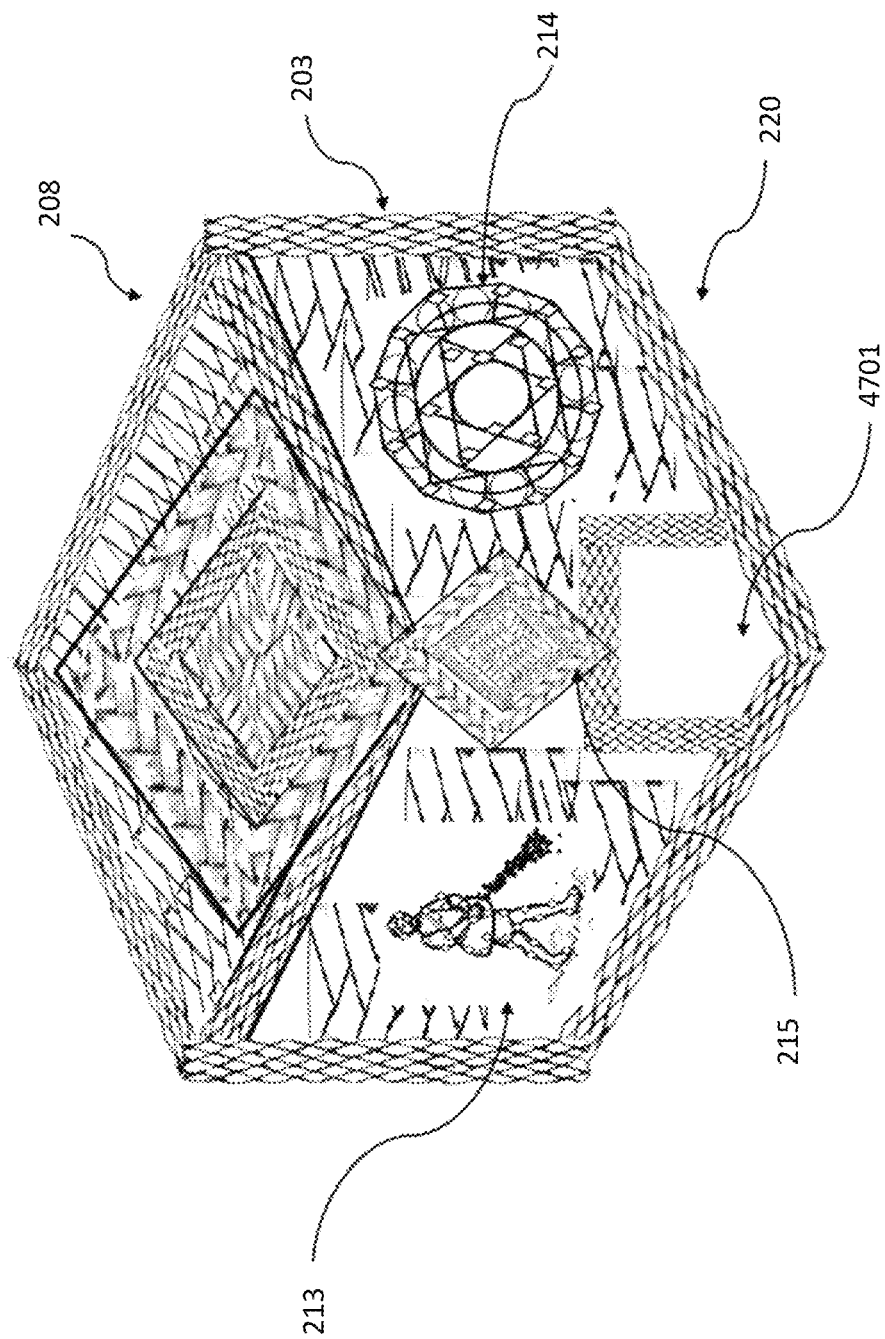
FIG. 47 is a front perspective view of an assembled top hut of the simulated Ghana Christmas hut, in accordance with some embodiments.

FIG. 47 is a front perspective view of an assembled top hut (top hut 203) of the simulated Ghana Christmas hut 200, in accordance with some embodiments.

Figure 48:
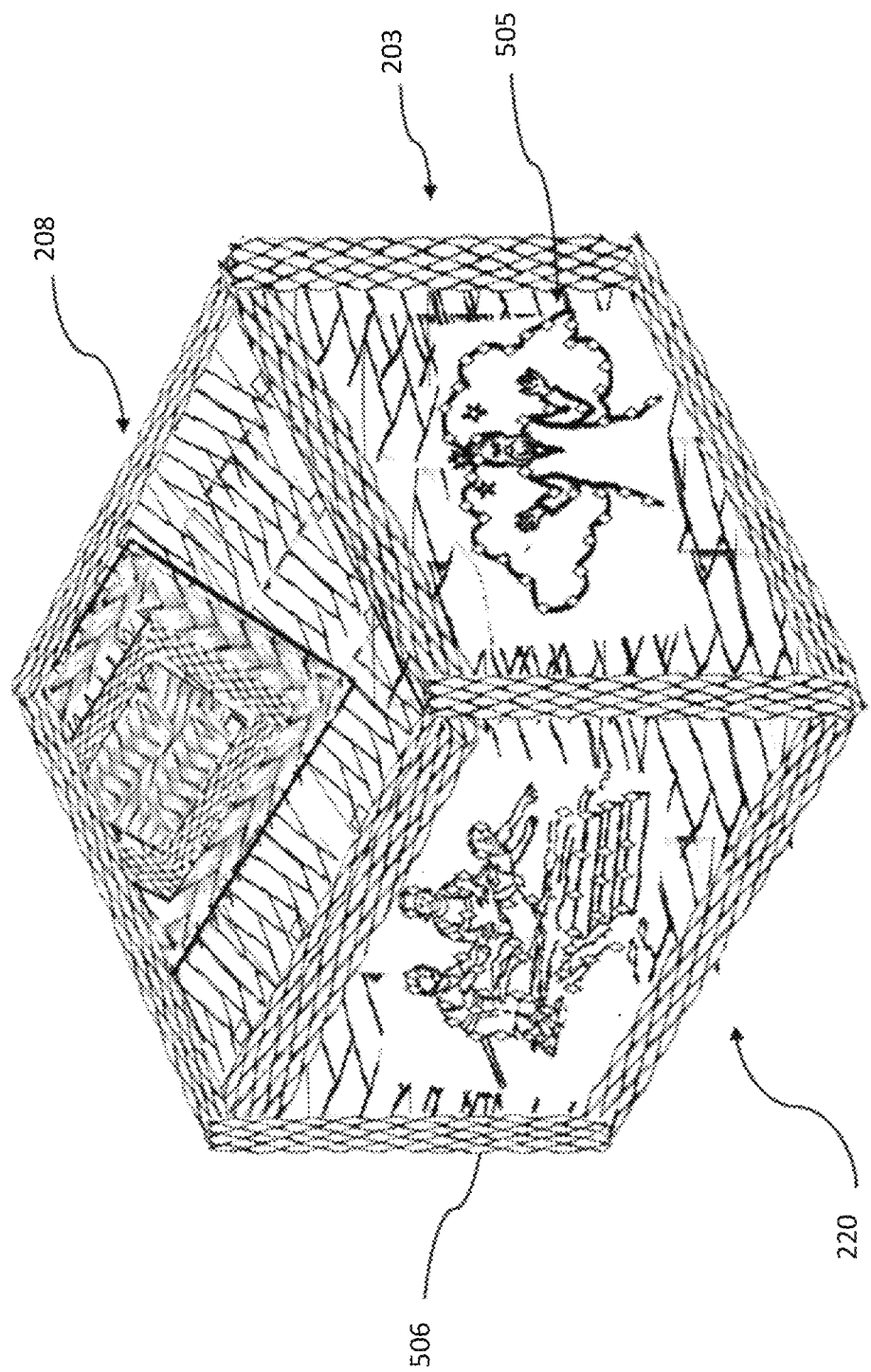
FIG. 48 is a rear perspective view of the assembled top hut of the simulated Ghana Christmas hut, in accordance with some embodiments.

FIG. 48 is a rear perspective view of the assembled top hut of the simulated Ghana Christmas hut 200, in accordance with some embodiments.

Figure 49:
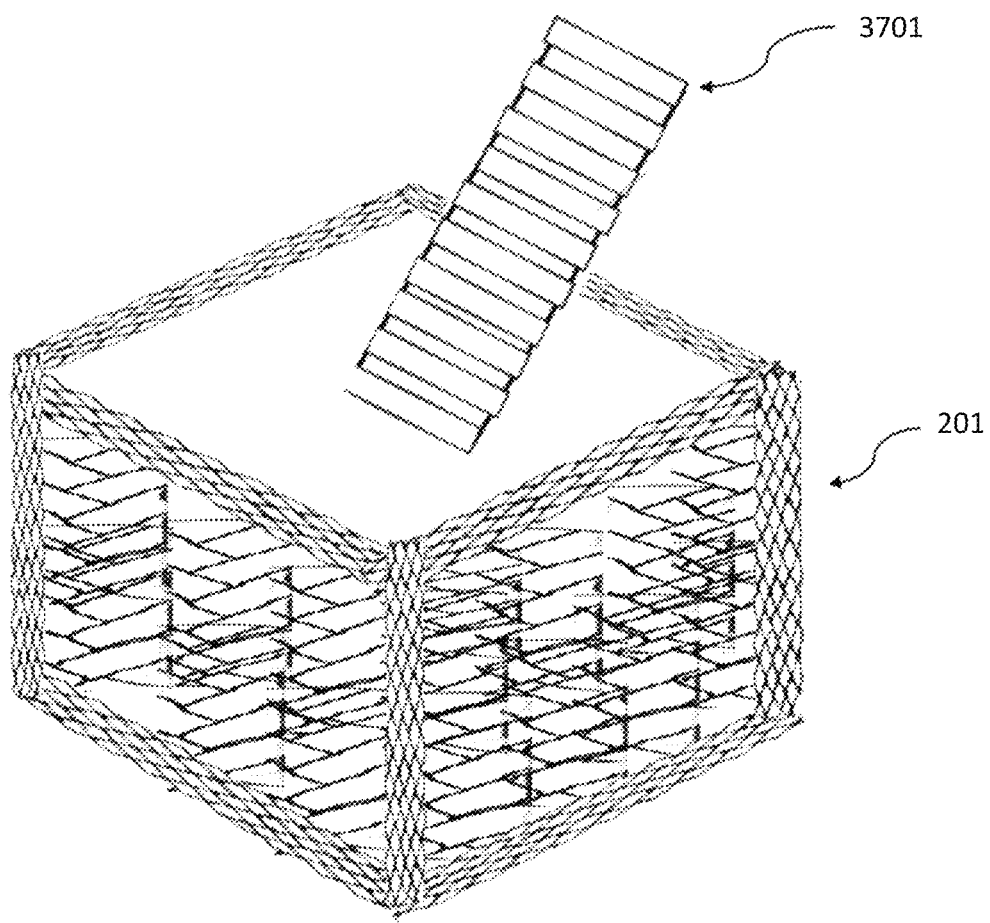
FIG. 49 is an exploded fragmented perspective view of the bottom hut of the simulated Ghana Christmas hut with the staircase, in accordance with some embodiments.

FIG. 49 is an exploded fragmented perspective view of the bottom hut 201 of the simulated Ghana Christmas hut 200 with the staircase 3701, in accordance with some embodiments.

Figure 50:
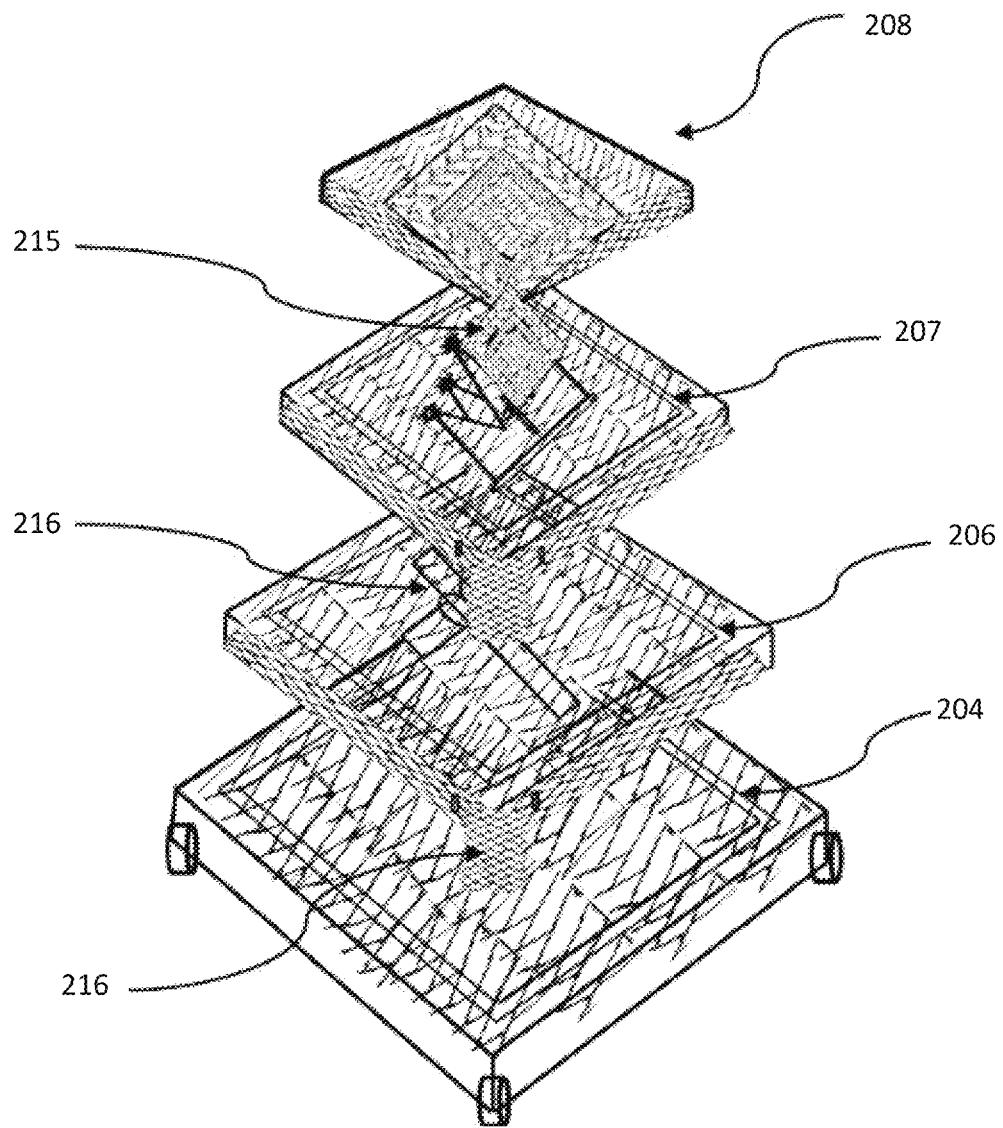
FIG. 50 is an exploded perspective view of the support base structure and woven roofs of the simulated Ghana Christmas hut, in accordance with some embodiments.

FIG. 50 is an exploded perspective view of the support base structure 204 and roofs 206, 207, and 208 of the simulated Ghana Christmas hut 200, in accordance with some embodiments.

Figure 51:
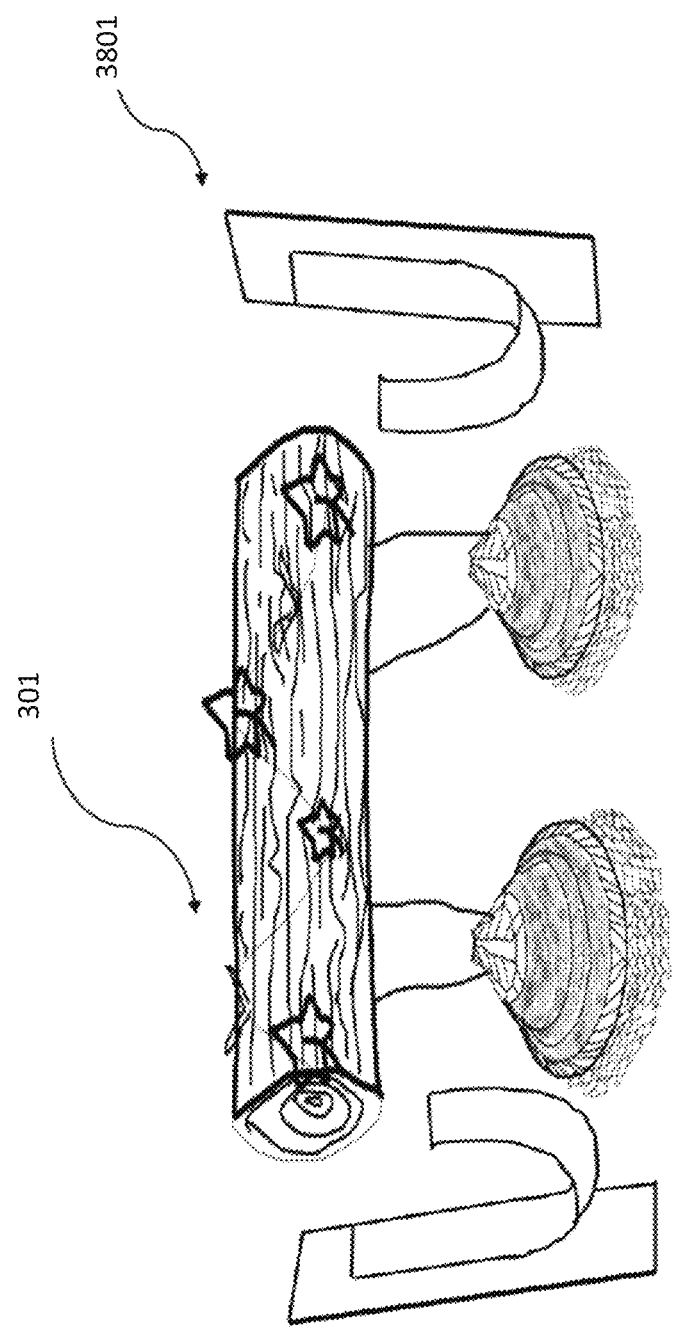
FIG. 51 is an exploded perspective view of a Heche gift log assembly of the simulated Ghana Christmas hut, in accordance with some embodiments.

FIG. 51 is an exploded perspective view of a Heche gift log assembly of the simulated Ghana Christmas hut 200, in accordance with some embodiments.

Figure 52:
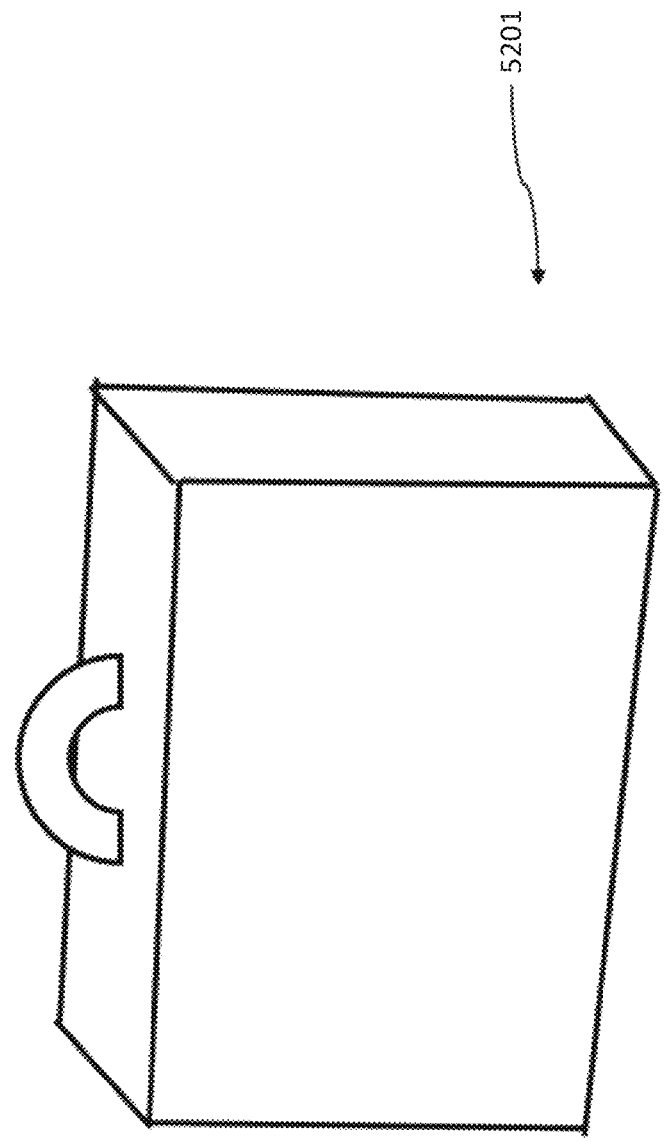
FIG. 52 is a perspective view of a package containing the simulated Ghana Christmas hut, in accordance with some embodiments.

FIG. 52 is a perspective view of a package 5201 containing the simulated Ghana Christmas hut 200, in accordance with some embodiments.

With reference to FIGS. 2-52, the simulated Ghana Christmas Hut 200 may include three main stories (floors, huts, etc.) 201, 202, 203. Further, the huts (201, 202, and 203) may include the bottom hut 201, the middle hut 202, and the top hut 203. Further, the stories 201, 202, and 203 may include a first story 201, a second story 202, and a third story 203. Further, the floors (201, 202, and 203) may include a first floor 201, a second floor 202, and a third floor 203. Further, a diamond-shaped fascia (woven diamond shaped fascia) hangs over the top of the door jamb of the top hut 203 as a crown molding or fascia. Further, the huts (201, 202, and 203) may be supported on a frame (a base structure, a support base structure, etc.) 204 with decorations such as the Heche gift log 301 at the entrances of the first story 201 and the second story 202. Further, the Hechebi Christmas figurine 401 guards the entrance of the first floor 201. Further, the three main floors 201, 202, and 203 are coupled. Further, the three main floors 201, 202, and 203 are assembled in an order. Further, each of the unfolded walls of the three stories 201, 202, and 203, and their flipsides 701, 702, and 703 may include pockets 704, 705, and 706 through which posts 2801 are inserted for coupling the support base structure 204 with the roofs 206, 207, and 208. Further, the unfolded walls of the three stories 201, 202, and 203 are woven walls. Further, the woven walls may be associated with a weaving pattern. Further, the roofs 206, 207, and 208 may include the bottom roof (first-floor roof) 206 associated with the bottom hut 201, the middle roof (second floor roof) 207 associated with the middle hut 202, and the top roof (third floor roof) 208 associated with the top hut 203. Further, the roofs 206, 207, and 208 may include woven roofs. Further, the woven roofs may be associated with weaving pattern. Further, each of the bottom roof 206, the middle roof 207, and the top roof 208 may include a frame with ultra stacking ledges around a perimeter of each of the bottom roof 206, the middle roof 207, and the top roof 208 and corner snaps. Further, the bottom roof 206 becomes the floor of the second story 202, and middle roof 207 becomes the floor of the third story 203.

Further, the simulated Ghana Christmas Hut 200 may interweave various patterns of nativity scenes 209, 210, 501, 502, church scenes 211, 212, 503, 504, and New Jerusalem scenes 213, 214, 505, and 506 into the hut walls (woven hut walls). Further, the woven scenes are interwoven into walls (woven walls) of all three stories 201, 202 and 203. Further, the roofs 206, 207, and 208 cover the huts 201, 202, and 203. The bottom hut 201 and its roof 206 are the largest of the three huts 201, 202, and 203 and roofs 206, 207, and 208; the middle hut 202 and its roof 207 are smaller in size than the bottom hut 201, and the top hut 203 and its roof 208 are the smallest in size. Further, the incorporated woven scenes and objects may vary in colors and shapes, however, including suitable future alternative embodiments. The roof 208 is a sloping roof from three corners toward the front corner made of a combination of weaving patterns.

The support base structure 204 is a one-piece frame, consisting of a bed 205, corner snaps 4102, wheels 4103, and brakes 4104. Upon the bed 205 are ultra-stacking ledges 4101. The support base structure 204 is comprised of any suitable materials for example plastics, wood, cork, fibers, a combination, or materials now available or yet to be invented.

To assemble the first floor 201, the collapsible hut or it unfolded form is perimetered into ultra-stacking ledges 4101 on the base structure 204 to form a hut with an entrance 221. The ultra-stacking ledges 4101 runs along all four edges of the support base structure 204. In this case, all walls of bottom hut 201 flush with all edges of the support base structure 204. In the instant embodiment, three posts 2801 are respectively inserted through a pocket 704 into corner snaps 4102 on the support base structure 204 to strengthen and properly align corners of the bottom hut 201 to corners of the support base structure 204. The corner snaps 2502 on a flipside 2501 of the bottom roof 206 is snapped onto tops of corner posts of the three posts 2801 to properly secure the bottom roof 206 on the bottom hut 201. A rectangular fascia 216 is affixed by a fastener to the front of the bottom roof 206 to complete the installation of the bottom roof 206. A woven skirt 218 is wrapped around the perimeter of the support base structure 204 to complete the assembly of the first floor 201. The material for the skirt 218 must be a softer material of simulated freshly woven coconut fronds and/or palm branches which can be easily wrapped around the support base structure 204. It may be desirable to be able to move the hut or rearrange its position in a space. For this purpose, four wheels 4103, of only which only three and indicated by reference are rotatably secured to the support base structure 204. It may also be desirable to motorize the whole structure, so the various scenes on all walls are visible throughout its installation. The first-floor wall when unfolded converts into wall hangings that display the nativity scenes of the Christmas story for use in homes and public spaces. The dismantle first floor roof when dismantle converts into a wall hanging.

To assemble the second floor 202, the collapsible wall or its unfolded form of the second floor 202 is perimetered into an ultra-stacking ledge 2401 on to form a hut with an entrance. The ultra-stacking ledge 2401 runs along two rear edges on the bottom roof 206 and the other two run a few inches away from the two front edges of the bottom roof 206. Further, the bottom roof 206 may be interwoven with a Cross 2404. In this case, only the two rear walls of the second floor 202 flush with the rear two edges of the bottom hut 201. In the instant embodiment three posts 2801, are respectively inserted through a pocket 705 and secured into corner snaps 2402 to strengthen and properly align the middle hut 202 to a floor structure of the bottom roof 206. The corner snaps 2502 on a flipside 2501 of the middle roof 207 is snapped on top of posts 2801 to secure the roof 207 on the middle hut 202 properly. A rectangular fascia 217 is affixed by a fastener 4001 to the front of the middle roof 207 to complete the installation of the middle roof 207. A woven skirt 219 is wrapped around the perimeter of the floor of the second hut to complete the assembly of the second floor 202.

The material for the skirt 219 must be a softer material of simulated freshly woven coconut which can be easily wrapped around the support base structure 204. The second-floor or the middle hut 202 when unfolded as well as the dismantled roof and the roof (second-floor roof) 207 converts into wall hangings that display church scenes of the Christmas story for everyday use in homes, churches, and public spaces.

The assembled bottom and middle hut structure must remain on a flat surface 222 to assemble the top hut 203. To assemble the top hut 203 box or unfolded wall of the top hut 203 is perimetered into an ultra-stacking ledge 2601 to form a hut with an entrance 4701. The ultra-stacking ledge 2601 runs along two rear edges on the roof 207 and the other two run a few inches away from the two front edges of the roof 207. Further, the roof 207 may include a Crown 2603. In this case, only the two rear walls of the middle hut 202 flushes with the rear two edges of the top hut 203. In the instant embodiment, three posts 2801 are respectively inserted through a pocket 706 into corner snaps 2602 to strengthen and properly align corners of the second floor 202 with the top hut 203 to the floor structure of the roof 207. The corner snaps on a flipside of the top roof 208 are snapped onto the tops of corner posts of the posts 2801 to properly secure the top roof 208 to the top hut 203 properly. Further, a diamond-shaped fascia or molding 215 is affixed by a fastener to the front of the top roof 208 to complete the installation of the top roof 208. A skirt 220 is wrapped around the perimeter of the base of the top hut 203 to complete the assembly of the third floor 203. The material for the skirt 219 must be a softer material of simulated freshly woven coconut which can be easily wrapped around the support base structure 204. The third-floor box in its unfolded form top hut 203 and the dismantled roof (third-floor roof) 208 convert into wall hangings that display New Jerusalem scenes of the Christmas story for everyday use in homes, churches, and public spaces.

When the three huts are completely assembled, Jacob's ladders (staircase) 3701 are placed inside the bottom, middle, and top huts respectively in such a way the top rests in a corner of each hut which has not been shown. Heche gift log 301 is hung between two posts using a self-adhesive hook 2901 at entrances 221 and 4501 of the bottom hut and the middle hut. Further, the Hechebi Christmas figurine 401 is then placed at the entrance 221. Further, a 3D simulated star 223 is installed on the top roof 208. Further, the top roof 208 may include the diamond-shaped fascia/molding 215. Other smaller Christmas decorations like flaming Harmattan angels can be mounted on perimeter snaps 2403 and 2603 along porches running on the two front sides of huts 201 and 202 not shown. Apparently, the structure of the simulated Ghana Christmas hut 200 may be easily installed and dismantled without any tools. Further, the huts 201, 202, and 203 and the roofs 206, 207, and 207 do not need to be packaged after use but can be used as wall art on hallways and rooms. Only the support base structure 204, fascia (216 and 217), and skirts (218, 219, and 220) are packed into the package 5201 and stored away.

Further, the huts are diamond-shaped. Further, the huts may be of other shapes such as a square and triangle, or other polygons.

Further, in some embodiments, any suitable material, natural or simulated, now known or hereafter developed, may be used in forming the simulated Ghana Christmas hut 200. Although the simulated Ghana Christmas hut 200 is rendered in the natural colors of coconut fronds and palm branches, it is apparent that colors of simulated materials for the simulated Ghana Christmas hut 200 is not limited to just the natural colors of the coconut fronds, other colors or a combination of colors may be applied.

Figure 53:
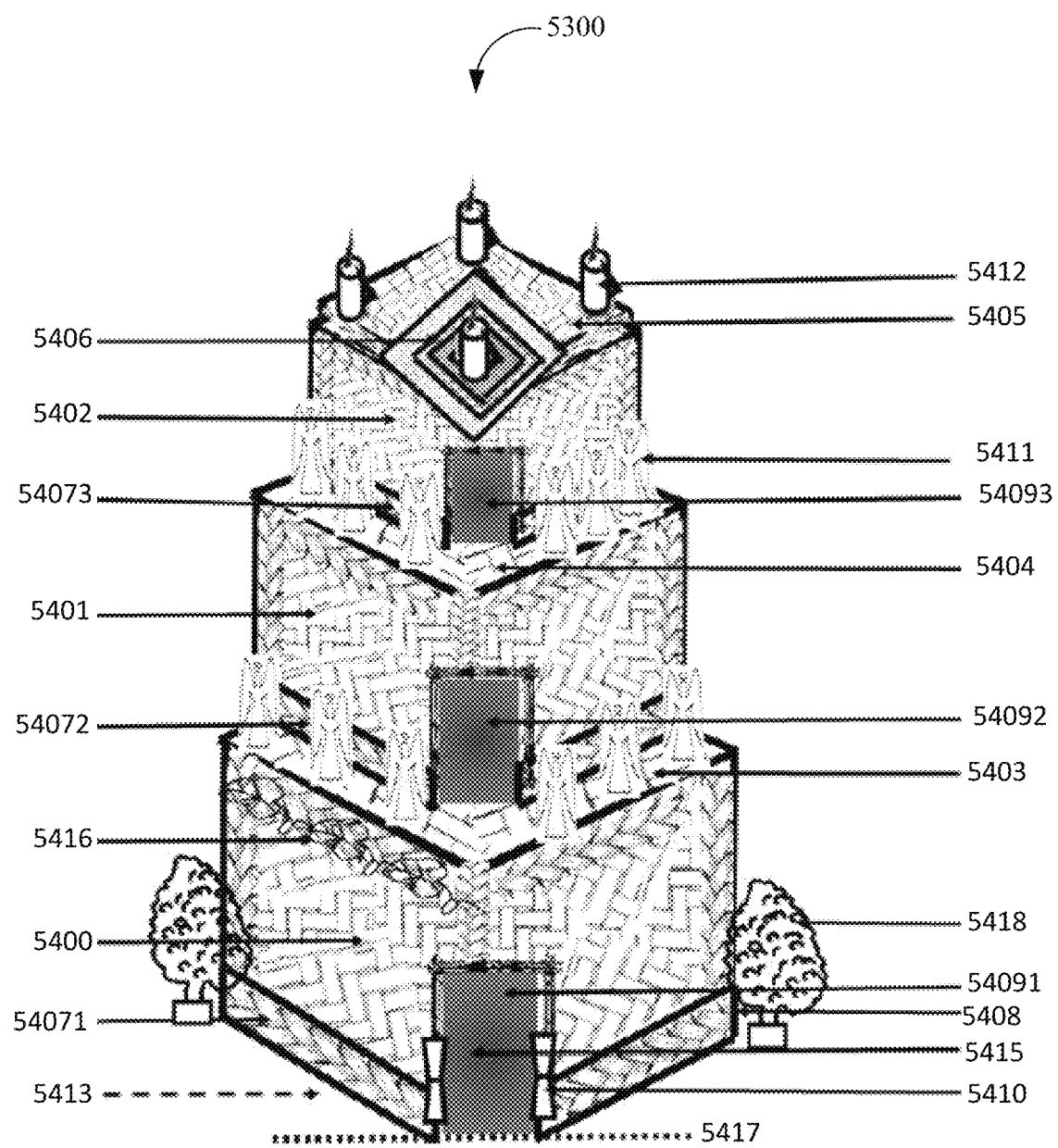
FIG. 53 is a perspective view of a simulated Ghana Christmas hut, in accordance with some embodiments.

FIG. 53 is a perspective view of a simulated Ghana Christmas hut 5300, in accordance with some embodiments.

Figure 54:
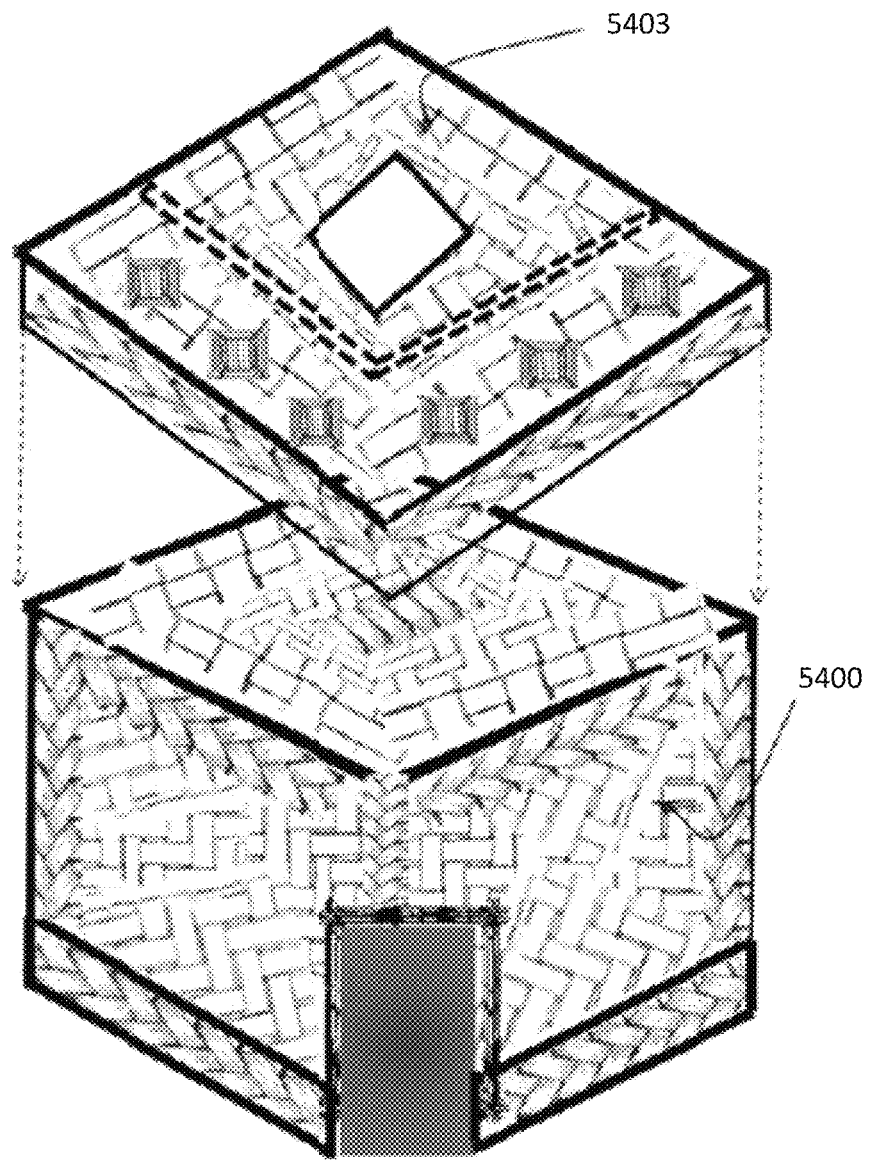
FIG. 54 is an exploded view of assembly of a bottom hut of the simulated Ghana Christmas hut, in accordance with some embodiments.

FIG. 54 is an exploded view of a bottom hut 5400 of the simulated Ghana Christmas hut 5300, in accordance with some embodiments.

Figure 55:
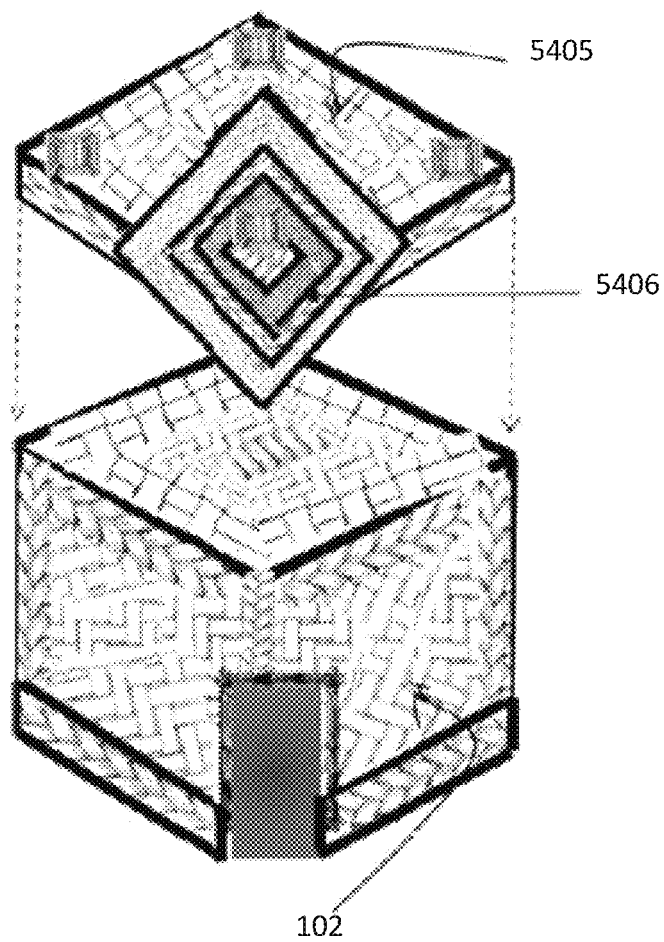
FIG. 55 is an exploded view of assembly of a top hut of the simulated Ghana Christmas hut, in accordance with some embodiments.

FIG. 55 is an exploded view of a top hut 5402 of the simulated Ghana Christmas hut 5300, in accordance with some embodiments.

Figure 56:
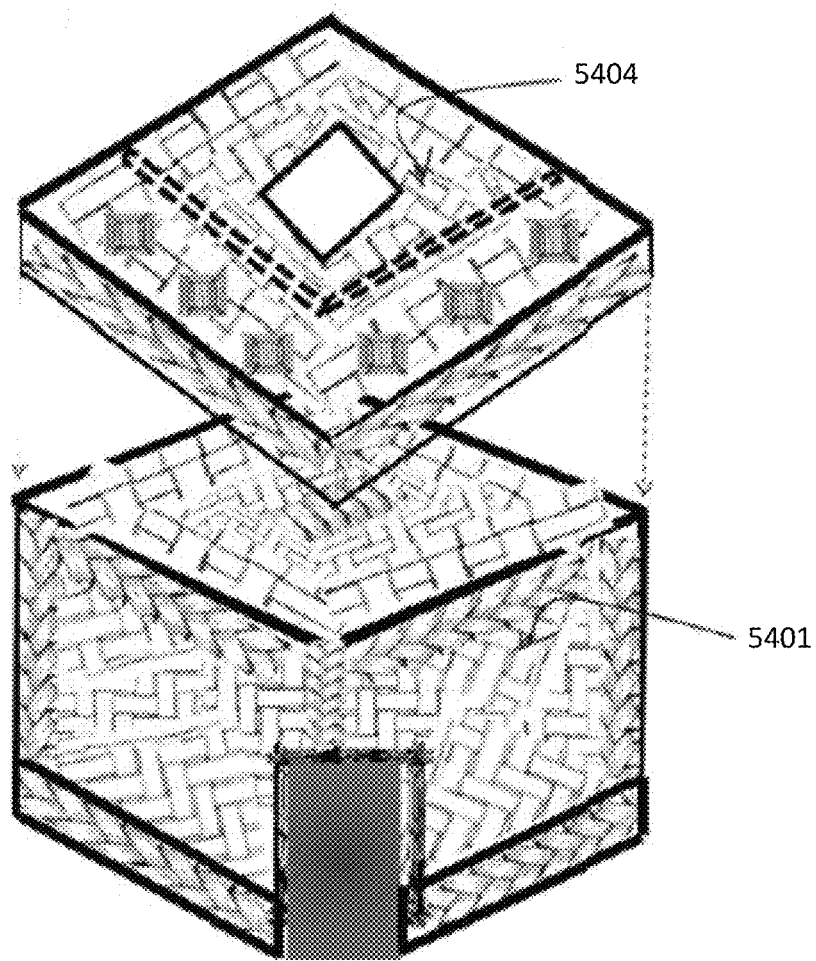
FIG. 56 is an exploded view of assembly of a middle hut of the simulated Ghana Christmas hut, in accordance with some embodiments.

FIG. 56 is an exploded view of a middle hut 5401 of the simulated Ghana Christmas hut 5300, in accordance with some embodiments.

Figure 57:
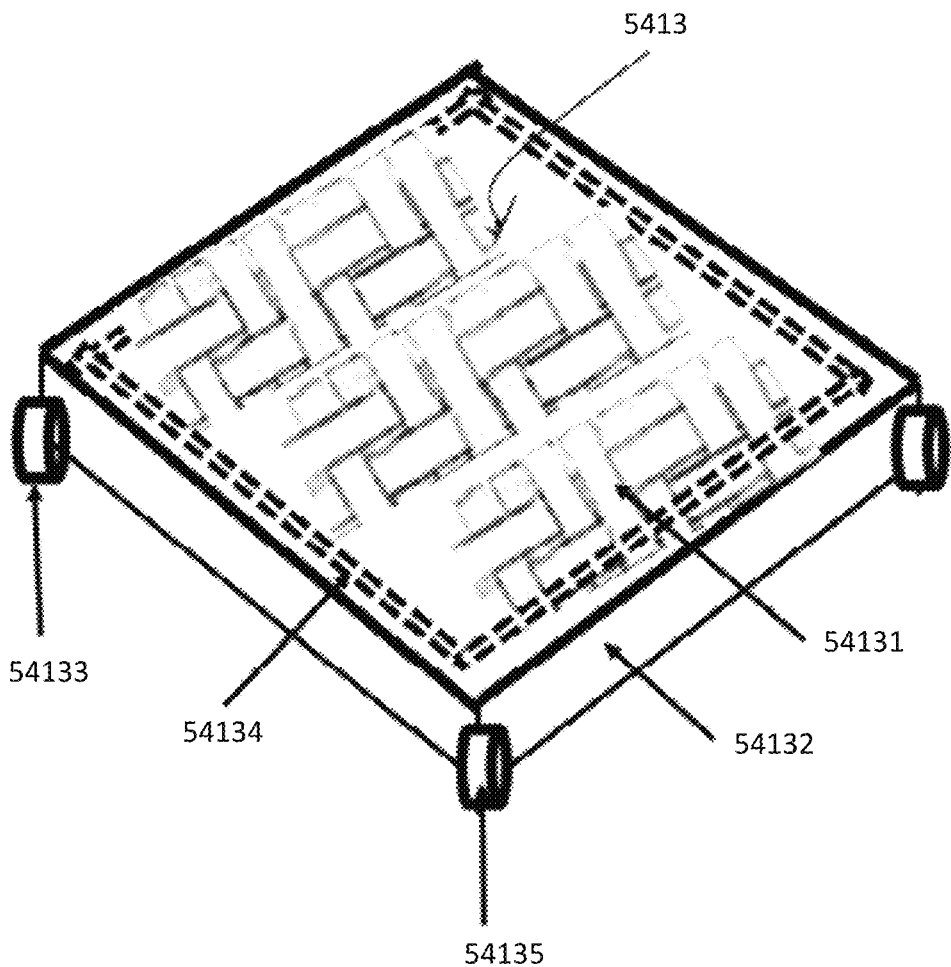
FIG. 57 is a perspective view of a base structure of the simulated Ghana Christmas hut, in accordance with some embodiments.

FIG. 57 is a perspective view of a base structure 5413 of the simulated Ghana Christmas hut 5300, in accordance with some embodiments.

Figure 58:
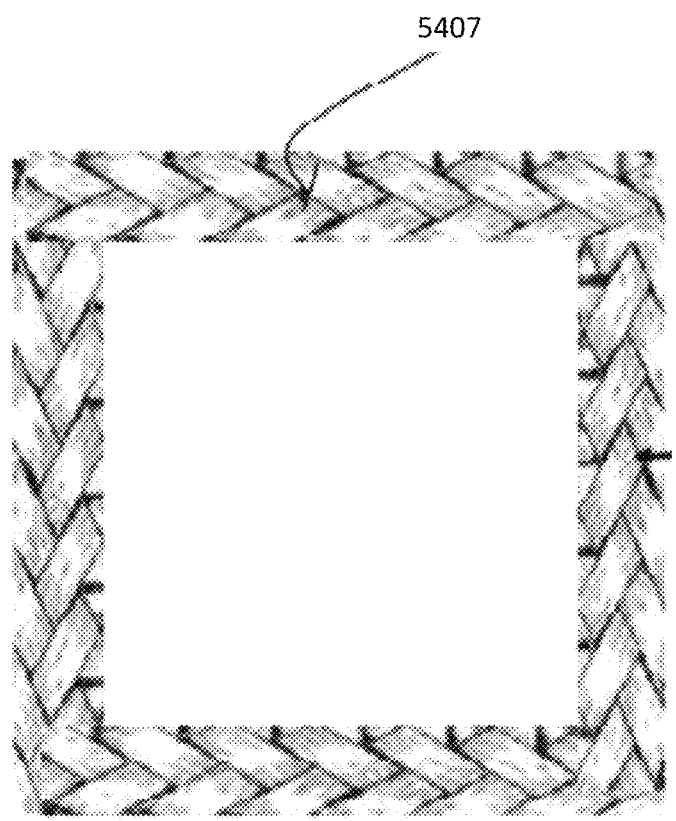
FIG. 58 is a top view of skirtings of the simulated Ghana Christmas hut, in accordance with some embodiments.

FIG. 58 is a top view of skirtings 5407 of the simulated Ghana Christmas hut 5300, in accordance with some embodiments.

Figure 59:
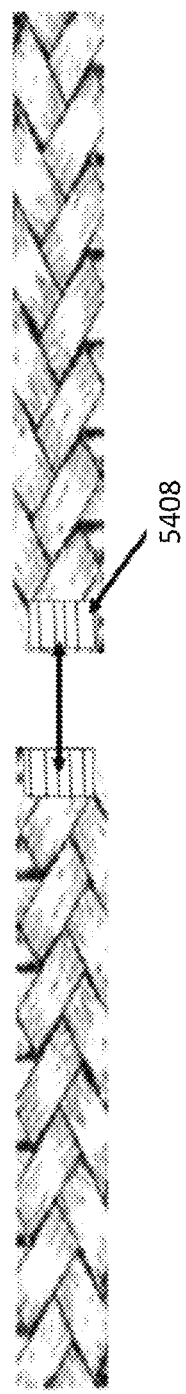
FIG. 59 is a side view of the skirtings, in accordance with some embodiments.

FIG. 59 is a side view of the skirtings 5407, in accordance with some embodiments.

Figure 60:
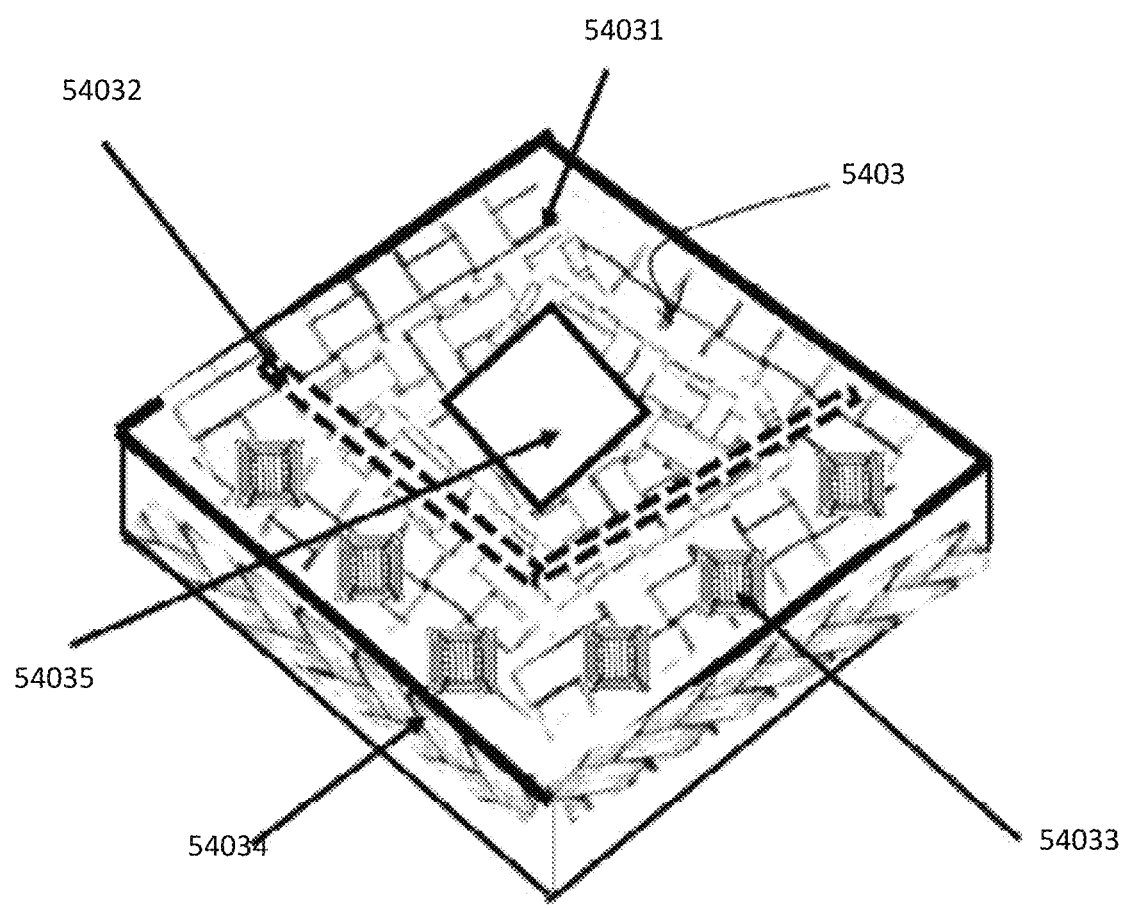
FIG. 60 is a perspective view of a bottom roof structure of the bottom hut, in accordance with some embodiments.

FIG. 60 is a perspective view of a bottom roof structure of the bottom hut 5400, in accordance with some embodiments.

Figure 61:
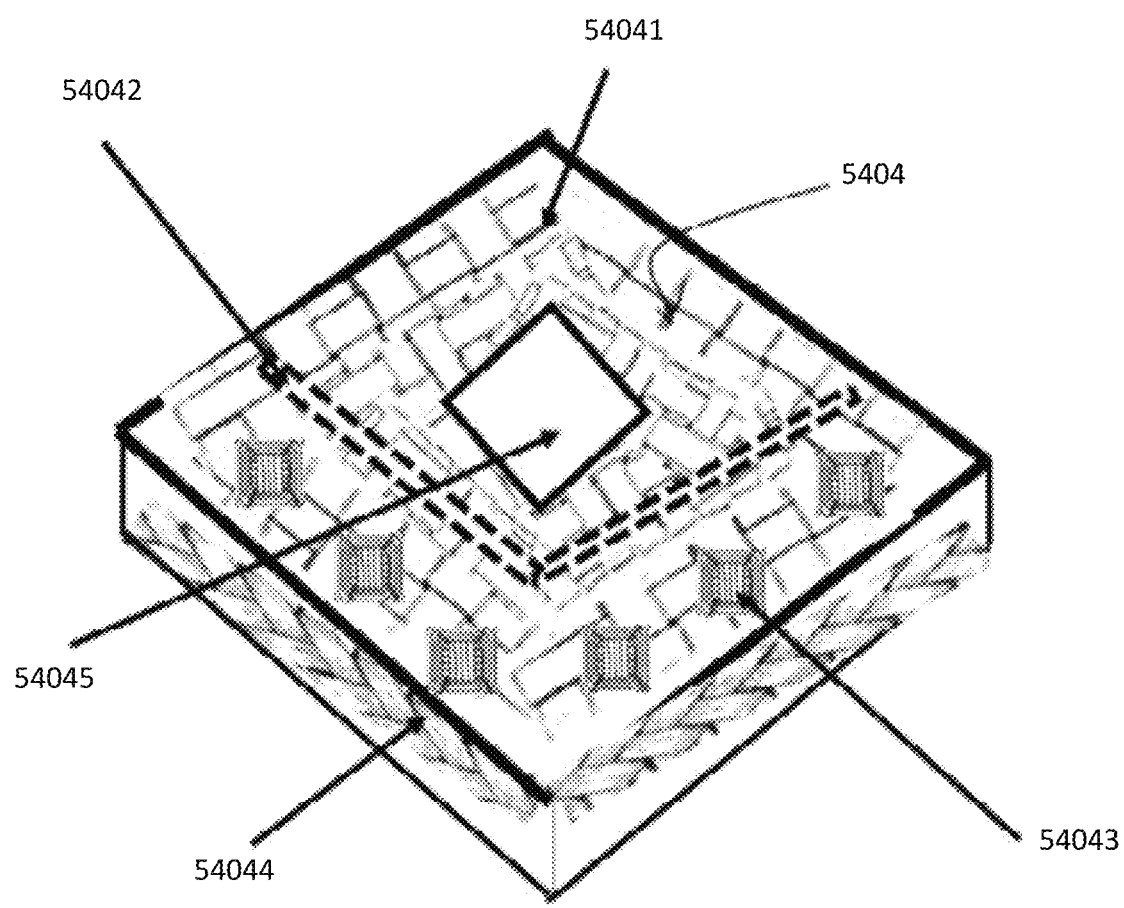
FIG. 61 is a perspective view of a middle roof structure of the middle hut, in accordance with some embodiments.

FIG. 61 is a perspective view of a middle roof structure of the middle hut 5401, in accordance with some embodiments.

Figure 62:
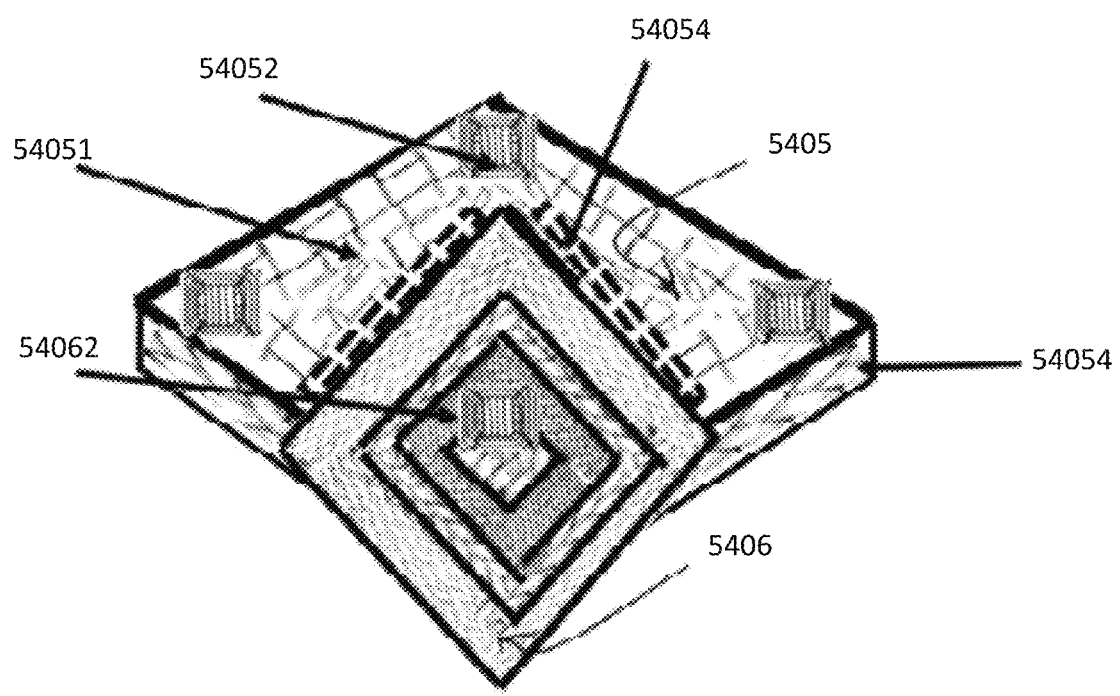
FIG. 62 is a perspective view of a top roof structure of the top hut, in accordance with some embodiments.

FIG. 62 is a perspective view of a top roof structure of the top hut 5402, in accordance with some embodiments.

Figure 63:
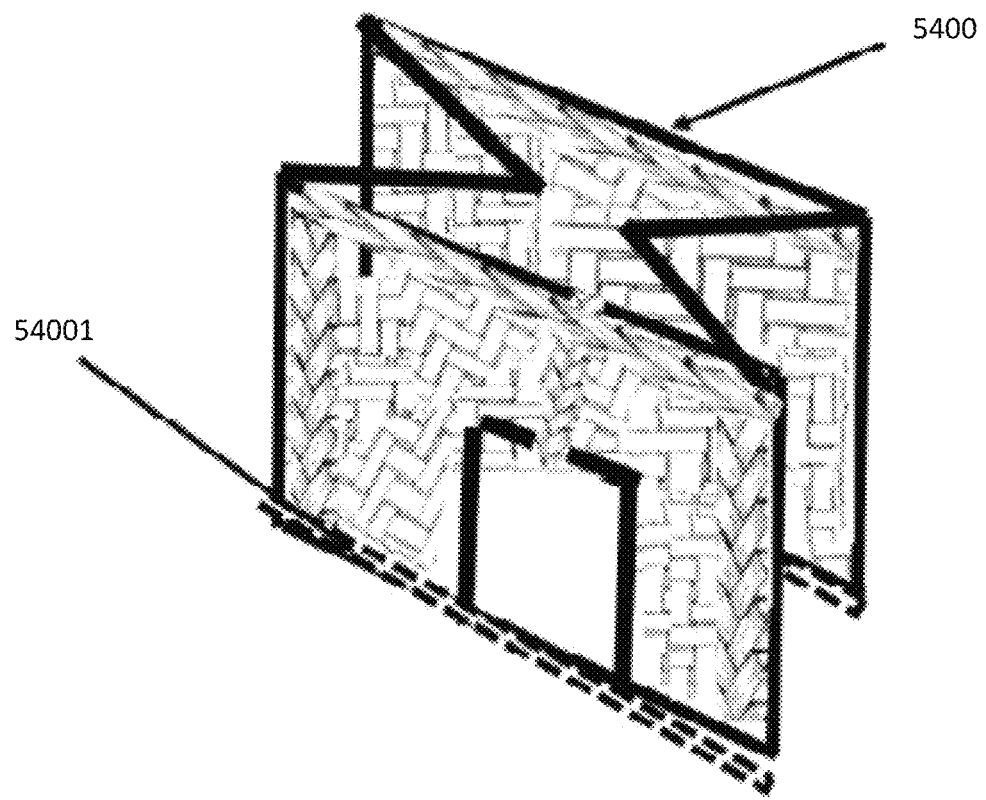
FIG. 63 is a perspective view of a collapsible hut box of the bottom hut, in accordance with some embodiments.

FIG. 63 is a perspective view of a collapsible hut box of the bottom hut 5400, in accordance with some embodiments.

Figure 64:
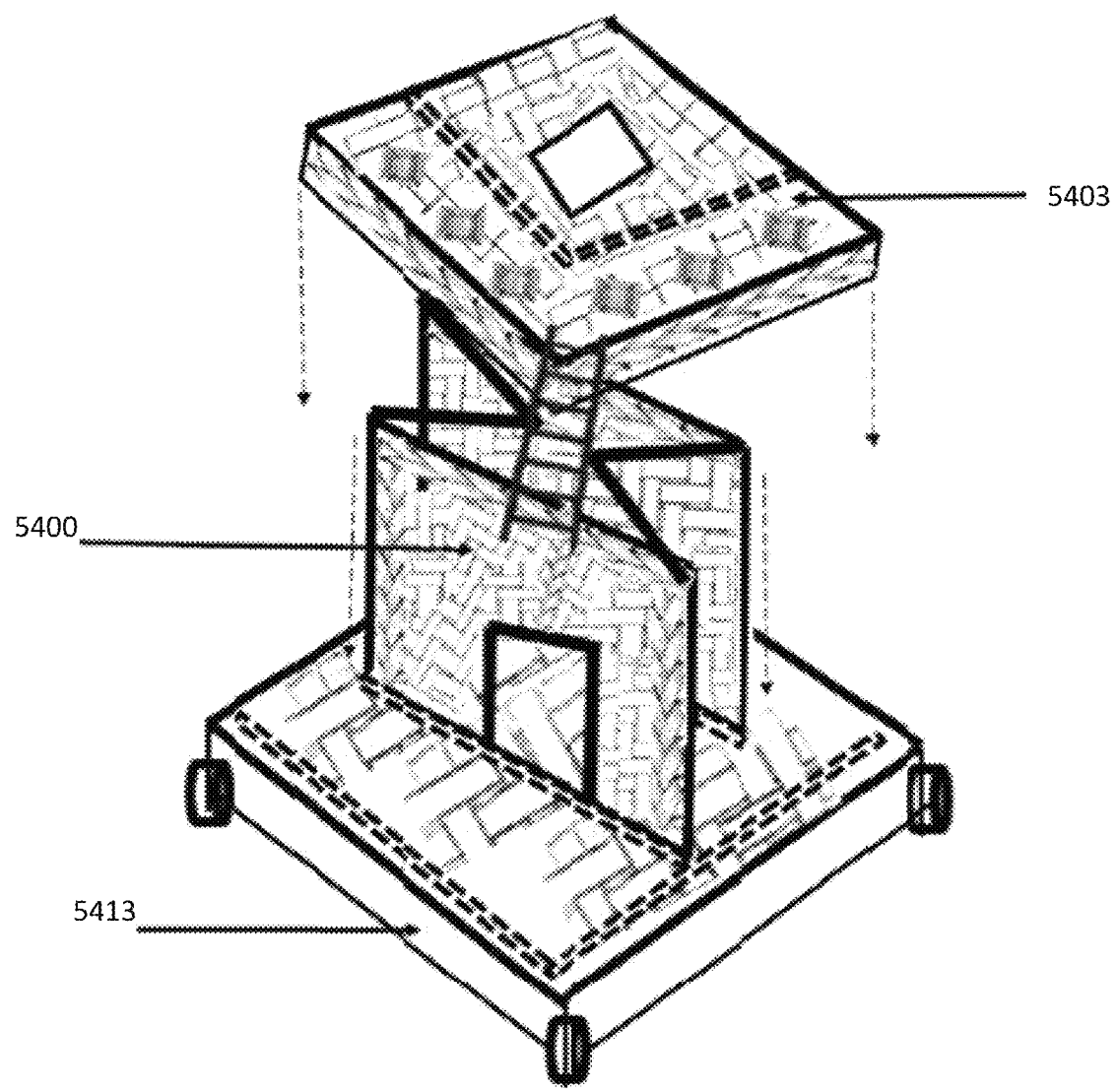
FIG. 64 is a perspective view of the bottom hut in a collapsed state, in accordance with some embodiments.

FIG. 64 is a perspective view of the bottom hut 5400 in a collapsed state, in accordance with some embodiments.

Figure 65:
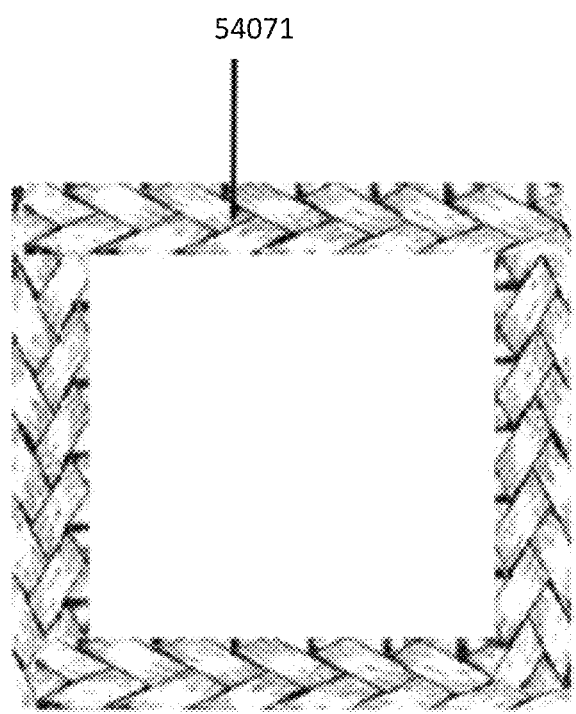
FIG. 65 is a top view of a skirt associated with the bottom hut, in accordance with some embodiments.

FIG. 65 is a top view of a skirt 54071 associated with the bottom hut 5400, in accordance with some embodiments.

Figure 66:
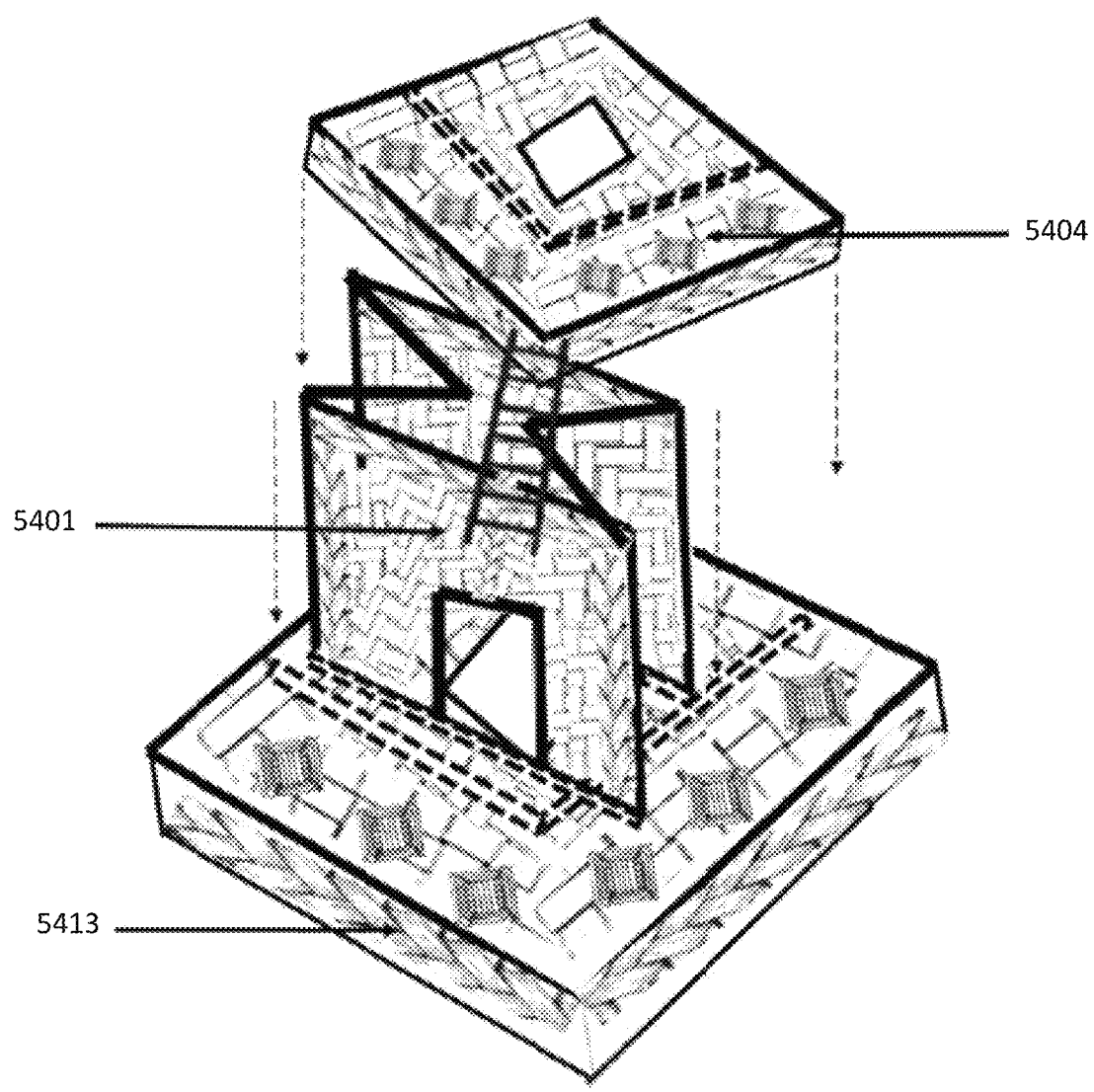
FIG. 66 is a perspective view of the middle hut in a collapsed state, in accordance with some embodiments.

FIG. 66 is a perspective view of the middle hut 5401 in a collapsed state, in accordance with some embodiments.

Figure 67:
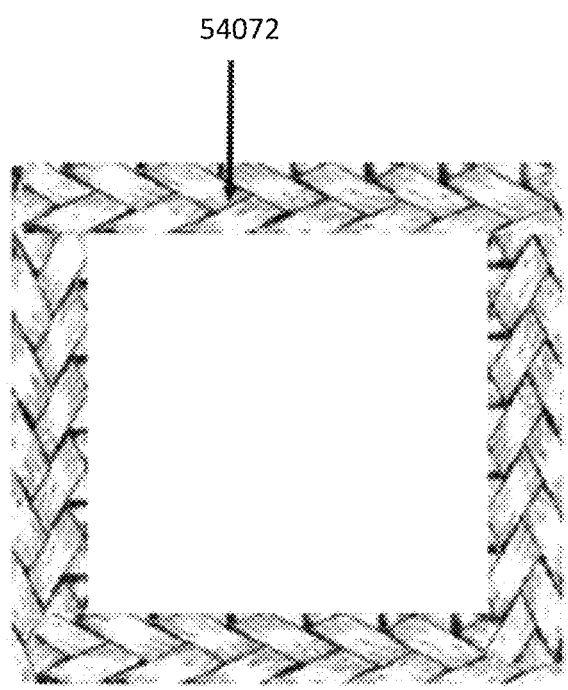
FIG. 67 is a top view of a skirt associated with the middle hut, in accordance with some embodiments.

FIG. 67 is a top view of a skirt 54072 associated with the middle hut 5401, in accordance with some embodiments.

Figure 68:
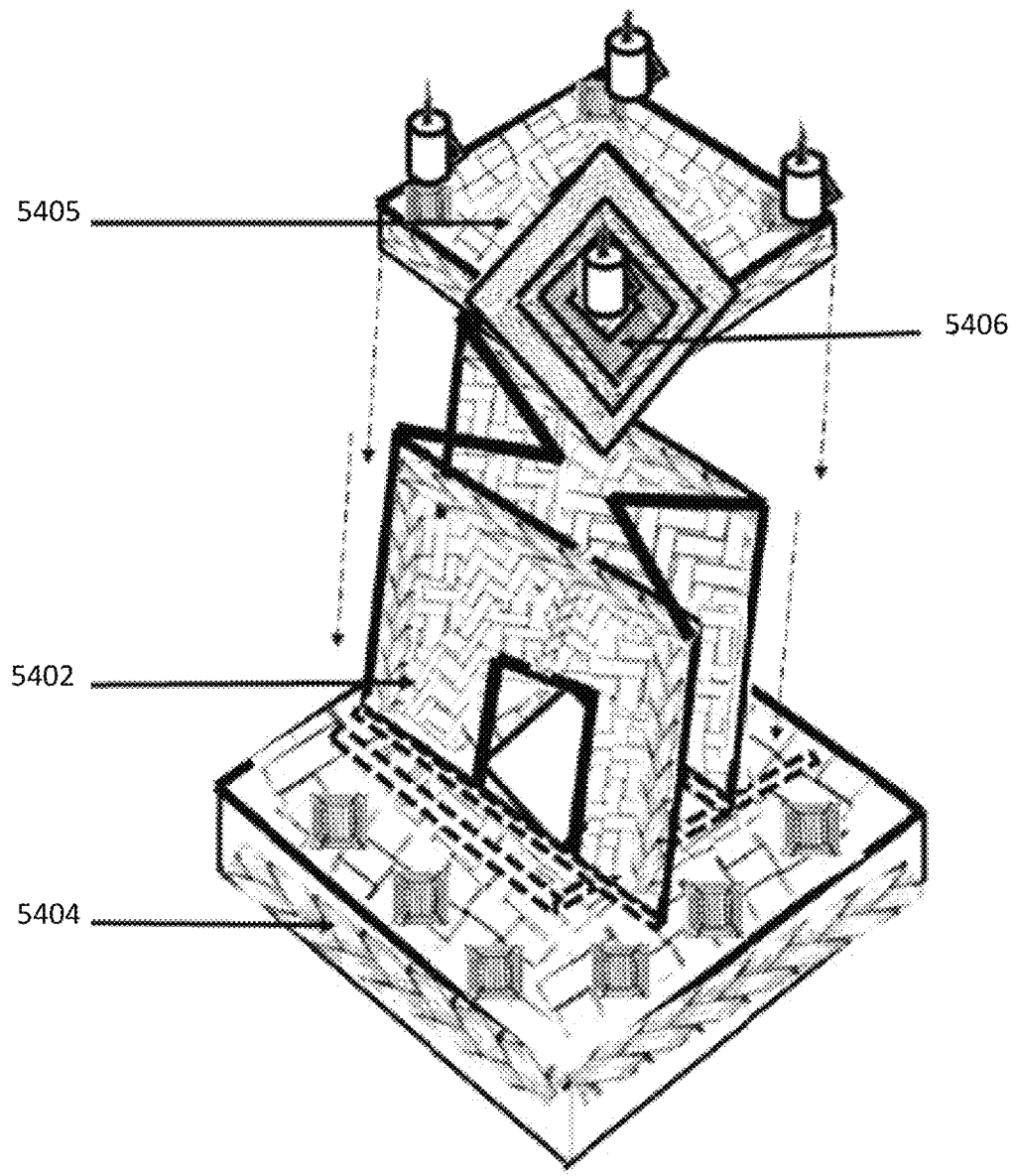
FIG. 68 is a perspective view of the top hut in a collapsed state, in accordance with some embodiments.

FIG. 68 is a perspective view of the top hut 5402 in a collapsed state, in accordance with some embodiments.

Figure 69:
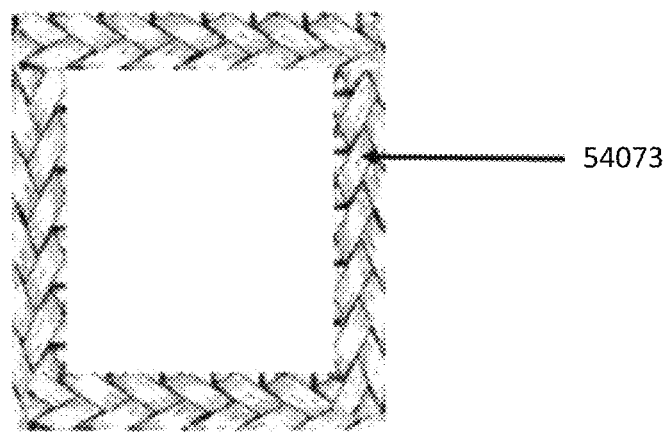
FIG. 69 is a top view of a skirt associated with the top hut, in accordance with some embodiments.

FIG. 69 is a top view of a skirt 54073 associated with the top hut 5402, in accordance with some embodiments.

Figure 70:
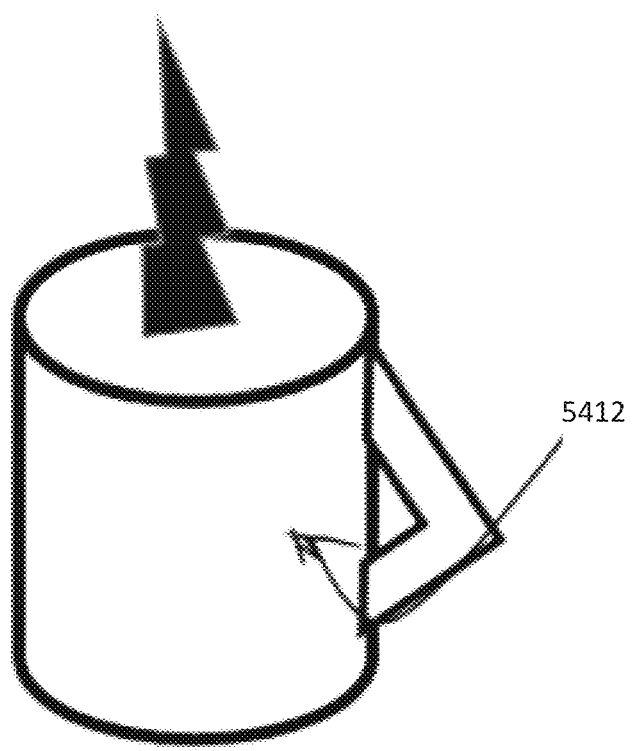
FIG. 70 is a front view of an Osornor Christmas lamp of the simulated Ghana Christmas hut, in accordance with some embodiments.

FIG. 70 is a front view of an Osornor Christmas lamp 5412 of the simulated Ghana Christmas hut 5300, in accordance with some embodiments.

Figure 71:
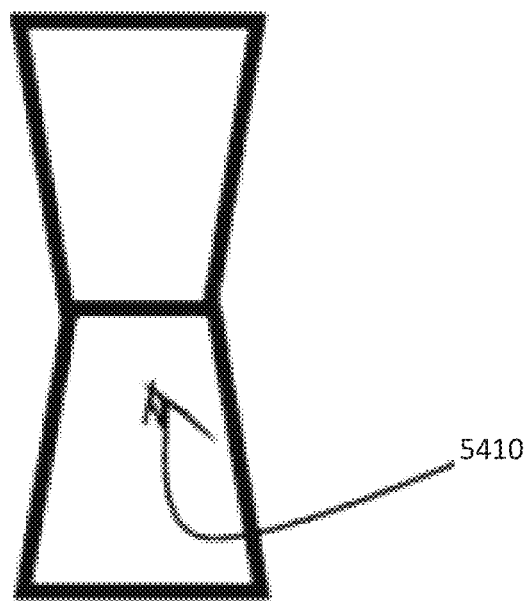
FIG. 71 is a front view of an African drum of the simulated Ghana Christmas hut, in accordance with some embodiments.

FIG. 71 is a front view of an African drum 5410 of the simulated Ghana Christmas hut 5300, in accordance with some embodiments.

Figure 72:
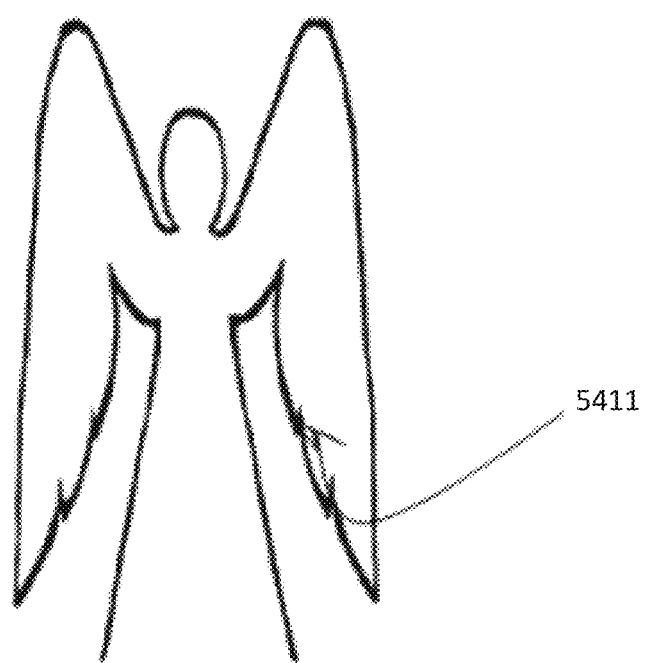
FIG. 72 is a front view of a flaming Harmattan Christmas angel figurine of the simulated Ghana Christmas hut, in accordance with some embodiments.

FIG. 72 is a front view of a flaming Harmattan Christmas angel figurine 5411 of the simulated Ghana Christmas hut 5300, in accordance with some embodiments.

Figure 73:
FIG. 73 is a front view of a Lantikila Christmas wreath ornament of the simulated Ghana Christmas hut, in accordance with some embodiments.

FIG. 73 is a front view of a Lantikila Christmas wreath ornament 5416 of the simulated Ghana Christmas hut 5300, in accordance with some embodiments.

Figure 74:
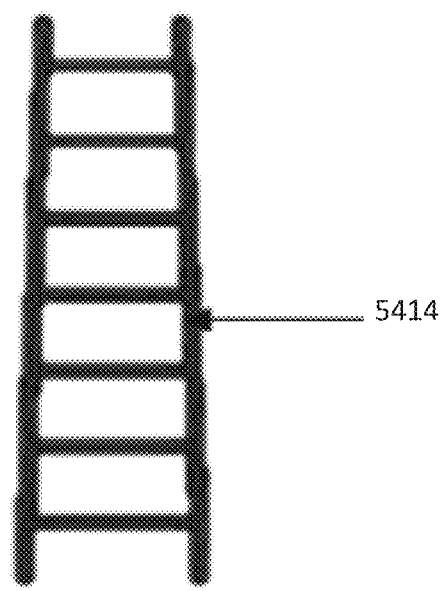
FIG. 74 is a front view of a Jacob's ladder of the simulated Ghana Christmas hut, in accordance with some embodiments.

FIG. 74 is a front view of a Jacob's ladder 5414 of the simulated Ghana Christmas hut 5300, in accordance with some embodiments.

Figure 75:
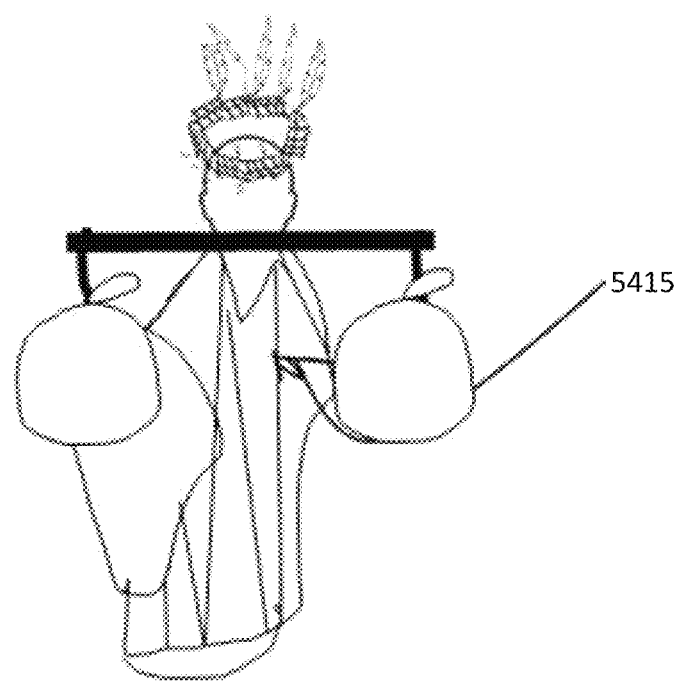
FIG. 75 is a front view of a Hechebi Christmas figurine of the simulated Ghana Christmas hut, in accordance with some embodiments.

FIG. 75 is a front view of a Hechebi Christmas figurine 5415 of the simulated Ghana Christmas hut 5300, in accordance with some embodiments.

Figure 76:
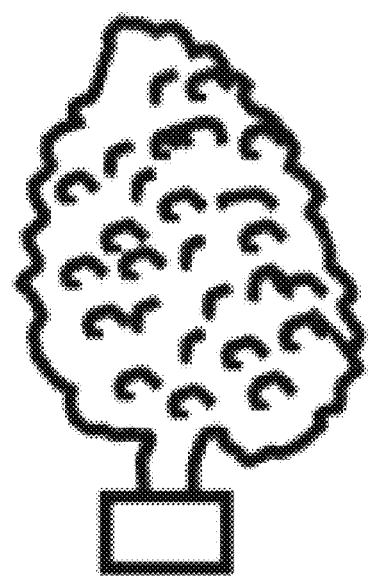
FIG. 76 is a front view of a Lit-able Christmas palm fruit bunch ornament of the simulated Ghana Christmas hut, in accordance with some embodiments.

FIG. 76 is a front view of a Lit-able Christmas palm fruit bunch ornament 5418 of the simulated Ghana Christmas hut 5300, in accordance with some embodiments.

Figure 77:
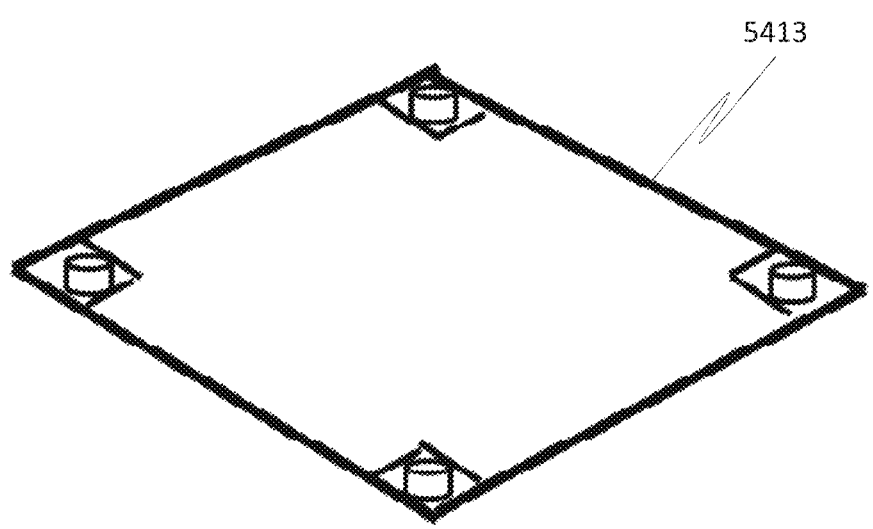
FIG. 77 is a perspective view of the base structure in a storage state, in accordance with some embodiments.

FIG. 77 is a perspective view of the base structure 5413 in a storage state, in accordance with some embodiments.

Figure 78:
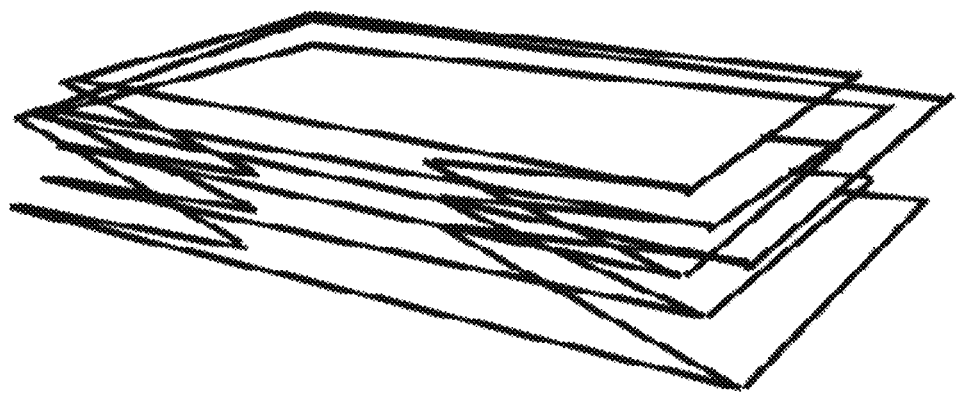
FIG. 78 is a perspective view of collapsible boxes of at least one of the bottom hut, the middle hut, and the top hut in a storage state, in accordance with some embodiments.

FIG. 78 is a perspective view of collapsible boxes of at least one of the bottom hut 5400, the middle hut 5401, and the top hut 5402 in a storage state, in accordance with some embodiments.

Figure 79:
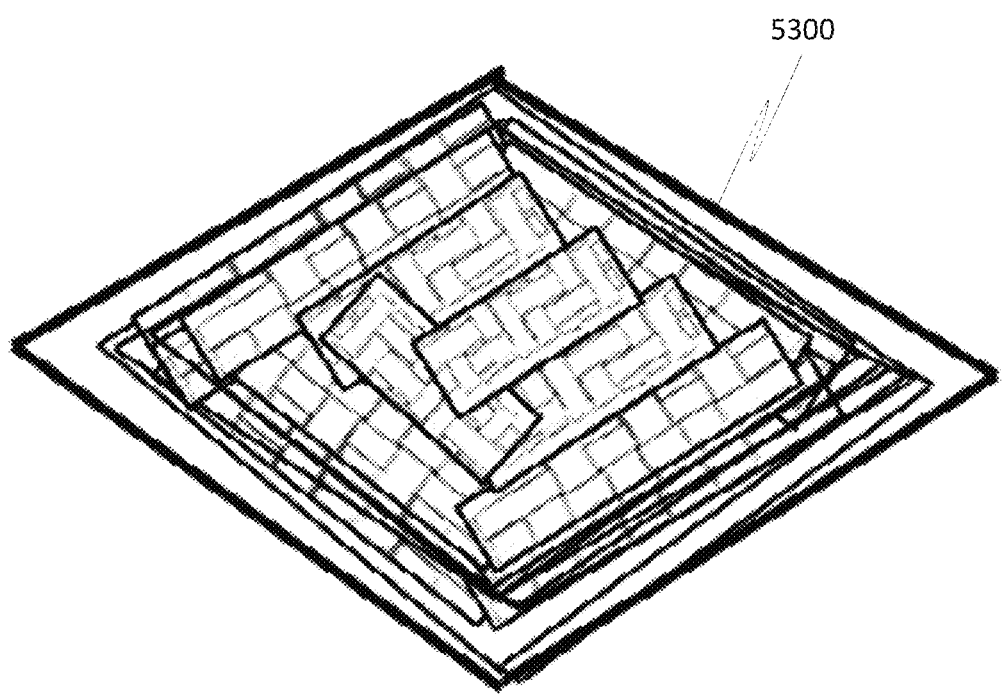
FIG. 79 is a perspective view of the simulated Ghana Christmas hut in a storage state, in accordance with some embodiments.

FIG. 79 is a perspective view of the simulated Ghana Christmas hut 5300 in a storage state, in accordance with some embodiments.

Figure 80:
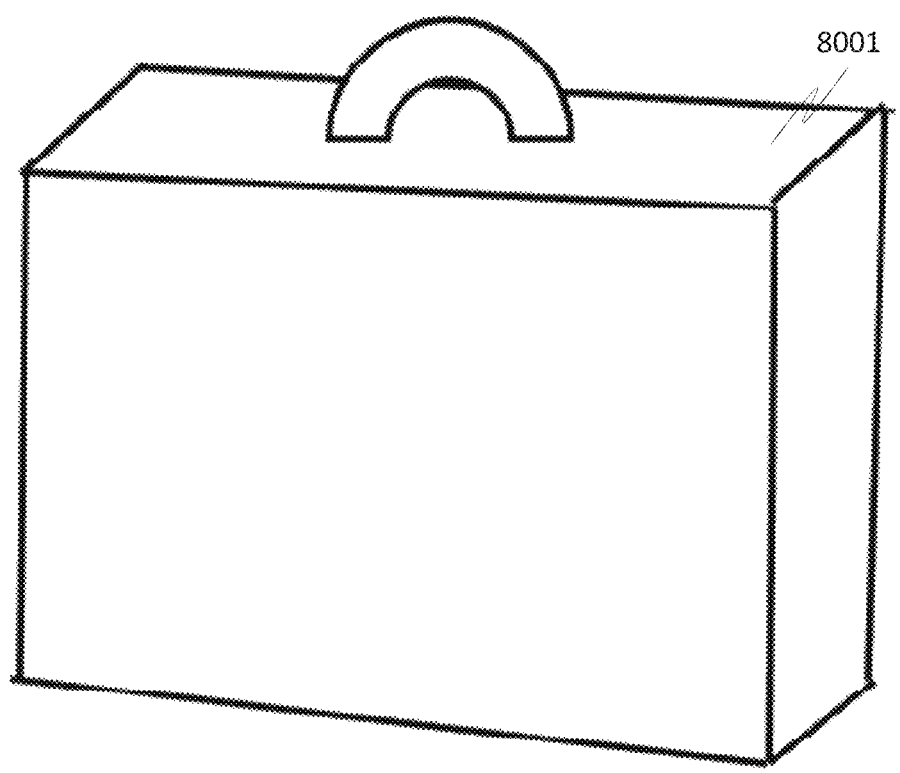
FIG. 80 is a perspective view of a box containing the simulated Ghana Christmas hut, in accordance with some embodiments.

FIG. 80 is a perspective view of a box 8001 containing the simulated Ghana Christmas hut 5300, in accordance with some embodiments.

With reference to FIGS. 53-80, the simulated Ghana Christmas Hut 5300 a simulated three-story Ghana Christmas Hut assembly with huts uniformly and progressively decreasing in size from bottom to top, all flushed at the rear along both right and left edges. The base of each hut is enclosed with skirtings 5407 shows a simulated Ghana Christmas Hut indicated generally, which comprises of a mobile support base, three collapsible and stackable boxes 5400, 5401, and 5402 all enclosed at their bases with the skirtings 5407 with matching roofs, 5403, 5404, 5405 and 5406, each with an entrance 54091, 54092, and 54093 with figurine 5415 Hechebi Christmas placed in the entrance of 54091. The bottom hut entrance 54091 is guarded with two miniature African drums 5410. The roof of 5400 and 5401 are decorated with flaming Harmattan angel figurines, three each on the two adjoining front right and left sides of the exposed roof area with Lantikila string Christmas wreath strung along edges. Roof 5405 has four Osonor Christmas lamps stuck to its four corners. The Ghana Christmas Hut of the present invention is applicable as a scene displaying device for Christmas but is not limited thereto. Those in the art will understand that any suitable material, natural or simulated, now known or hereafter developed, may be used in forming the present invention described herein. Although the color of the preferred embodiment is rendered in the natural colors of coconut fronds, it is apparent that colors of simulated materials for the simulated Ghana Christmas Hut 5300 is not limited to just the natural colors of the coconut fronds, other colors or a combination of colors can be applied. Further, the collapsible and stackable detached huts, 5400, 5401, and 5402, and matching roofs, 5403, 5404, and 5405 of varying sizes, which together comprise the simulated Ghana Christmas Hut 5400. The bottom hut 5400 and its roof 5403 are the largest of the three; the middle hut 5401 and its roof 5404 are smaller in size than the bottom hut 5400, and the top hut 5402 and its roof 5405 are the smallest in size.

The support base structure 5413 is a one-piece frame, consists of a bed 54131, with four side panels 54132, with fold-in caster wheels 54133 along with brakes 54135. Upon the bed 54131 are ultra-stacking ledges 54134. The 54131 portions are comprised of any suitable material for example plastics, wood, cork, fibers, a combination of materials now available or yet to be invented. The support base is not needed for an outdoor display. A skirt 54071 of the skirtings 5407 is wrapped around the base, which when opened consists of a fastener or other fasteners having a similar function of being detached when subjected to a peeling force. The material must be a softer material of simulated freshly woven coconut which can be easily wrapped around the support base structure. Skirts 54072 and 54073 also wrap around the bottom perimeter of huts 5401 and 5402 that fit the bases of said huts respectively.

Further, the roofs 5403 and 5404 comprise of a panel 54031 and 54041 of simulated freshly woven coconut panels enclosed with fascia board on all four sides of the same material. 54032 and 54042 are ultra-stacking ledges in which the bottom of 5401 and the bottom of 5402 are stacked to respectively. On panels 54031 and 54041 are six base plates 54033 and 54043, a set of three running along ultra-stacking ledges 54032 and 54042 on which flaming Harmattan angels 5411 are secured into place. 5403 and 5404 are framed with a fascia board 54034 and 54044. In the middle of roof 5403 and 5404 is a hatch hole 54035 and 54045.

Further, the roof 5405 belonging to hut 5402, the top hut comprises two panels 5405 and 5406 constructed from simulated freshly woven coconut fronds. A diamond-shaped fascia board overlay 5405 by stacking half of 5406 on ultra-stacking ledges on 5405; the other half of the diamond-shaped fascia hang over the top of the door jamb of the top hut 5402 as a crown molding of fascia.

Further, the collapsible and stackable huts/boxes 5400, 5401, and 5402 may be constructed from a combination of weaving patterns from coconut fronds. The perimeter of each bottom has ultra-stacking ledges (such as a stacking ledge 54001) to stack one box on top of another. The collapsible and stackable hut comes as a one-piece box that is foldable. Other collapsible mechanisms and modular systems available now and in the future will be suitable for alternative embodiments of a collapsible hut-box.

Further, to assemble the bottom hut 5400, components of 5413 are placed on a flat surface 5417. 5400 is opened up and its ultra-stacking ledge 54001 is aligned with those on 54134 and stacked into place on 5413. Roof 5403 is then secured on top of the bottom hut 5400. The skirt 54071 is then wrapped around the base of 5413.

Further, to assemble the middle hut 5401, the assembled bottom hut must remain on a flat surface 5417. The ultra-stacking ledges 54032 on roof 5403 of hut 5400 must be aligned to those of 5401*a* and stacked to roof 5403. Roof 5404 is then secured over 5401. A skirt 54072 of the skirtings 5407 is then wrapped around the base of middle hut 5401 and the second level of the present invention is complete.

The assembled bottom and middle hut structure must remain on a flat surface 5417 to assemble the top hut. To assemble the top hut 5402 the ultra-stacking ledge 54042 on roof 5404 of hut 5401 must be aligned to those of 5402*a* under hut 5402 and stacked to roof 5404. Roof 5405 is then secured over 5402. Diamond-shaped fascia board 5406 is overlain by stacking to ultra-staking ledges 54054 with half the diamond shape hanging just above the door jamb of 5402. On the base plates of 54052 and 54062, one Osonor Christmas lamp is secured into each slot. A skirt 54073 of the skirtings 5407 is then wrapped around the base of top hut 5401 and the third level of the present invention is complete.

When the three huts are completely assembled, solar-powered LED light flaming Harmattan Christmas angels are secured on base plates on roof 5403 and 5404 along ultra-stacking ledges, three along each ledge. Other lighting technologies available in the present or future can be employed to light up flaming Harmattan Christmas angels. Jacob's ladders 5414 are each placed inside each completed hut in such a way the top rest on one side of hatch hole 54034 and 54044. African drums 5410 are hang, one each on opposite sides of bottom door entrance 54091. 5416 Lantikila Christmas garland is used to decorate perimeters of the assembled structure. Other lighting technologies available in the present or future can be employed to light up Lantikila Christmas garland. Hechebi Christmas 5415 figurine is then placed at the entrance of 54091. Lit-able Christmas palm fruit bunch ornament 5418 is placed on each side of the assembled Christmas hut. Apparently, the structure of t the simulated Ghana Christmas Hut 5300 may be easily installed and dismantled without any tools.

Further, the Ghana Christmas Hut 5300 may be constructed from several huts

Figure 81:
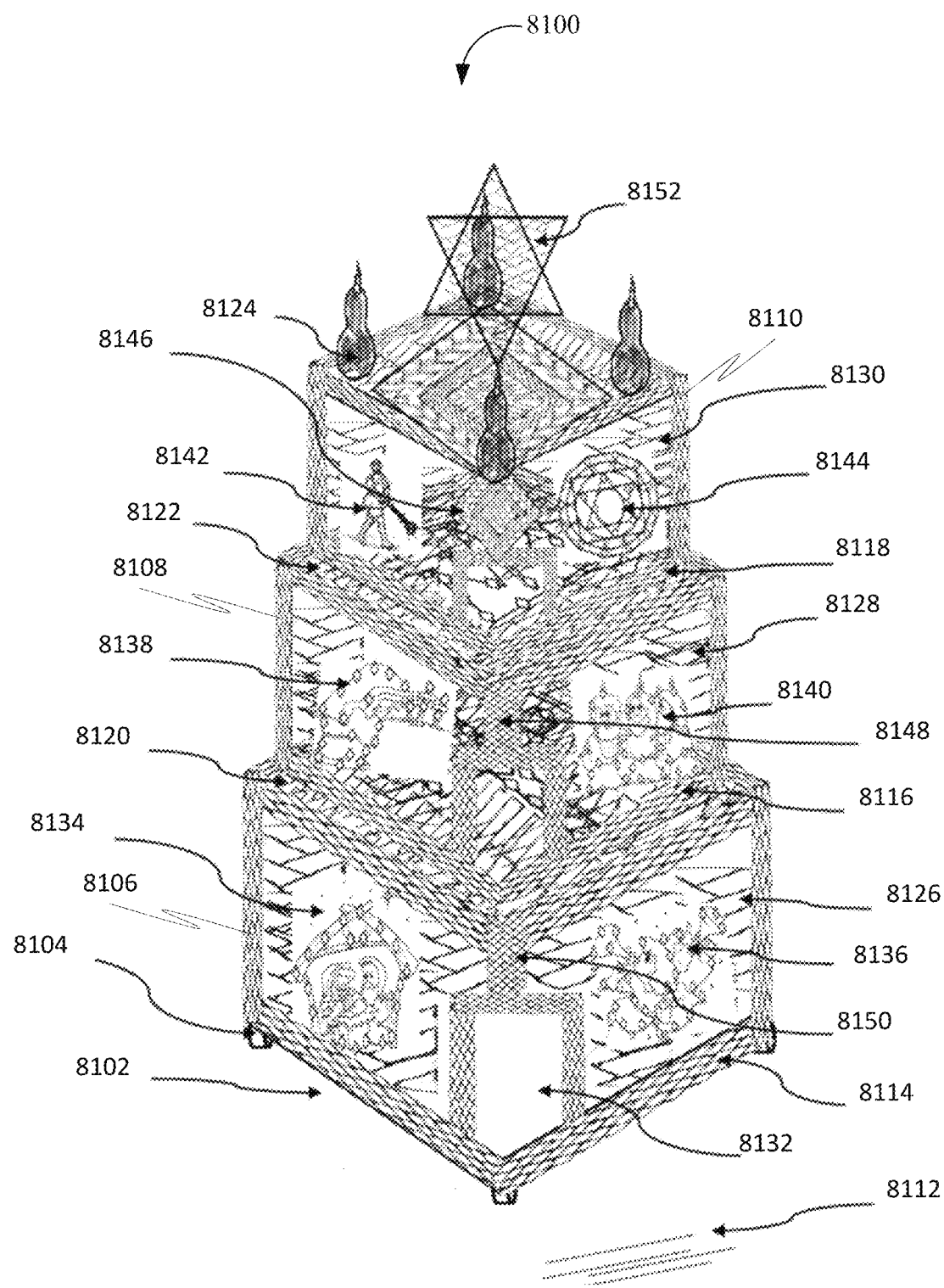
FIG. 81 is a front perspective view of a simulated Ghana Christmas hut, in accordance with some embodiments.

FIG. 81 is a front perspective view of a simulated Ghana Christmas hut 8100, in accordance with some embodiments. Further, the simulated Ghana Christmas hut 8100 may include a base structure 8102, a plurality of huts 8106-8110, and a plurality of skirts 8114-8118.

Further, the base structure 8102 may be configured to be disposed on at least one surface 8112. Further, the base structure 8102 may include a bed panel 8104 parallel to the at least one surface 8112.

Further, the plurality of huts 8106-8110 may be supported on the base structure 8102. Further, the plurality of huts 8106-8110 may include a bottom hut 8106, a middle hut 8108, and a top hut 8110. Further, the plurality of huts 8106-8110 may be stackable on the base structure 8102 in a vertical direction based on a hut size of the plurality of huts 8106-8110. Further, the plurality of huts 8106-8110 may be configured to be transitioned between a folded state and an erected state. Further, the hut size decrease along the vertical direction from the bottom hut 8106 to the top hut 8110. Further, each hut of the plurality of huts 8106-8110 may include at least one side wall and a roof corresponding to the hut size of each hut. Further, the roof may be attached to the at least one side wall along at least one top edge of the at least one side wall for forming a hut interior space. Further, the at least one side wall of each hut may include at least one opening leading into the hut interior space of each hut. Further, the at least one side wall and the roof of each hut may be comprised of coconut fronds. Further, the bottom hut 8106 may be disposed on the bed panel 8104. Further, the middle hut 8108 may be disposed on a bottom roof 8120 of the bottom hut 8106. Further, the top hut 8110 may be disposed on a middle roof 8122 of the middle hut 8108. Further, the at least one side wall and the roof of the bottom hut 8106 may include at least one bottom side wall 8126 and the bottom roof 8120 associated with the bottom hut 8106. Further, the at least one side wall and the roof of the middle hut 8108 may include at least one middle side wall 8128 and the middle roof 8122 associated with the middle hut 8108. Further, the at least one side wall and the roof of the top hut 8110 may include at least one top side wall 8130 and a top roof 8124 associated with the top hut 8110. Further, the at least one opening may be associated with the bottom may include a bottom doorway 8132. Further, the at least one side wall of each hut may include interwoven patterns (simulated weaving patterns) associated with at least one a scene and a shape associated with Christianity. Further, the simulated weaving patterns of the shape of faith may be incorporated into at least one wall surface of the at least one side wall. Further, the at least one bottom side wall 8126 may incorporate first simulated weaving patterns of the shape of faith associated with at least one nativity scene 8134-8136. Further, the at least one middle side wall 8128 may incorporate second simulated weaving patterns of the shape of faith may be associated with at least one church scene 8138-8140. Further, the at least one top side wall 8130 may incorporate third simulated weaving patterns of the shape of faith may be associated with at least one New Jerusalem scene 8142-8144. Further, each hut may include fascia. Further, the fascia may be attached to the roof of each hut. Further, the fascia may include a diamond shaped fascia 8146 attached to the top roof 8124. Further, the fascia may include a first rectangular shaped fascia 8148 attached to the middle roof 8122. Further, the fascia may include a second rectangular shaped fascia 8150 attached to the bottom roof 8120. Further, the plurality of huts 8106-8110 may include a star 8152. Further, the star 8152 may be disposed on the top roof 8124.

Further, the plurality of skirts 8114-8118 may be attached to the plurality of huts 8106-8110. Further, a skirt of the plurality of skirts 8114-8118 may include an elongated panel. Further, a first end of the elongated panel may be fastened to a second end of the elongated panel for forming the skirt using at least one fastener. Further, the elongated panel may include a fixed periphery and a free periphery. Further, the fixed periphery may be configured to be attached to the at least one side wall of a hut of the plurality of huts 8106-8110 along at least one base edge of the at least one side wall. Further, the free periphery extends away from the at least one side wall.

Further, in some embodiments, a side wall of the at least one side wall of a hut of the plurality of huts 8106-8110 may include a first side wall portion and a second side wall portion. Further, the first side wall portion may be pivotally attached to the second side wall portion for pivoting in relation to the second side wall along a side wall axis. Further, the hut may be configured for collapsing based on the pivoting of the first side wall portion in relation to the second side wall portion. Further, the plurality of huts 8106-8110 transitioned from the erected state to the folded state based on the collapsing.

Further, in some embodiments, the base structure 8102 may include a plurality of wheels. Further, a wheel of the plurality of wheels may be configured to be rotated around a wheel axis for propelling the simulated Ghana Christmas hut 8100 on the at least one surface 8112.

Figure 82:
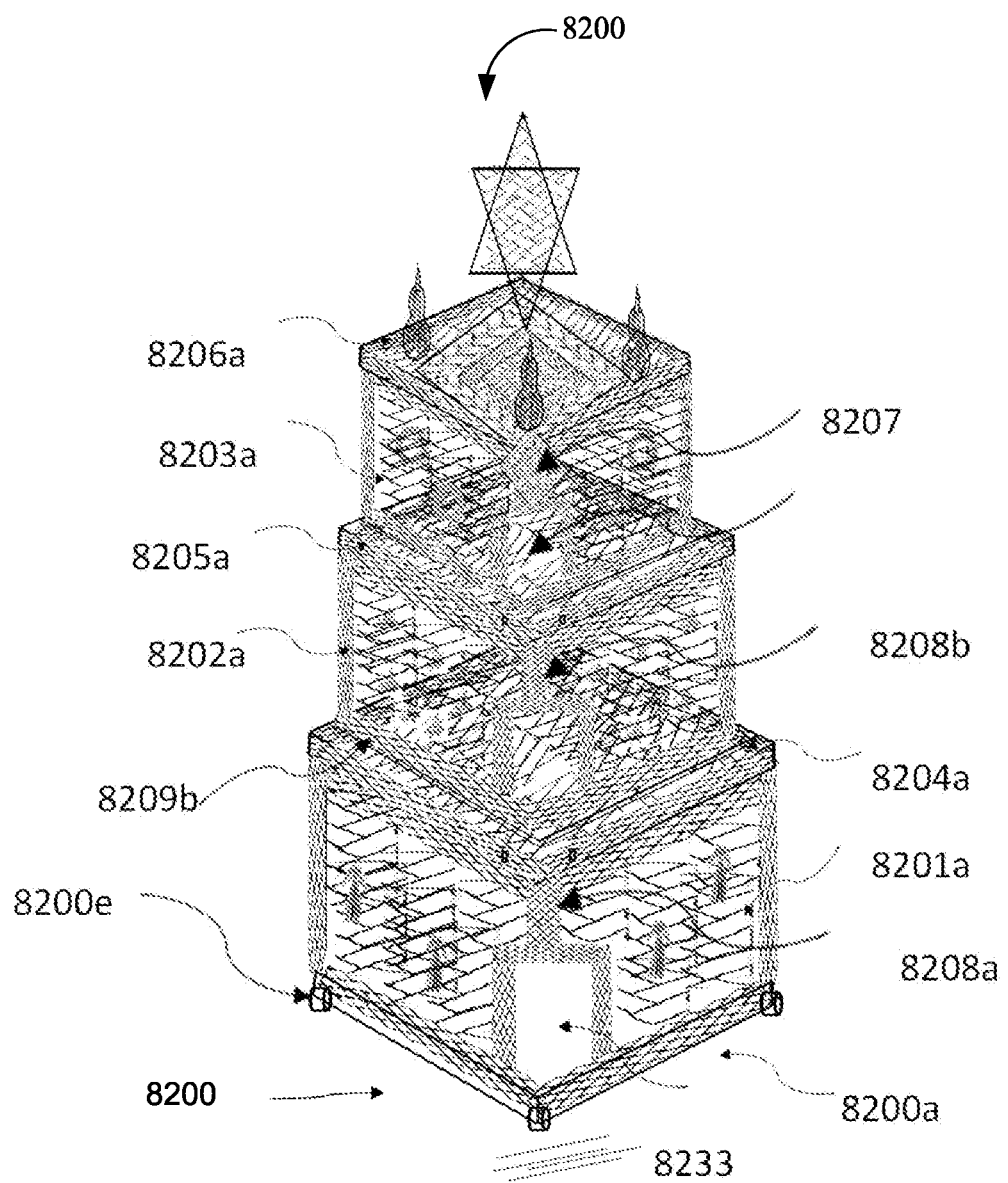
FIG. 82 is a front perspective view of a simulated Ghana Christmas Hut, in accordance with some embodiments.

FIG. 82 is a front perspective view of a simulated Ghana Christmas Hut 8200, in accordance with some embodiments.

Figure 83:
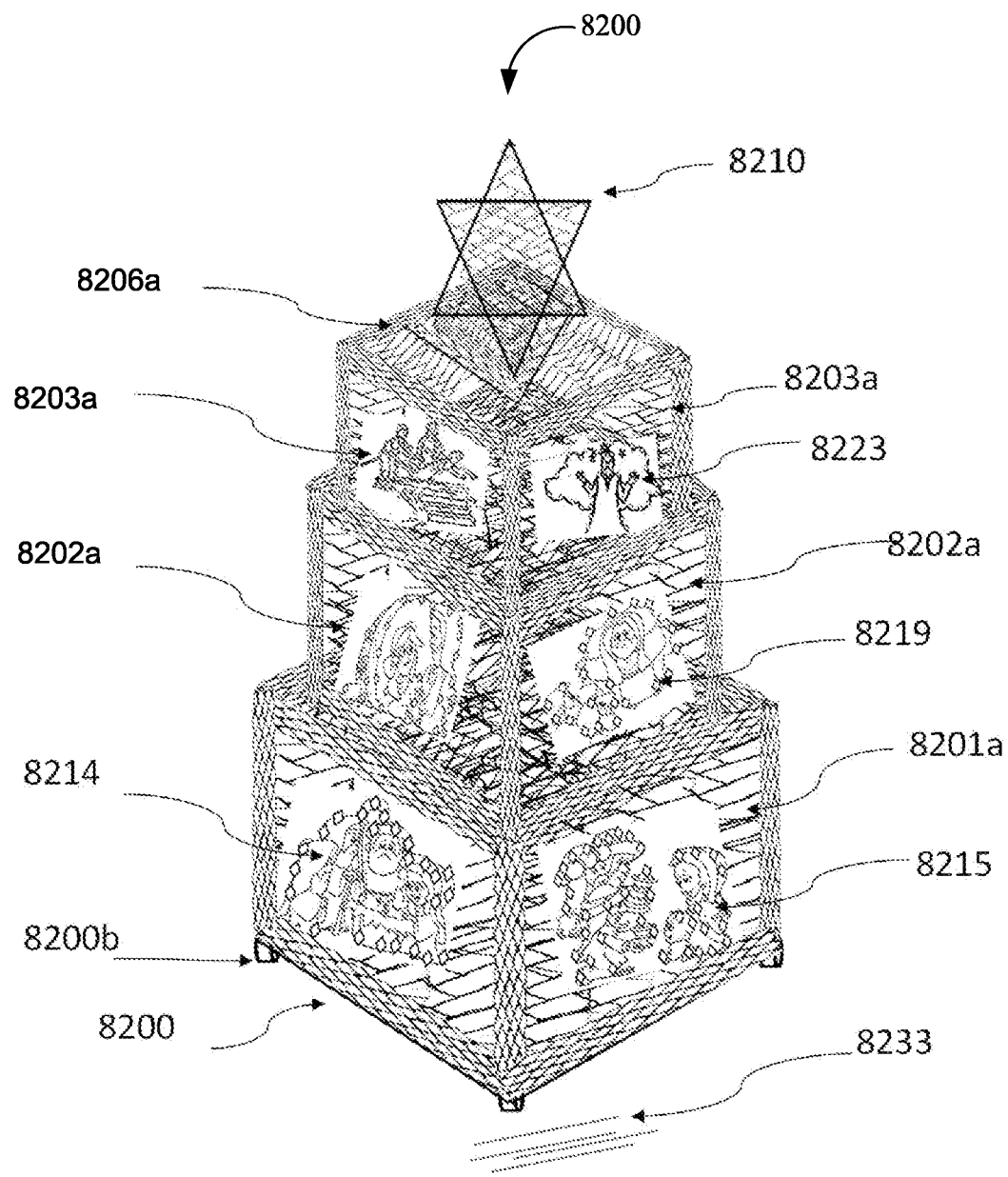
FIG. 83 is a rear perspective view of the simulated Ghana Christmas Hut, in accordance with some embodiments.

FIG. 83 is a rear perspective view of the simulated Ghana Christmas Hut 8200, in accordance with some embodiments.

Figure 84:
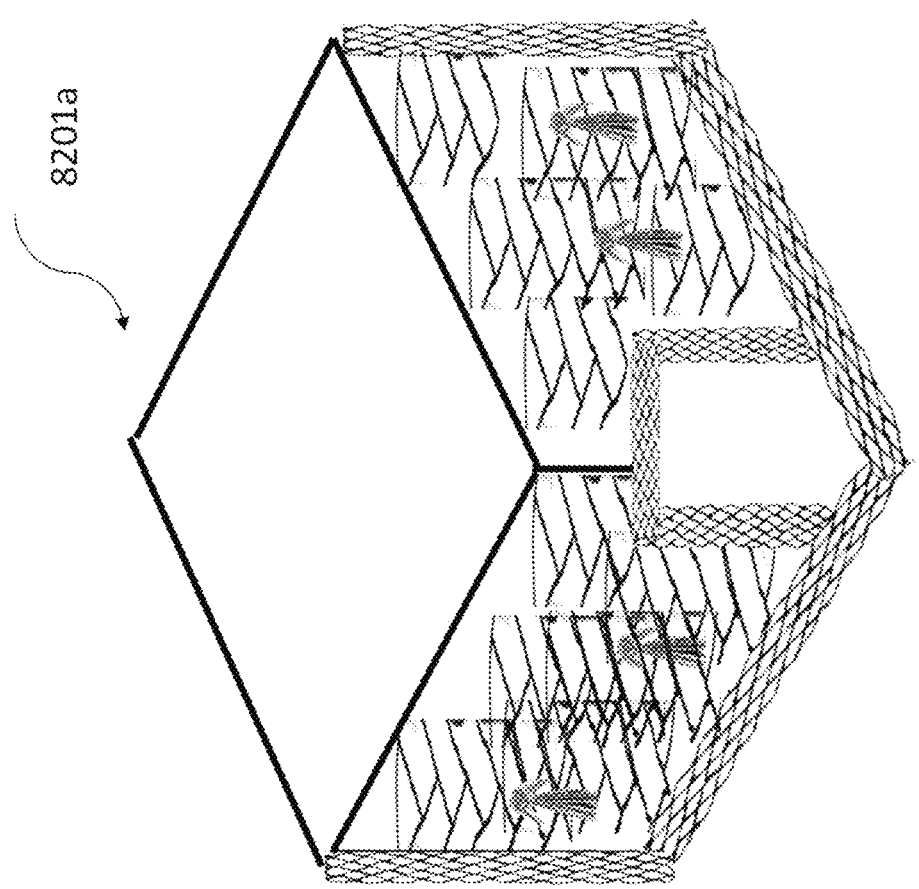
FIG. 84 is a front view of a first floor collapsible and foldable hut box of the simulated Ghana Christmas Hut, in accordance with some embodiments.

FIG. 84 is a front view of a first floor collapsible and foldable hut box 8201*a* of the simulated Ghana Christmas Hut 8200, in accordance with some embodiments.

Figure 85:
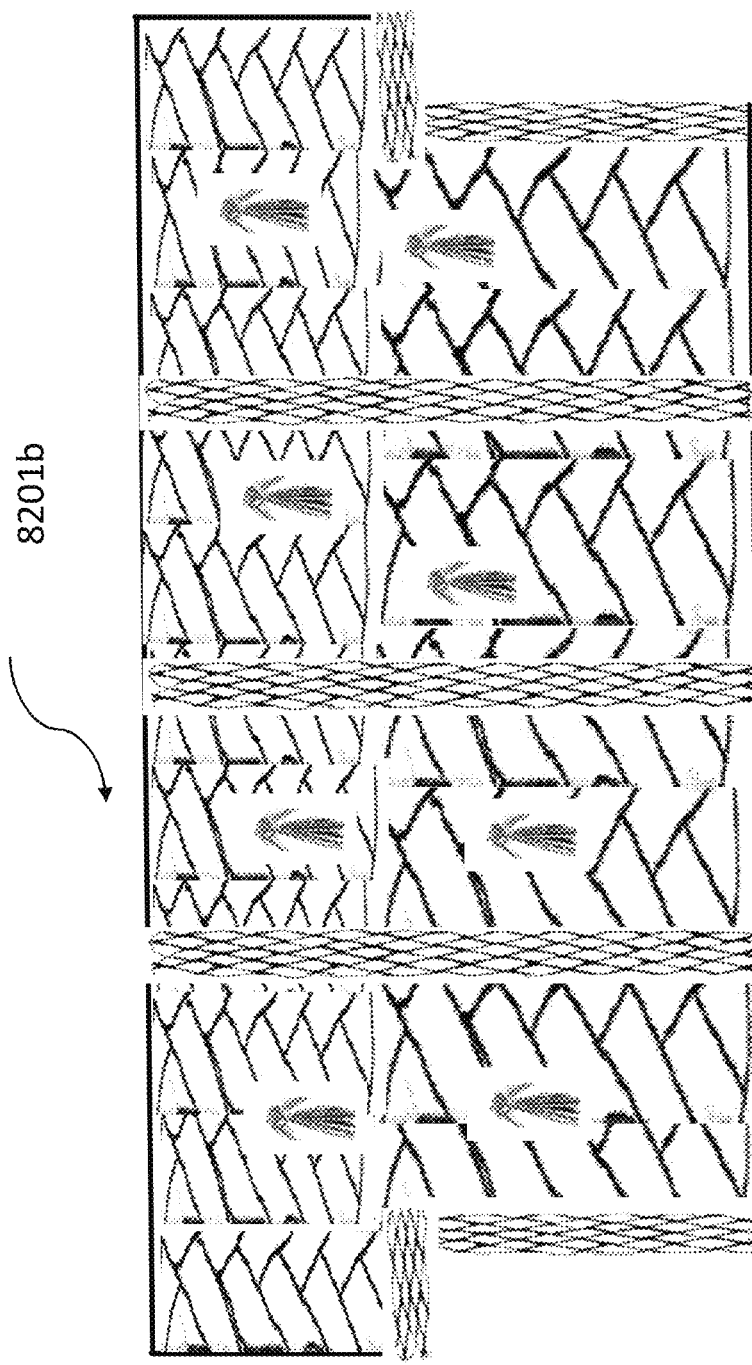
FIG. 85 is an orthographic view of a folded out first-floor hut box, in accordance with some embodiments.

FIG. 85 is an orthographic view of a folded out first-floor hut box 8201*b*, in accordance with some embodiments.

Figure 86:
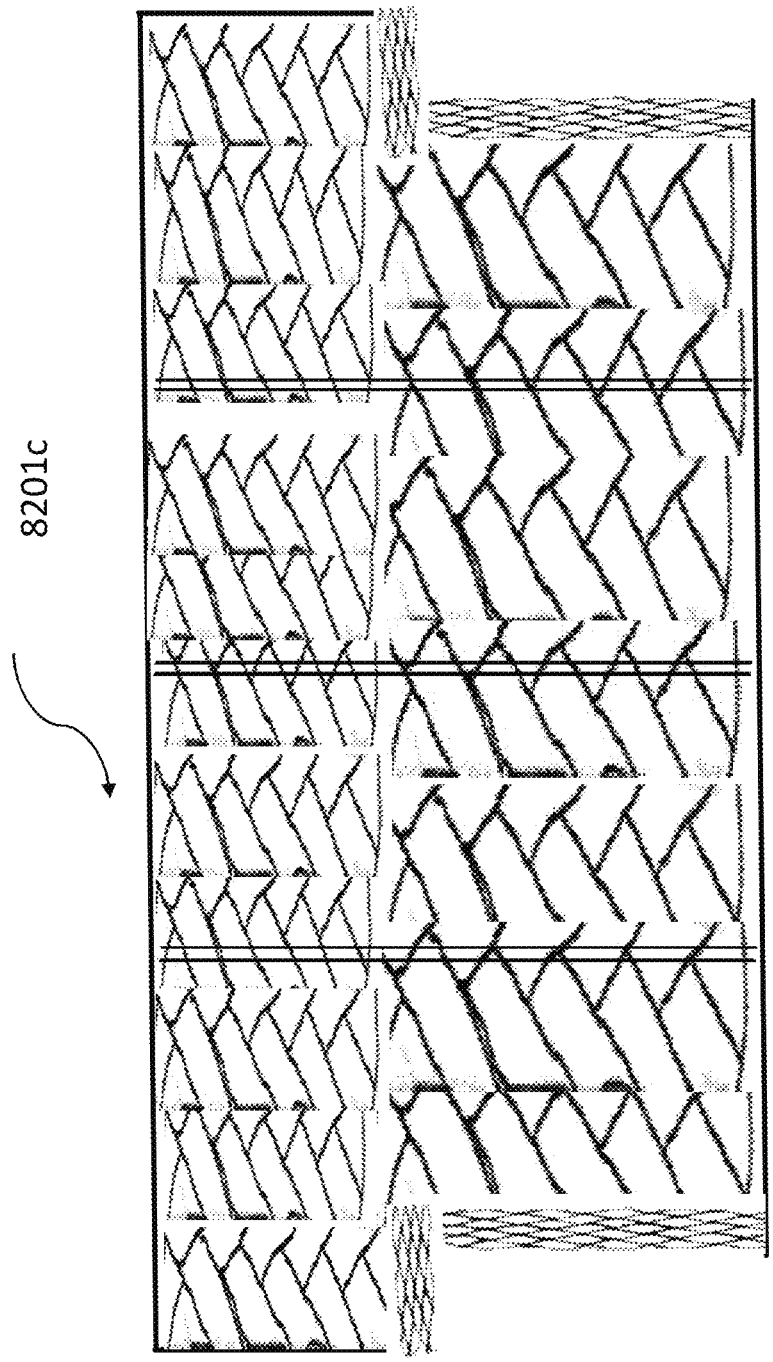
FIG. 86 is an orthographic view of a flipside folded out first-floor hut box, in accordance with some embodiments.

FIG. 86 is an orthographic view of a flipside folded out first-floor hut box 8201*c*, in accordance with some embodiments.

Figure 87:
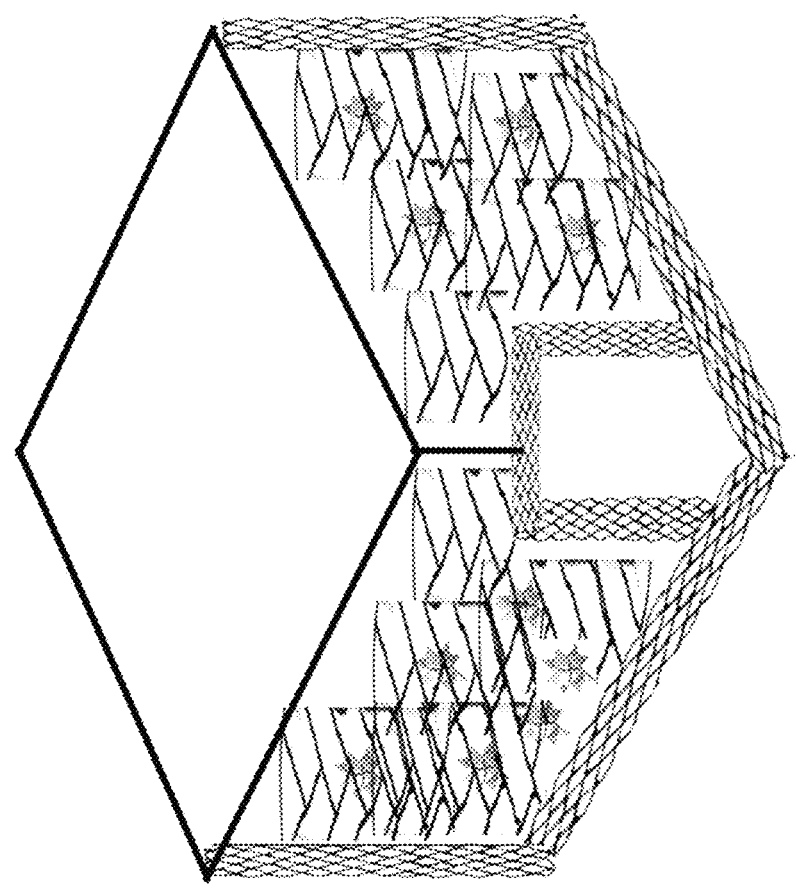
FIG. 87 is a front view of a second floor collapsible and foldable hut box of the simulated Ghana Christmas Hut, in accordance with some embodiments.

FIG. 87 is a front view of a second floor collapsible and foldable hut box 8202*a* of the simulated Ghana Christmas Hut 8200, in accordance with some embodiments.

Figure 88:
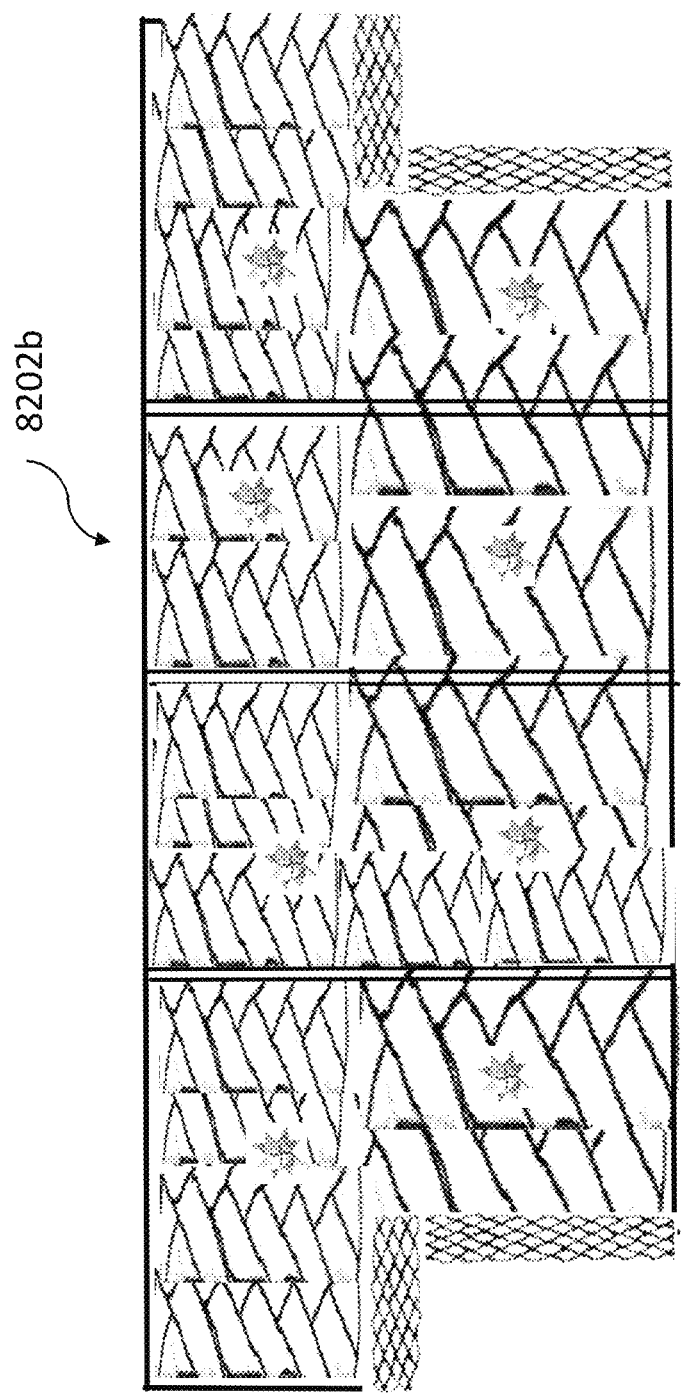
FIG. 88 is an orthographic view of a folded out second-floor hut box, in accordance with some embodiments.

FIG. 88 is an orthographic view of a folded out second-floor hut box 8202*b*, in accordance with some embodiments.

Figure 89:
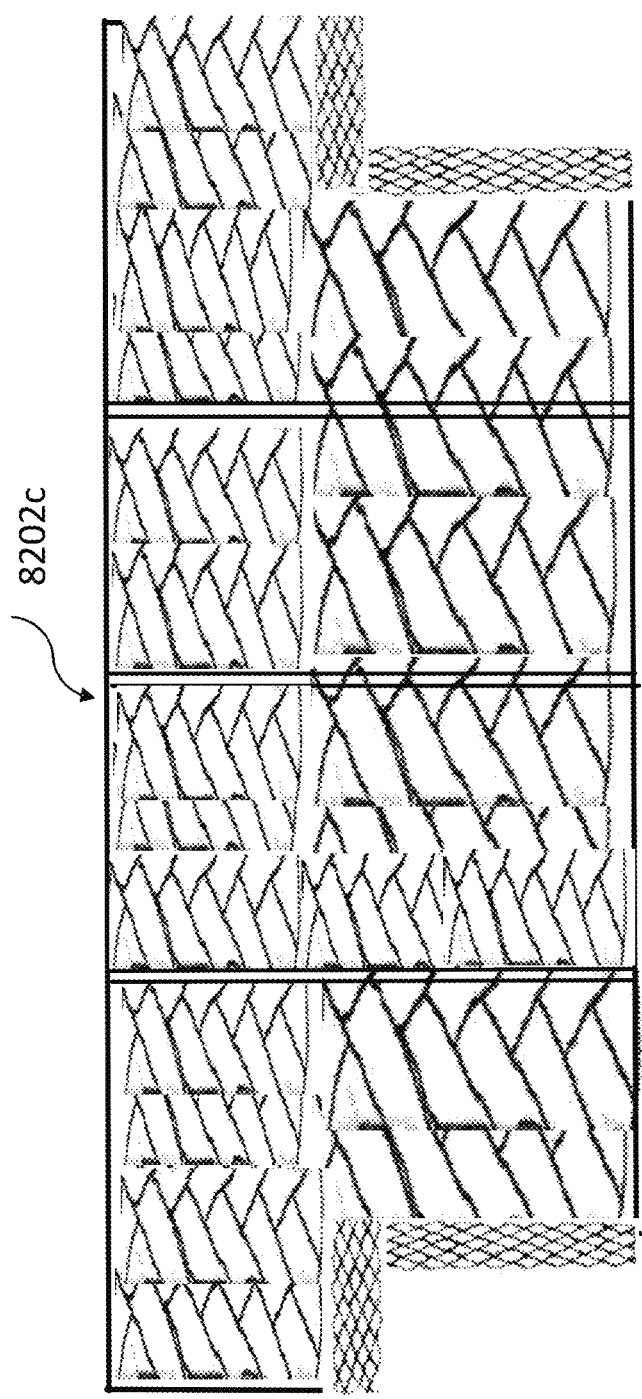
FIG. 89 is an orthographic view of a flipside folded out second-floor hut box folded out, in accordance with some embodiments.

FIG. 89 is an orthographic view of a flipside folded out second-floor hut box 8202*c* folded out, in accordance with some embodiments.

Figure 90:
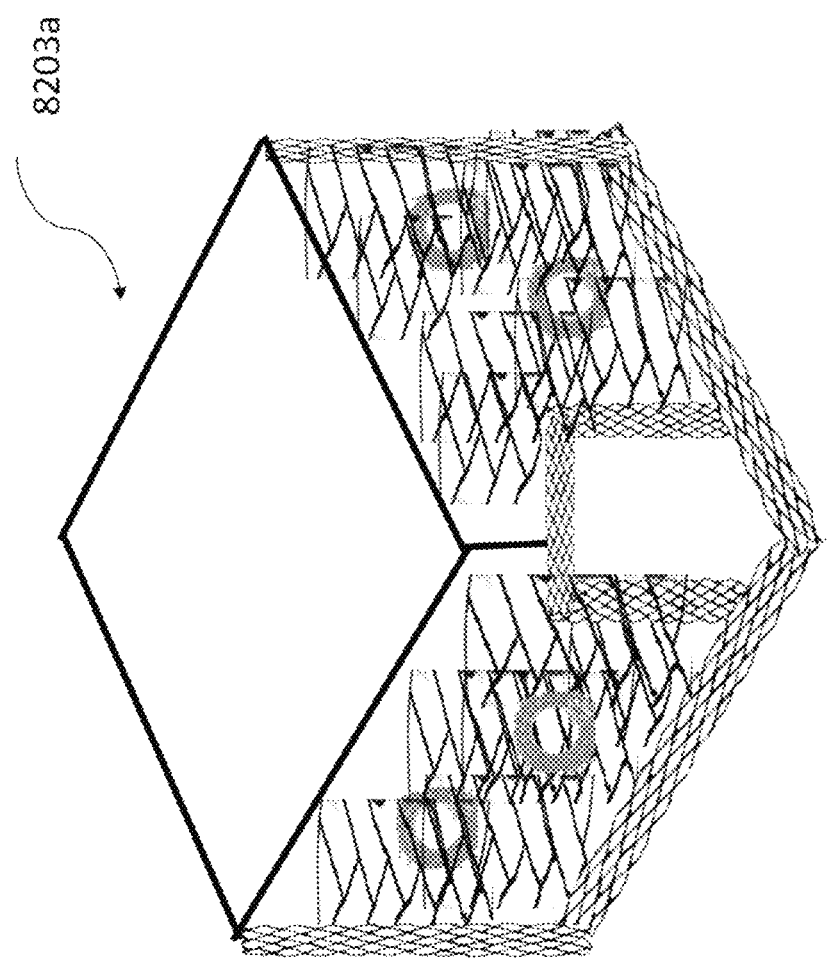
FIG. 90 is a front view of a third floor collapsible and foldable hut box of the simulated Ghana Christmas Hut, in accordance with some embodiments.

FIG. 90 is a front view of a third floor collapsible and foldable hut box 8203*a* of the simulated Ghana Christmas Hut 8200, in accordance with some embodiments.

Figure 91:
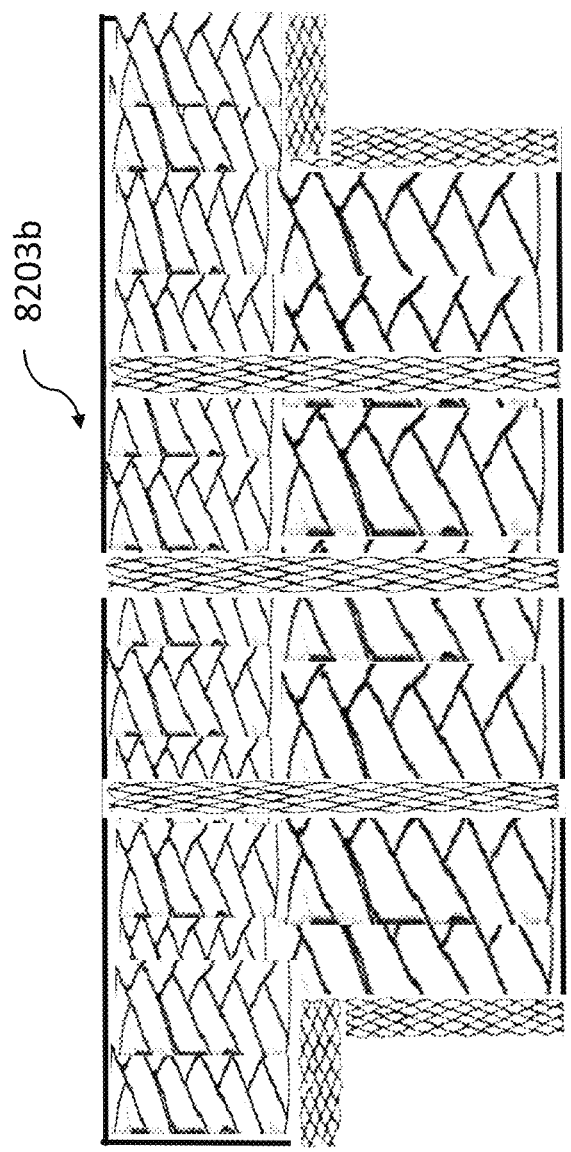
FIG. 91 is an orthographic view of a folded out third-floor hut box, in accordance with some embodiments.

FIG. 91 is an orthographic view of a folded out third-floor hut box 8203*b*, in accordance with some embodiments.

Figure 92:
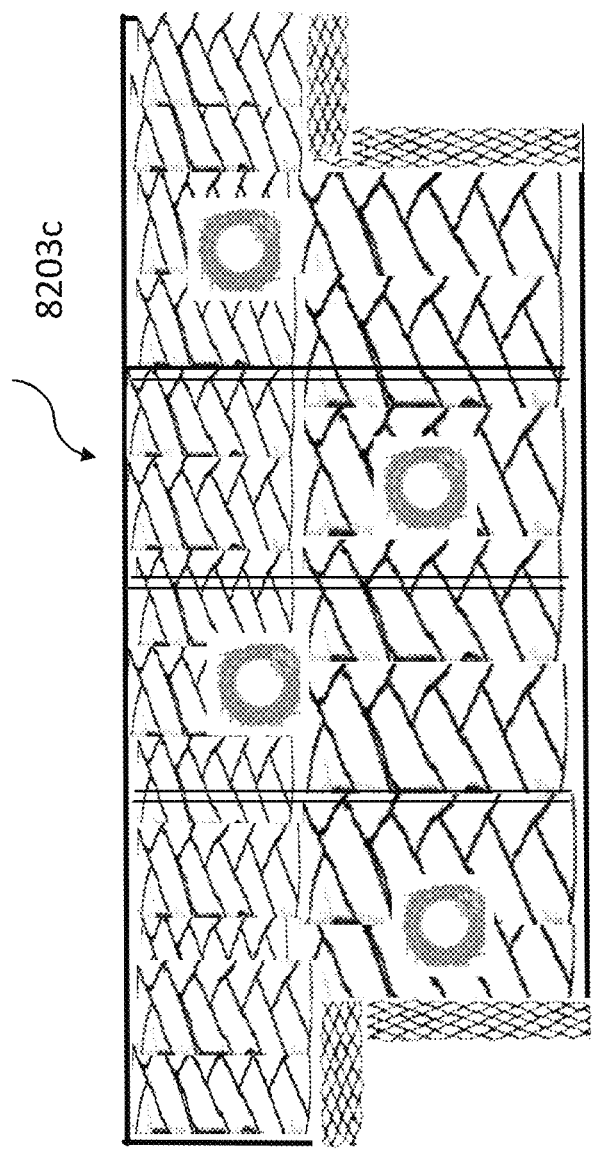
FIG. 92 is an orthographic view of a flipside folded out third-floor hut box, in accordance with some embodiments.

FIG. 92 is an orthographic view of a flipside folded out third-floor hut box 8203*c*, in accordance with some embodiments.

Figure 93:
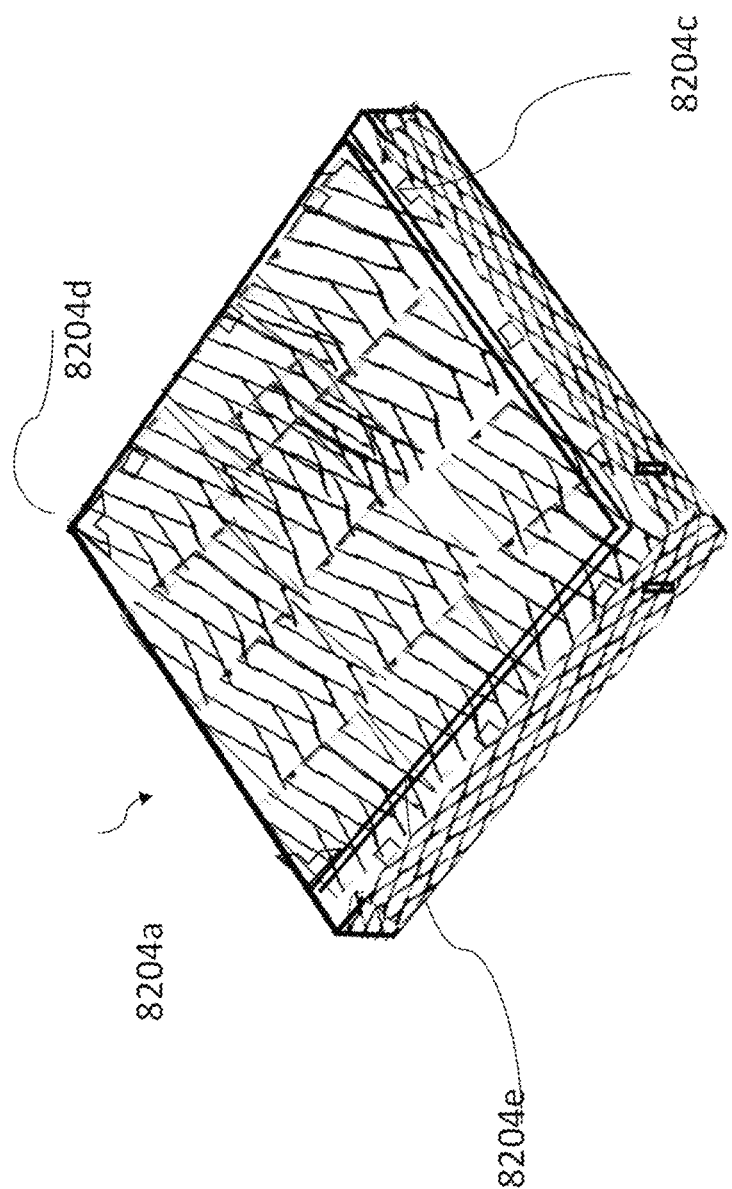
FIG. 93 is a front perspective view of a first-floor roof of the first-floor hut, in accordance with some embodiments.

FIG. 93 is a front perspective view of a first-floor roof 8204*a* of the first-floor hut 8201*a*, in accordance with some embodiments.

Figure 94:
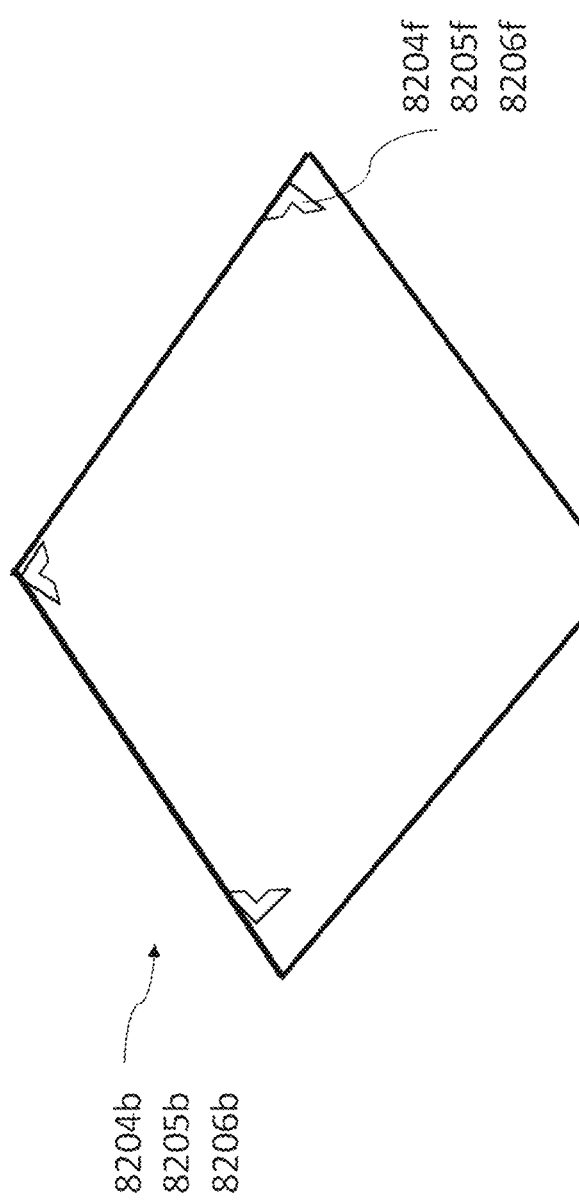
FIG. 94 is a perspective view of a flipside of roofs, in accordance with some embodiments.

FIG. 94 is a perspective view of a flipside of roofs, in accordance with some embodiments.

Figure 95:
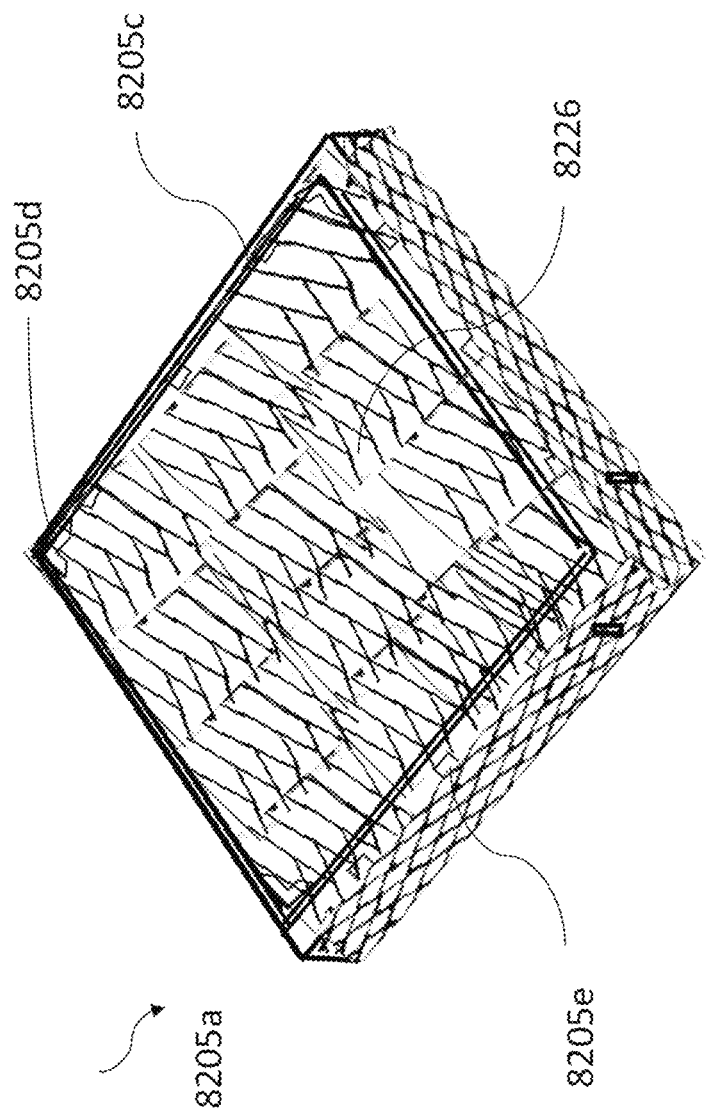
FIG. 95 is a front perspective view of a second floor roof of the second-floor hut, in accordance with some embodiments.

FIG. 95 is a front perspective view of a second floor roof 8205*a* of the second-floor hut 8202*a*, in accordance with some embodiments.

Figure 96:
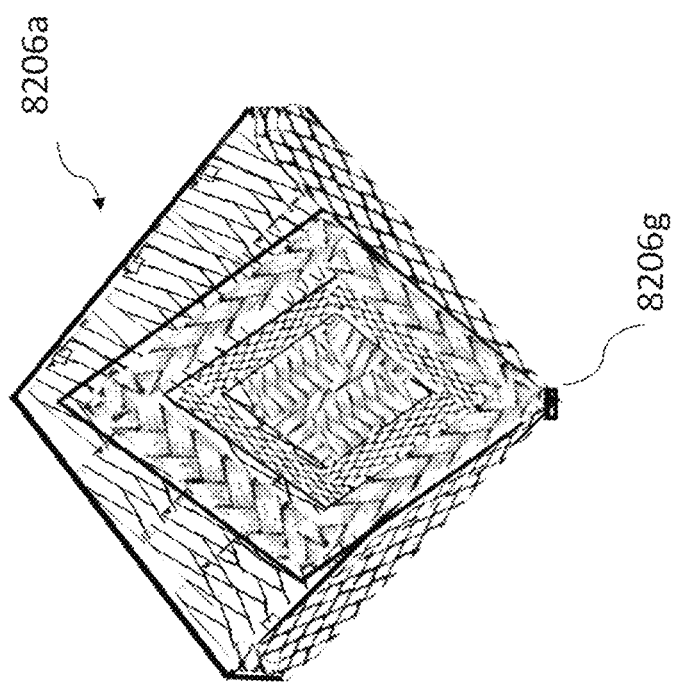
FIG. 96 is a front perspective view of a third floor roof of the third-floor hut, in accordance with some embodiments.

FIG. 96 is a front perspective view of a third floor roof 8206*a* of the third-floor hut 8203*a*, in accordance with some embodiments.

Figure 97:
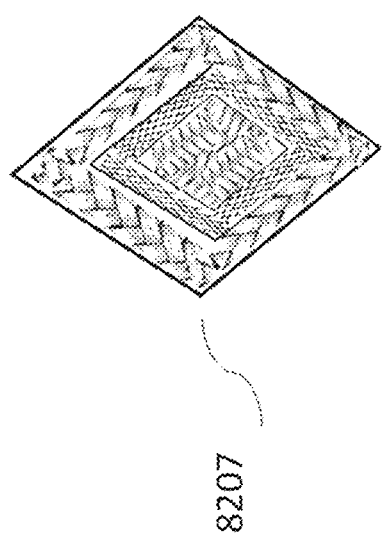
FIG. 97 is a front view of a diamond shaped fascia of the third floor roof, in accordance with some embodiments.

FIG. 97 is a front view of a diamond shaped fascia 8207 of the third floor roof 8206*a*, in accordance with some embodiments.

Figure 98:
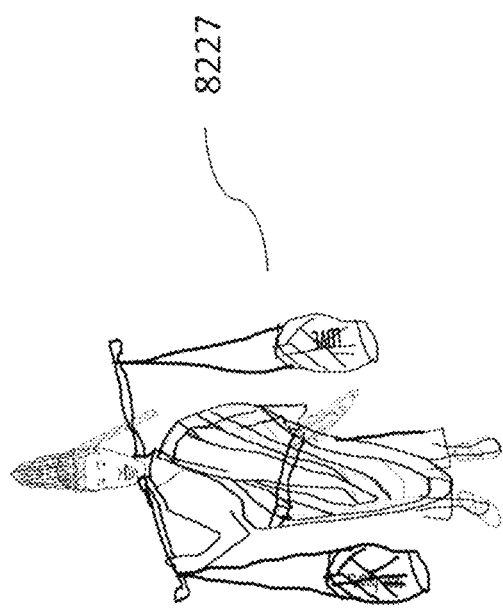
FIG. 98 is a perspective view of a Hechebi Christmas figurine of the simulated Ghana Christmas Hut, in accordance with some embodiments.

FIG. 98 is a perspective view of a Hechebi Christmas figurine 8227 of the simulated Ghana Christmas Hut 8200, in accordance with some embodiments.

Figure 99:
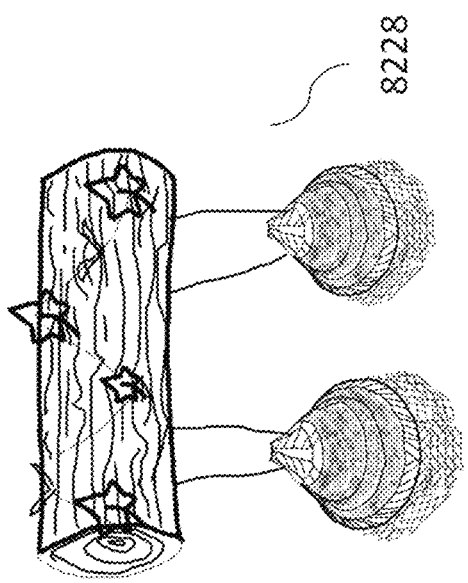
FIG. 99 is a perspective view of a Heche gift log of the simulated Ghana Christmas Hut, in accordance with some embodiments.

FIG. 99 is a perspective view of a Heche gift log 8228 of the simulated Ghana Christmas Hut 8200, in accordance with some embodiments.

Figure 100:
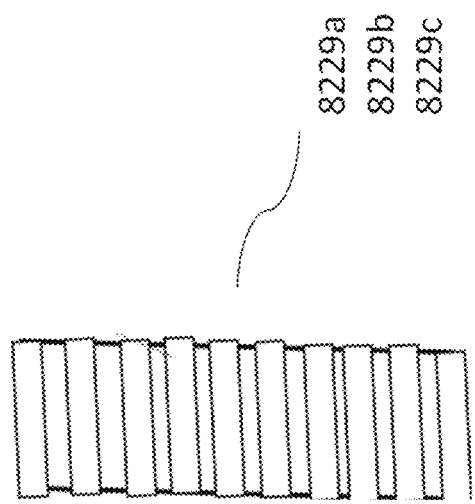
FIG. 100 is a front perspective view of a staircase of the simulated Ghana Christmas Hut, in accordance with some embodiments.

FIG. 100 is a front perspective view of a staircase of the simulated Ghana Christmas Hut 8200, in accordance with some embodiments.

Figure 101:
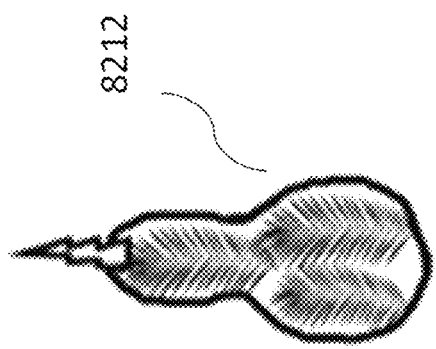
FIG. 101 is a front view of an osornor lamp of the simulated Ghana Christmas Hut, in accordance with some embodiments.

FIG. 101 is a front view of an osornor lamp 8212 of the simulated Ghana Christmas Hut 8200, in accordance with some embodiments.

Figure 102:
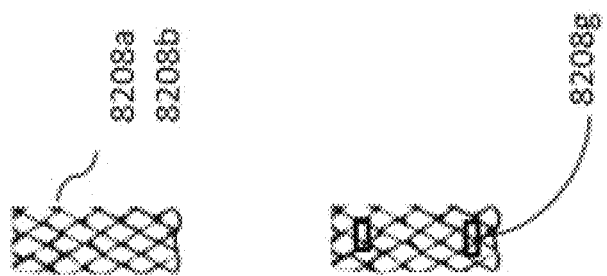
FIG. 102 is a front view of a rectangular fascia of the simulated Ghana Christmas Hut, in accordance with some embodiments.

FIG. 102 is a front view of a rectangular fascia of the simulated Ghana Christmas Hut 8200, in accordance with some embodiments.

Figure 103:
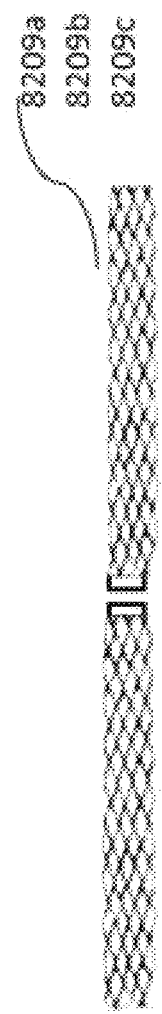
FIG. 103 is a front view of a skirting of the simulated Ghana Christmas Hut, in accordance with some embodiments.

FIG. 103 is a front view of a skirting of the simulated Ghana Christmas Hut 8200, in accordance with some embodiments.

Figure 104:
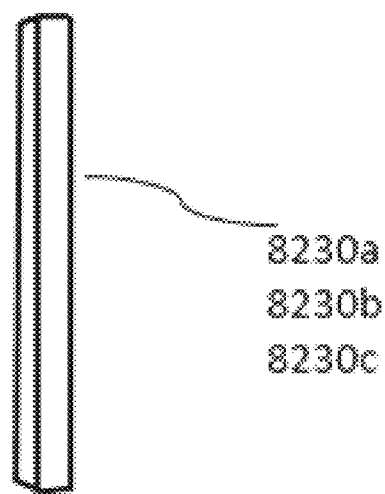
FIG. 104 is a front view of a post of the simulated Ghana Christmas Hut, in accordance with some embodiments.

FIG. 104 is a front view of a post of the simulated Ghana Christmas Hut 8200, in accordance with some embodiments.

Figure 105:
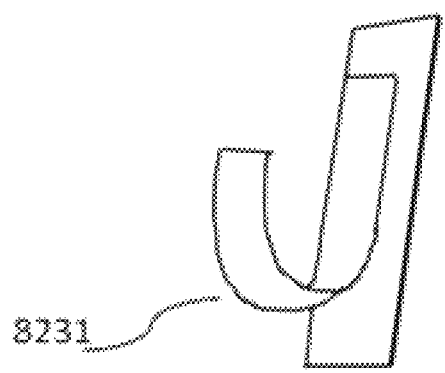
FIG. 105 is a perspective view of a hook of the simulated Ghana Christmas Hut, in accordance with some embodiments.

FIG. 105 is a perspective view of a hook 8231 of the simulated Ghana Christmas Hut 8200, in accordance with some embodiments.

Figure 106:
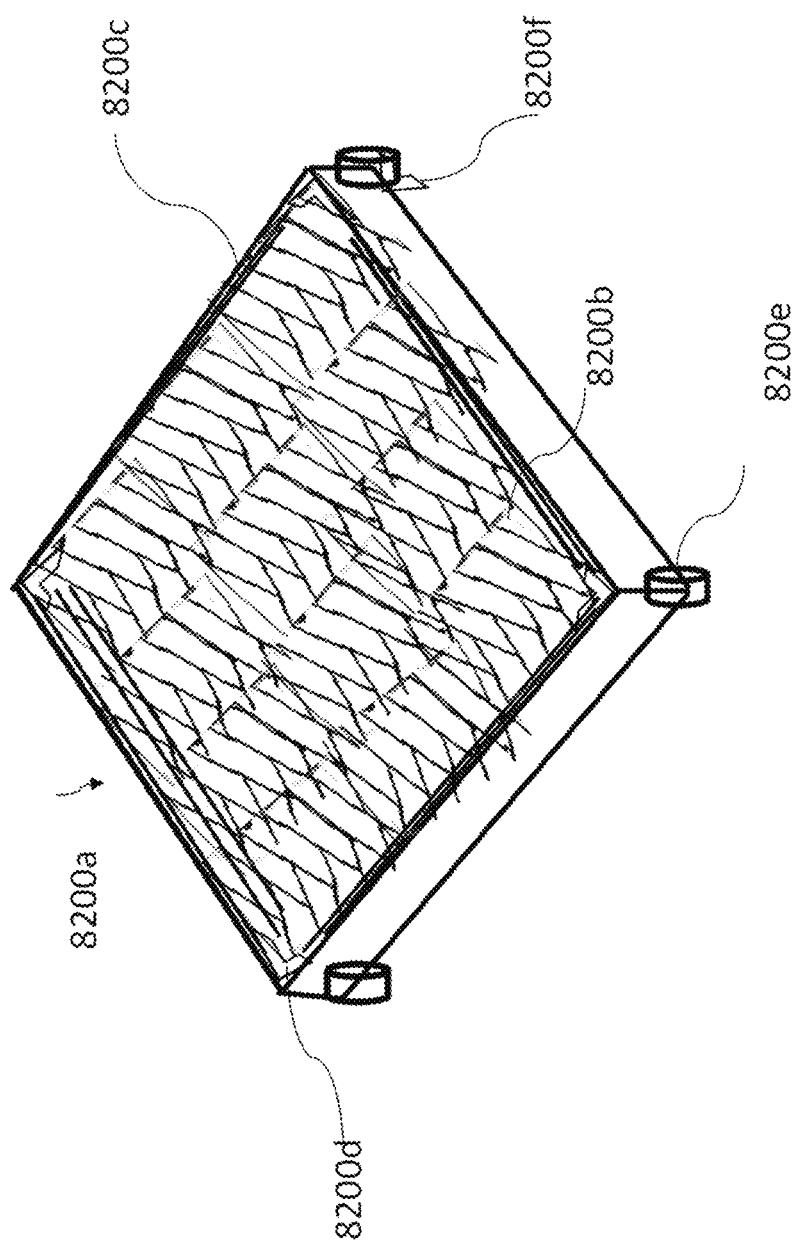
FIG. 106 is a front perspective view of a support base of the simulated Ghana Christmas Hut, in accordance with some embodiments.

FIG. 106 is a front perspective view of a support base 8200*a* of the simulated Ghana Christmas Hut 8200, in accordance with some embodiments.

Figure 107:
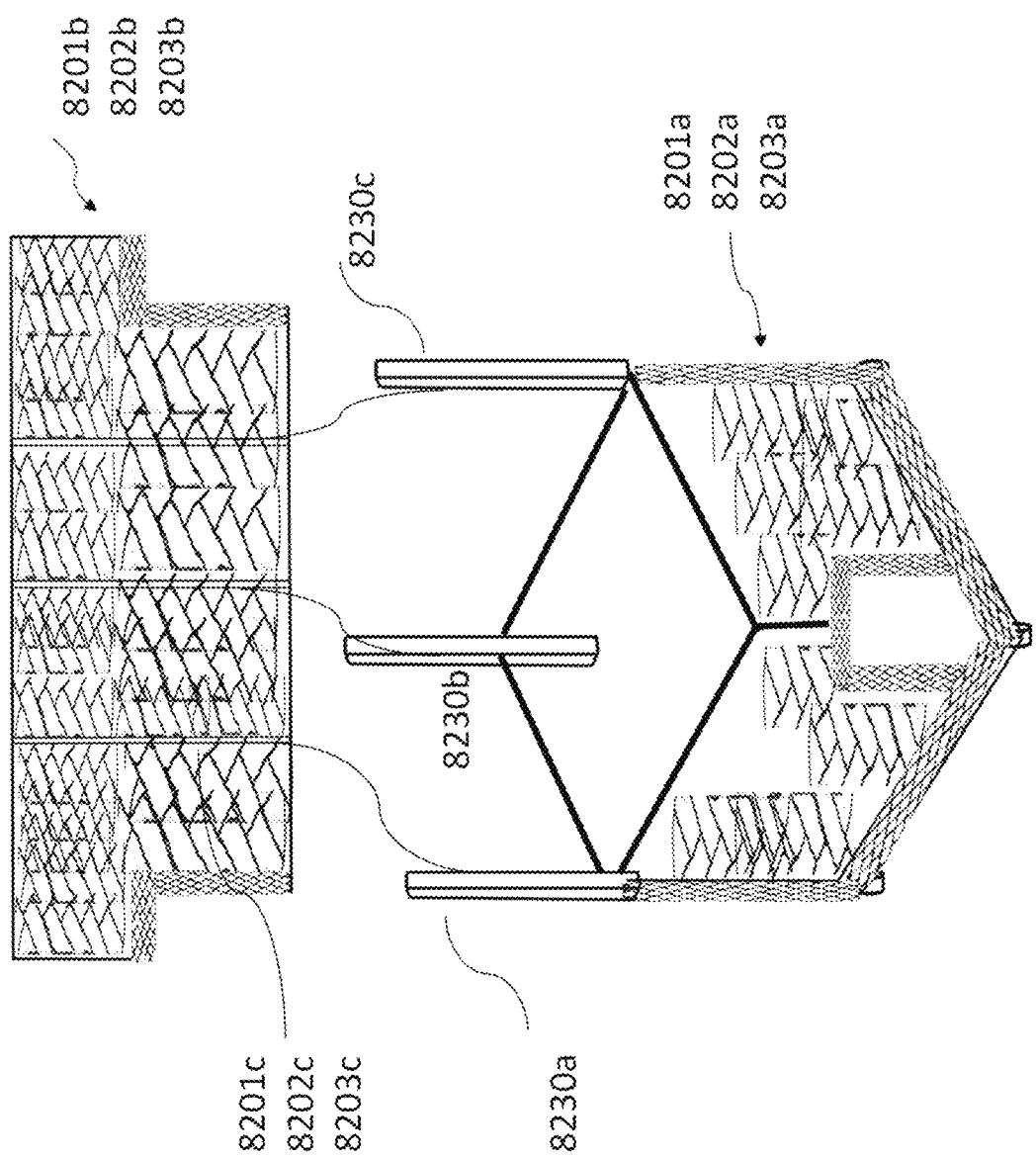
FIG. 107 is an enlarged exploded fragmented perspective view of assembling hut boxes, in accordance with some embodiments.

FIG. 107 is an enlarged exploded fragmented perspective view of assembling hut boxes, in accordance with some embodiments.

Figure 108:
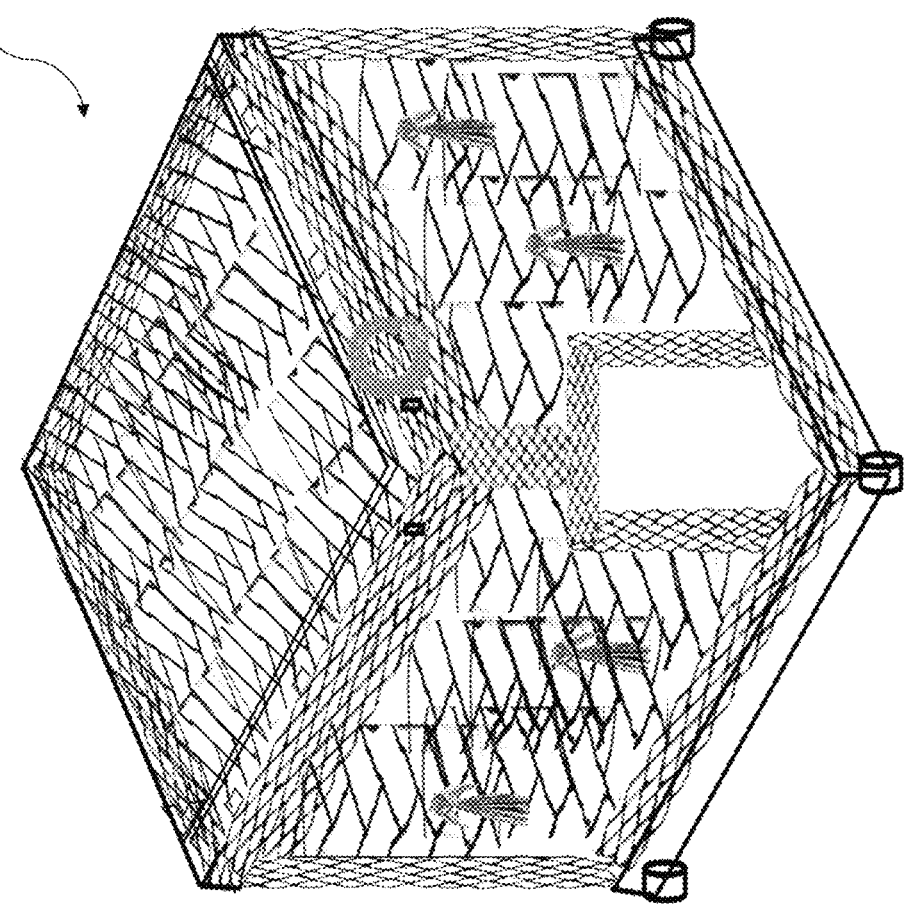
FIG. 108 is a front perspective view of an assembled first floor hut of the simulated Ghana Christmas Hut, in accordance with some embodiments.

FIG. 108 is a front perspective view of an assembled first floor hut 8201*a* of the simulated Ghana Christmas Hut 8200, in accordance with some embodiments.

Figure 109:
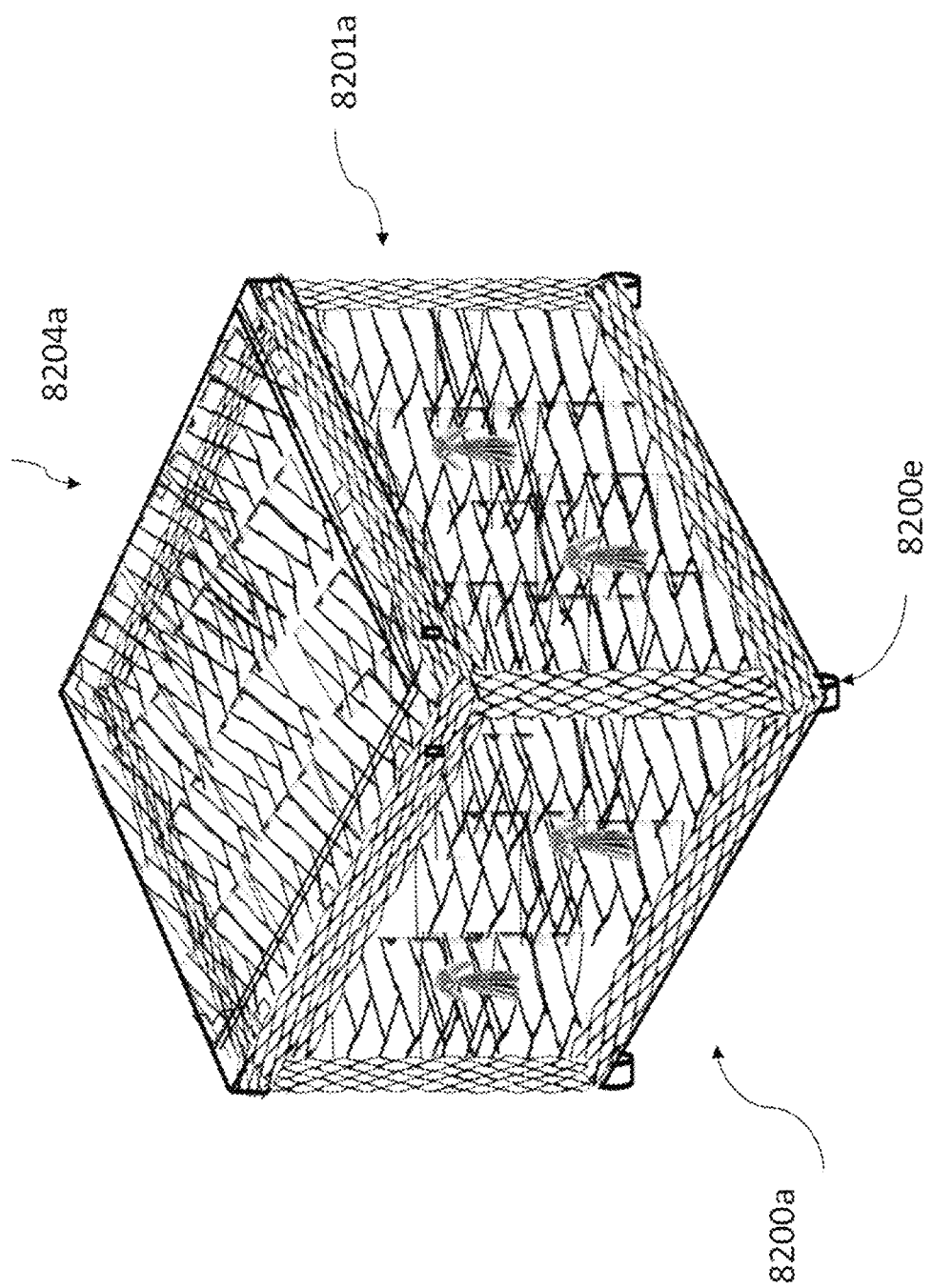
FIG. 109 is a rear perspective view of the assembled first floor hut, in accordance with some embodiments.

FIG. 109 is a rear perspective view of the assembled first floor hut 8201*a*, in accordance with some embodiments.

FIG. 110 is a front perspective view of an assembled second floor hut 8202*a* of the simulated Ghana Christmas Hut 8200, in accordance with some embodiments.

Figure 111:
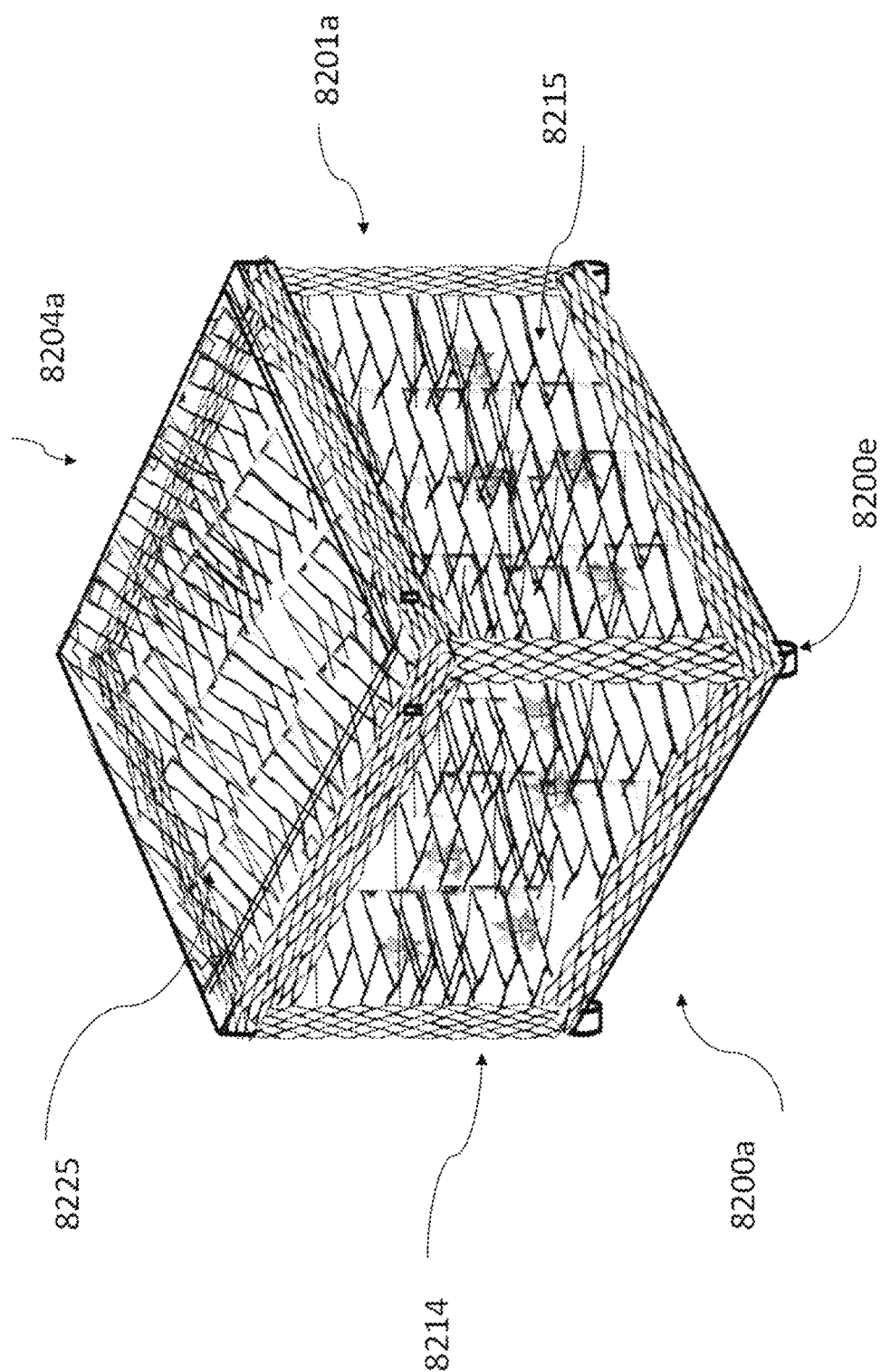
FIG. 111 is a rear perspective view of the assembled second floor hut, in accordance with some embodiments.

FIG. 111 is a rear perspective view of the assembled second floor hut 8202*a*, in accordance with some embodiments.

Figure 112:
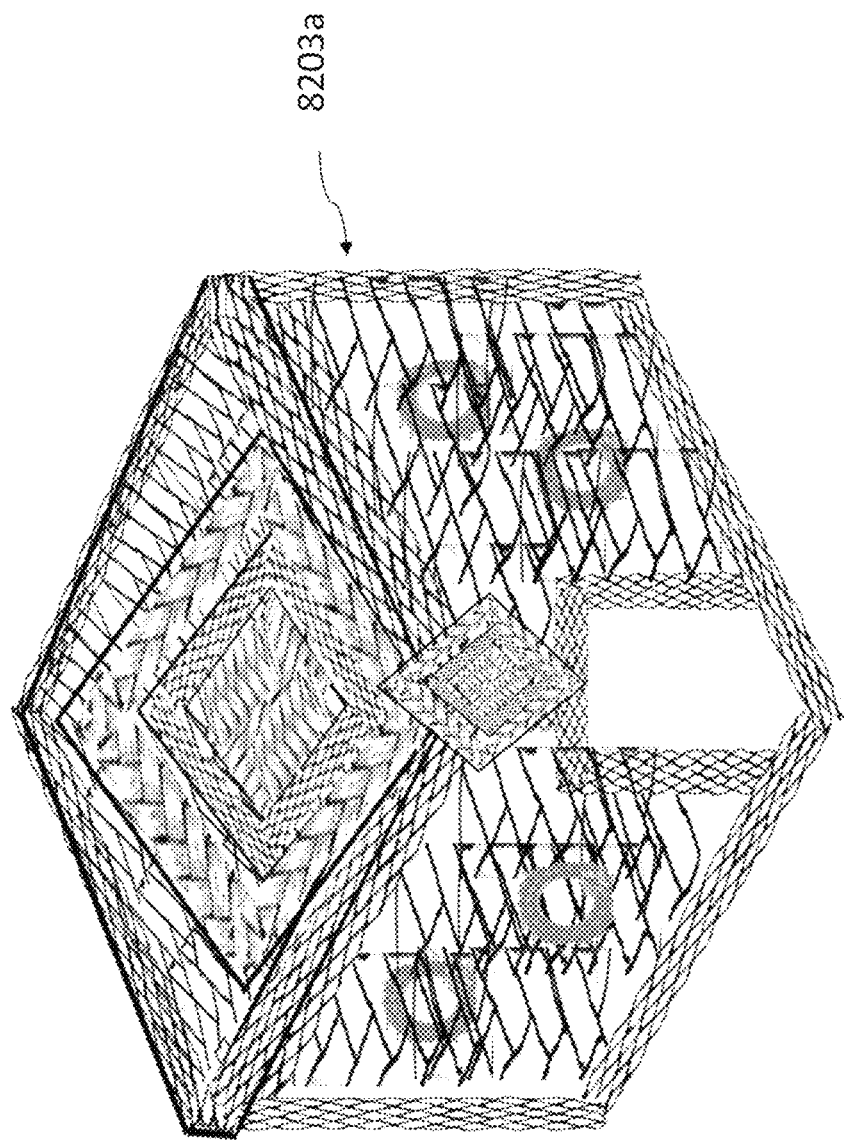
FIG. 112 is a front perspective view of an assembled third floor hut of the simulated Ghana Christmas Hut, in accordance with some embodiments.

FIG. 112 is a front perspective view of an assembled third floor hut 8203*a* of the simulated Ghana Christmas Hut 8200, in accordance with some embodiments.

Figure 113:
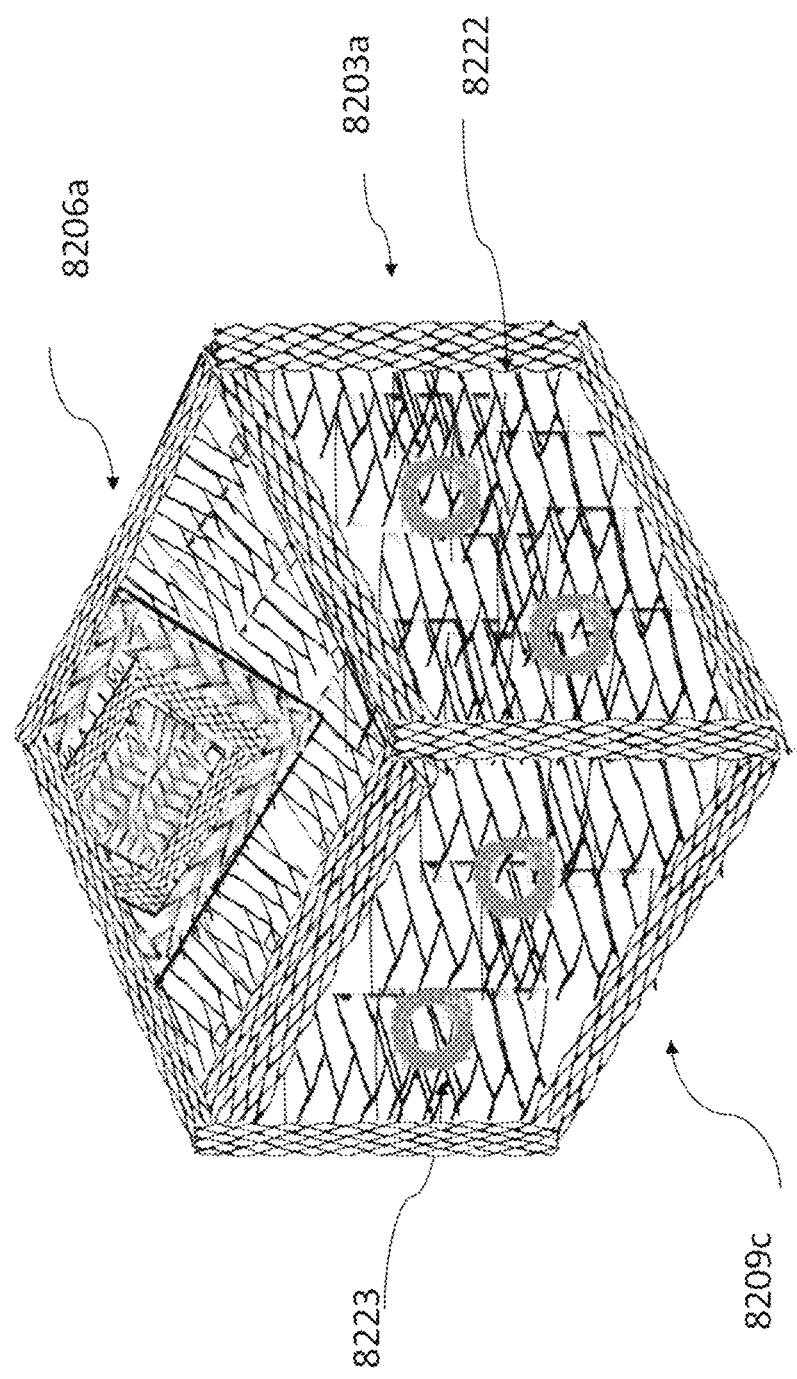
FIG. 113 is a rear perspective view of the assembled third floor hut, in accordance with some embodiments.

FIG. 113 is a rear perspective view of the assembled third floor hut 8203*a*, in accordance with some embodiments.

Figure 114:
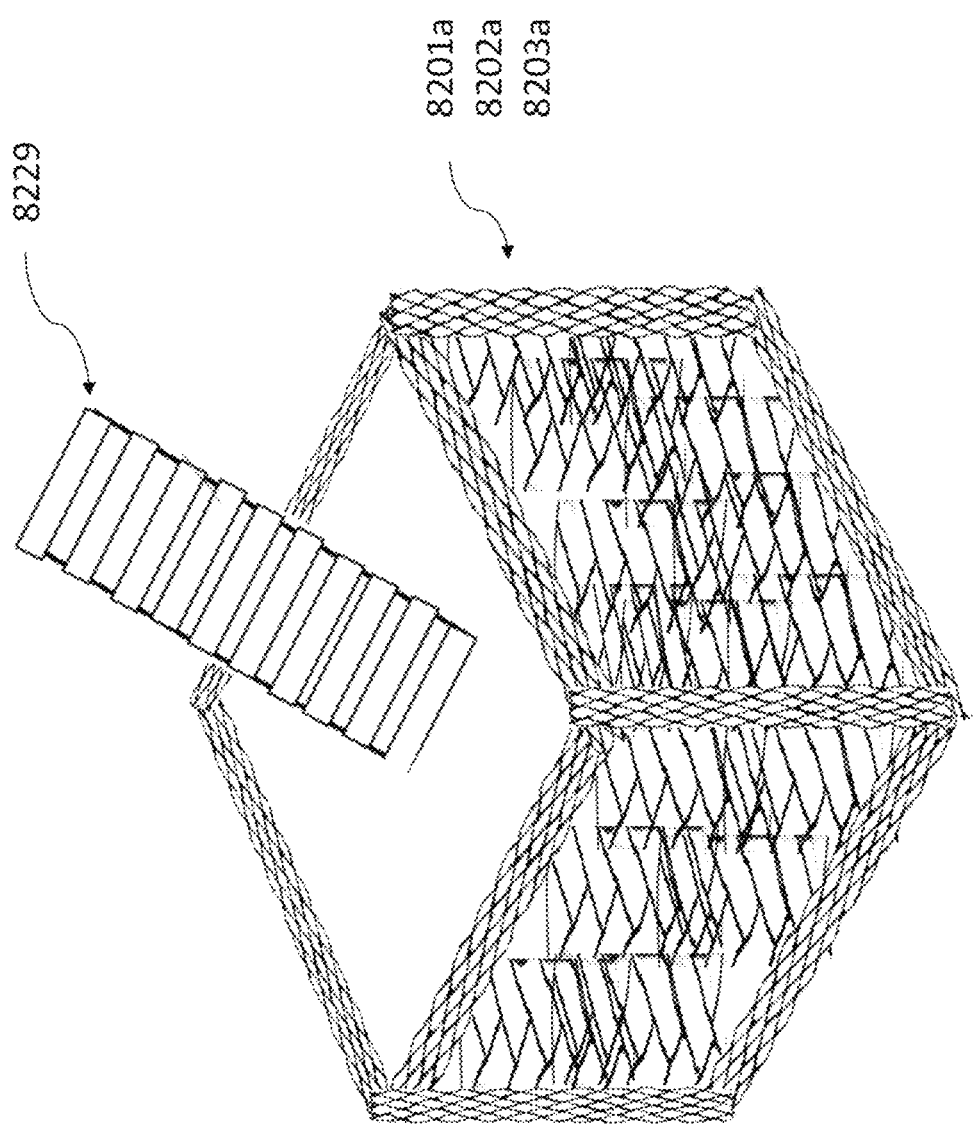
FIG. 114 is an enlarged exploded fragmented perspective of staircase placement, in accordance with some embodiments.

FIG. 114 is an enlarged exploded fragmented perspective of staircase placement, in accordance with some embodiments.

Figure 115:
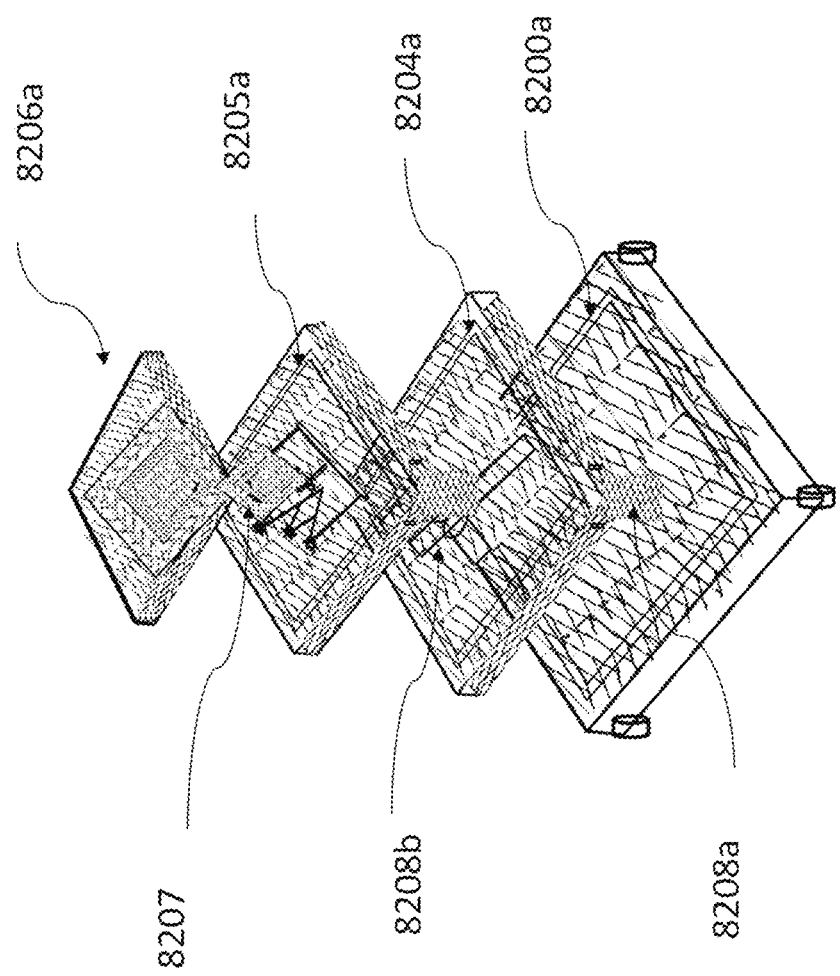
FIG. 115 is an enlarged exploded perspective view of the support base and roofs, in accordance with some embodiments.

FIG. 115 is an enlarged exploded perspective view of the support base 8200*a* and roofs 8206*a*, 8205*a*, and 8204*a*, in accordance with some embodiments.

Figure 116:
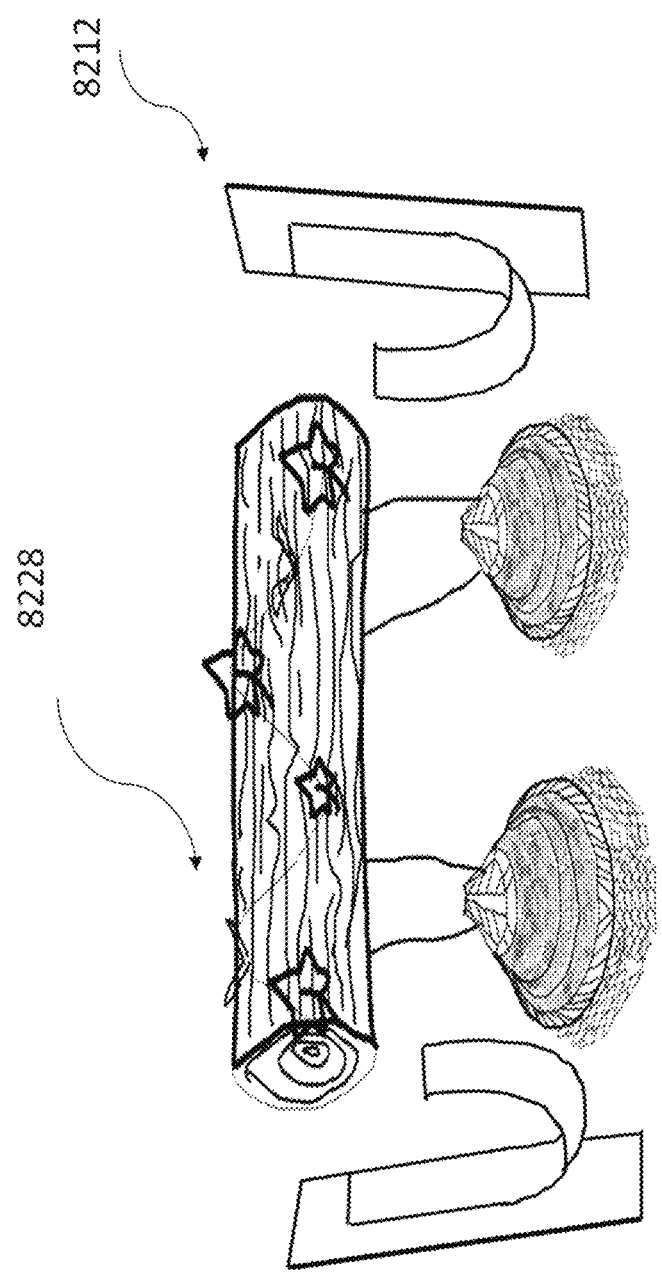
FIG. 116 is an enlarged exploded perspective view of a Heche gift log assembly of the simulated Ghana Christmas Hut, in accordance with some embodiments.

FIG. 116 is an enlarged exploded perspective view of a Heche gift log assembly of the simulated Ghana Christmas Hut 8200, in accordance with some embodiments.

Figure 117:
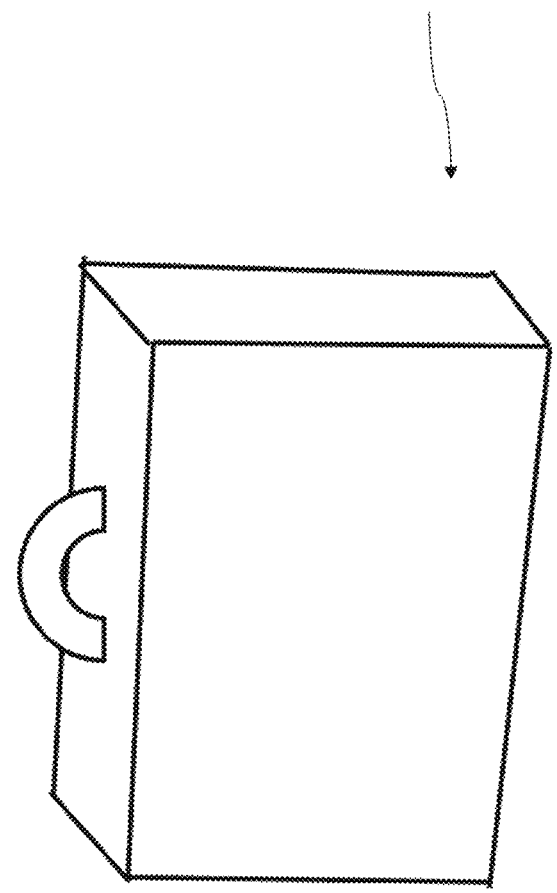
FIG. 117 is a perspective view of a package for components of the simulated Ghana Christmas Hut, in accordance with some embodiments.

FIG. 117 is a perspective view of a package 8232 for components of the simulated Ghana Christmas Hut 8200, in accordance with some embodiments.

With reference to FIGS. 82-117, 8200*a* refer to the support base. Further, 8200*b* may refer to a bed of the support base. Further, 8200*c* may refer to ultra-stacking ledges on the bed of the support base. Further, 8200*d* may refer to corner snaps on the support base. Further, 8200*e* may refer to wheels on a support frame. Further, 8200*f* may refer to brake on the support base. Further, 8201*a* may refer to the first-floor collapsible hut box. Further, 8201*b* may refer to folded out of the first-floor hut box. Further, 8201*c* may refer to the flipside of first floor mat-wall. Further, 8202*a* may refer to second-floor collapsible hut box. Further, 8202*b* may refer to folded out second-floor hut box. Further, 8202*c* may refer to the flip side of second floor hut box. Further, 8203*a* may refer to third-floor collapsible hut box. Further, 8203*b* may refer to folded out third-floor hut box. Further, 8203*c* may refer to the flipside of third floor mat-wall. Further, 8204*a* may refer to first floor roof. Further, 8204*c* may refer to ultra-stacking ledge on first-floor mat-roof. Further, 8204*d* may refer to corner snaps on first-floor roof. Further, 8204*e* may refer to perimeter snaps on first-floor roof. Further, 8204*f* may refer to corner snaps on the flipside of first-floor roof. Further, 8205*a* may refer to second-floor woven mat-roof. Further, 8205*b* may refer to the flipside of the second-floor roof. Further, 8205*c* may refer to ultra-stacking ledge on second-floor roof. Further, 8205*d* may refer to corner snaps on second-floor roof. Further, 8205*e* may refer to perimeter snaps on second-floor roof. Further, 8205*f* may refer to corner snaps on the flipside of second-floor roof. Further, 8206*a* may refer to third-floor mat-roof. Further, 8206*b* may refer to the flipside of the third-floor folded hut box. Further, 8206*c* may refer to ultra-stacking ledge on third-floor mat-roof. Further, 8206*d* refers to corner snaps on third-floor mat-roof. Further, 8206*f* refers to corner snaps on the flipside of third-floor mat-roof. Further, 8207 refers to the diamond-shaped fascia for the third floor. Further, 8208*a* refers to a rectangular fascia for the first-floor roof. Further, 8208*b* refers to a rectangular fascia for the second-floor roof. Further, 8209*a* refers to a skirting of the base of the structure perimeter. Further, 8209*b* refers to a skirting of a first-floor bottom perimeter. Further, 8209*c* refers to a skirting of third-floor bottom perimeter. Further, 8210 refers to a star for third roof. Further, 8211*a* refers to a doorway of a first story. Further, 8211*b* refers to a doorway of a second story. Further, 8211*c* refers to a doorway of the third story. Further, 8212 refers to the osornor lamp. Further, 8216 refers to Flaming Hamarttan angels. Further, 8227 refers to a Hechebi Christmas figurine. Further, 8228 refers to the Heche gift log decoration for the Christmas figurine and entrance. Further, 8229 (8229*a*, 8229*b*, and 8229*c*) refer to staircases for first, second, and third stories. Further, 8230 (8230*a*, 8230*b*, and 8230*c*) refer to corner posts for all three stories. Further, 8231 refers to the hook for the Heche gift log. Further, 8232 refers to the package for the simulated Ghana Christmas Hut 8200. Further, 8233 refers to a flat surface According to some aspects, a simulated Ghana Christmas Hut scene display kit is disclosed. Further, the simulated Ghana Christmas Hut scene display kit may include a support base structure with foldable wheels and brakes placed on a flat surface, three convertible walls of simulated freshly woven coconut fronds and/or palm branches of variable sizes assembled into diamond-shaped huts on said support base structure, three diamond-shaped convertible roof components of simulated freshly woven coconut fronds and/or palm branches of variable sizes assembled and secured on said convertible diamond-shaped huts, two rectangular fascia secured to the front of said convertible diamond-shaped roofs of the bottom and middle huts, a diamond-shaped fascia secured to the front of said convertible diamond-shaped roof of third floor, skirting of simulated freshly woven coconut fronds and palm branches for bases of said three diamond-shaped convertible huts, three Jacob's ladders, one each placed inside said three diamond-shaped convertible huts, two Heche gift log secured to entrances of said diamond-shaped convertible huts of bottom and middle floors, a Hechebi Christmas figurine positioned within the entrance of said diamond-shaped convertible hut of bottom floor, a 3D simulated palm-woven and star installed on the top roof said three diamond-shaped convertible hut, and four simulated osornor lamps installed on the top roof said three diamond-shaped convertibles hut.

According to further aspects, the support base structure may include a solid diamond-shaped box frame, four wheels with brakes under said diamond-shaped box frame, wheel slots under said diamond-shaped box frame for wheels to be folded into when not in use, ultra-stacking ledges along the perimeter of a bed of said diamond-shaped box frame, and corner snaps for posts on bed of said diamond-shaped box frame.

According to further aspects, the walls further comprise a bottom hut, a middle hut, and a top hut.

According to further aspects, the bottom hut may include a large-size convertible wall of simulated freshly woven coconut fronds and/or palm branches which upon assembly is secured to said support base structure, a large-size convertible wall of simulated freshly woven coconut fronds and/or palm branches which upon assembly has an entrance on said support base structure, four patterned woven scenes of nativity scenes on large-size convertible mat wall which upon assembly each wall features one on said large-size convertible hut, three long narrow pockets along the width of large-size convertible wall which upon assembly aligns to three corners through which posts are inserted on said large-size convertible hut, a large-size diamond-shaped convertible roof of simulated freshly woven coconut fronds and/or palm branches secured on top of said large-size convertible hut, one large-size rectangular roof molding secured to the front of large-size diamond-shaped convertible roof of said large-size convertible hut, and a large-size skirting of simulated freshly woven coconut fronds and/or palm branches wrapped around base of said large-size convertible hut.

According to further aspects, the middle hut may include a medium-size convertible mat wall of simulated freshly woven coconut fronds and/or palm branches which upon assembly is secured to said large-size diamond-shaped convertible roof of said large-size convertible hut, a medium-size convertible wall of simulated freshly woven coconut fronds and/or palm branches which upon assembly has an entrance on said large-size diamond-shaped convertible roof of said large-size convertible hut, four woven scenes of church scenes on said medium-size convertible mat wall which upon assembly each wall features one on said medium-size convertible hut, three long narrow pockets along width of medium-size convertible mat wall which upon assembly aligns to three corners through which posts are inserted on said medium-size convertible hut, a medium-size diamond-shaped convertible roof of simulated freshly woven coconut fronds and/or palm branches secured on top of said medium-size convertible hut, one medium rectangular roof molding secured to the front medium-size diamond-shaped convertible roof of said medium-size convertible hut, and a large-size skirting of simulated freshly woven coconut fronds and/or palm branches wrapped around base of said medium-size convertible hut.

According to further aspects, the top hut may include a small-size convertible wall of simulated freshly woven coconut fronds and palm branches which upon assembly is secured to said medium-size diamond-shaped convertible roof of said medium-size convertible hut, a small-size convertible wall of simulated freshly woven coconut fronds and palm branches which upon assembly has an entrance on said medium-size diamond-shaped convertible roof of said medium-size convertible hut, four incorporated woven scenes of New Jerusalem scenes on said small-size convertible mat wall which upon assembly each wall features one on said small-size convertible hut, three long narrow pockets along width of small-size convertible mat-wall which upon assembly aligns to three corners through which posts are inserted on said small-size convertible hut, a small-size diamond-shaped convertible roof of simulated freshly woven coconut fronds and/or palm branches secured on top of said small-size convertible hut, one diamond-shaped roof molding secured to the front of the small-size diamond-shaped convertible roof of said small-size convertible hut, and a small-size skirting of simulated freshly woven coconut fronds and/or palm branches wrapped around base of said small-size convertible hut.

According to further aspects, roof components may include a Bottom hut roof, a Middle hut roof, and a Top hut roof.

According to further aspects, the bottom hut roof may include a large diamond-shaped box frame of convertible roof of simulated freshly woven coconut fronds and/or palm branches, ultra-stacking ledges along the perimeter of large diamond-shaped box frame of convertible roof on which to secure middle hut, one woven scene of the Cross on said large diamond-shaped box frame of convertible roof, three corner snaps on said large diamond-shaped box frame of convertible roof, and perimeter snaps on said large diamond-shaped box frame of convertible art roof According to further aspects, the middle hut roof may include a medium-size diamond-shaped box frame of convertible roof of simulated freshly woven coconut fronds and/or palm branches, ultra-stacking ledges along perimeter of medium-size diamond-shaped box frame of convertible roof on which to secure top hut, woven scene of the Crown on said medium-size diamond-shaped box frame of convertible roof, three corner snaps on said medium-size diamond-shaped box frame of convertible roof, perimeter snaps on said medium-size diamond-shaped box frame of convertible roof.

According to further aspects, the top roof may include a small-size diamond-shaped box frame of convertible roof of simulated freshly woven coconut fronds and/or palm branches, ultra-stacking ledges along perimeter of small-size diamond-shaped box frame of convertible roof on which to secure top hut, one woven scene of a diamond on said small-size diamond-shaped box frame of convertible roof, three corner snaps on said small-size diamond-shaped box frame of convertible roof, and perimeter snaps on said small-size diamond-shaped box frame of convertible art roof According to further aspects, the rectangular and diamond-shaped fascia are comprised of simulated freshly woven coconut fronds and/or palm branches with fasteners According to further aspects, a Jacob's ladder is comprised of a material, wherein the material is selected from a group consisting of bamboo, wood, cork, fabric, plastic, metal, edible material and recipes, and a combination thereof, or any suitable material available now or in the future.

According to further aspects, the skirting is comprised of soft simulated coconut woven fronds and/or palm branches with fasteners which are members of loop-and-hook fasteners.

According to further aspects, the Heche gift log is comprised of a material, wherein the material is selected from a group consisting of bamboo, wood, cork, fabric, plastic, metal, edible material, and recipes, and a combination thereof, or any suitable material available now or in the future.

According to further aspects, the Hechebi Christmas is a figurine of youthful Jesus accessorized in akwajan, a five-piece West-African outfit of white shirt, gold toga, white adasan, (outsized long shorts), white Afro Moses Sandals, along with conical head dressing of appropriate fabric all in white and gold, decorated with a simulated shoulder pole on which hang two bags of presents, one in white color and the other in gold.

According to further aspects, the material is selected from a group consisting of bamboo, wood, cork, fabric, plastic, metal, edible material, and recipes, and a combination thereof, or any suitable material available now or in the future.

According to further aspects, the material for making them is selected from a group consisting of bamboo, wood, cork, fabric, plastic, metal, edible material and recipes, and a combination thereof, or any suitable material available now or in the future.

According to further aspects, the weaving techniques include every kind used for weaving coconut fronds and/or other palms now and in the future.

According to further aspects, the mechanism for assembling is selected from manual and automated systems now available and in the future According to further aspects, the material is selected from simulated materials of bamboo, wood, cork, fabric, plastic, metals, edible material and recipes, and a combination thereof, or any suitable material available now or in the future.

According to further aspects, the weaving techniques include every kind used for weaving coconut fronds and other palms now and in the future.

According to further aspects, the convertible huts, mat-roofs, and support base are of polygonal shapes.

According to further aspects, the figurine is selected from a group consisting of talking figurines, robotic figurines, and movable figurines.

According to some aspects, a simulated Ghana Christmas Hut kit display is disclosed. Further, the simulated Ghana Christmas Hut kit display may include a support base structure with foldable wheels and brakes placed on a flat surface, three collapsible and stackable diamond-shaped boxes with matching roof components of simulated freshly woven coconut frond sleeves of variable sizes assembled and placed on said support base structure, matching skirting of simulated woven coconut fronds for bases of said three diamond-shaped boxes of said hut structure, twelve figurines of flaming Harmattan Christmas angels secured on right and left sides of assembled bottom and middle roofs of said hut structure, four miniature LED light Osonor Christmas lamps secured to the top roof of said hut structure, two miniature African drums secured to the bottom door of said hut structure, two Jacob's ladders, one each placed inside bottom and middle boxes of said hut structure, a Lantikila Christmas garland, a simulated wild Maracuja LED light string Christmas wreath for decoration along perimeters of huts, a Hechebi Christmas figurine positioned within the entrance of bottom hut of said hut structure, and a simulated lit-able Christmas palm fruit bunch ornament on each side of assembled hut.

According to further aspects, the support base structure may include a Solid diamond-shaped box frame, four wheels with brakes under said box frame, wheel slots under said box frame for wheels to be folded into when not in use, and diamond-shaped ultra-stacking ledges on bed of said box frame.

According to further aspects, the collapsible, foldable and stackable diamond-shaped boxes further comprise a Bottom hut, a Middle hut, and a Top hut.

According to further aspects, a bottom hut may include large-size diamond-shaped made of simulated woven coconut fronds is collapsible, foldable, and stackable box with uniformly spaced weaving through which may be supported the desired type of ornaments such as those indicated, which upon opening up is secured to said support base structure, an open entrance/doorway in proportion to said collapsible box, ultra-stacking ledges along the bottom perimeter of the collapsible box to be aligned and stacked to those of said support base structure, a large-size roof panel of simulated woven coconut fronds to be secured on top of the large-size collapsible box, and a large-size skirting of simulated woven coconut fronds wrapped around the base of the large-size collapsible box.

According to further aspects, the middle hut may include a medium-size diamond-shaped hut made of simulated woven coconut fronds is collapsible, foldable and stackable box with uniformly spaced weaving through which may be supported the desired type of ornaments such as those indicated, an open entrance/doorway in proportion to said collapsible box, ultra-stacking ledges along the bottom perimeter of the collapsible box to be aligned and stacked to those on the roof of the bottom hut, a medium-size roof panel of simulated woven coconut fronds to be secured on top of the medium-size collapsible box, and a medium-size skirting of simulated woven coconut fronds wrapped around the base of the medium-size collapsible box.

According to further aspects, the top hut may include a small-size diamond-shaped made of simulated woven coconut fronds collapsible, foldable, and stackable box with uniformly spaced weaving through which may be supported the desired type of ornaments such as those indicated, an open entrance/doorway in proportion to said collapsible box, ultra-stacking ledges along the bottom perimeter of the collapsible box to be aligned and stacked to those on the roof of the middle hut, a small-size roof panel made of simulated woven coconut fronds to be secured on top of the small-size collapsible box, and a small-size skirting of simulated woven coconut fronds wrapped around the base of the small-size collapsible box.

According to further aspects, the roof components may include a Bottom hut roof, a Middle hut roof, and a Top hut roof.

According to further aspects, the bottom hut roof may include a large diamond-shaped box frame made of simulated woven coconut fronds enclosed with fascia board of uniformly spaced weaving through which may be supported the desired type of ornament such as those indicated, a diamond-shaped ultra-stacking ledge on said box frame on which to stack middle hut, six base plates on said box frame on which to secure said flaming Harmattan Christmas angels, and a hatch hole in the middle of said box frame where said Jacob's ladder extends up from said hut floor.

According to further aspects, the middle hut roof may include a medium-size diamond-shaped box frame of simulated woven coconut fronds enclosed with fascia board of uniformly spaced weaving through which may be supported the desired type of ornament such as those indicated, a diamond-shaped ultra-stacking ledge on said box frame on which to stack top hut, six base plates on said box frame on which to secure flaming Harmattan Christmas angels, and a hatch hole in the middle of said box frame where said Jacob's ladder extends up from the said hut floor.

According to further aspects, the top roof may include a small diamond-shaped box frame of simulated woven coconut fronds enclosed with fascia board of uniformly spaced weaving through which may be supported the desired type of ornament such as those indicated, ultra-stacking ledges on said small diamond-shaped box frame of simulated woven coconut fronds on which to stack a foldable diamond-shaped fascia board, a smaller foldable diamond-shaped fascia board where half of the panel overlay said small diamond-shaped box frame and the other half hang above entrance door jamb of the top hut, and four base plates upon said small box frame on which to secure said miniature Osonor Christmas lamps.

According to further aspects, the skirting is comprised of soft simulated coconut woven fronds with fasteners which are members of loop-and-hook fasteners.

According to further aspects, the flaming Harmattan Christmas angels are Africanized figurines accessorized with wings of flame and shrouded in Harmattan clouds.

According to further aspects, the miniature Osonor Christmas lamps are simulated cans with lit-able wicks.

According to further aspects, the flaming Harmattan Christmas angels use solar and battery powered LED lights and future efficient options.

According to further aspects, the Osonor Christmas lamps use solar and battery powered LED lights and future efficient options.

According to further aspects, the Hechebi Christmas is a figurine of youthful Jesus accessorized in an African smock of white and varying colors of gold, head dressing of woven material decorated with feathers with a simulated shoulder pole on which hang two bags of presents, one in white color and the other in gold color.

According to further aspects, the twelve figurines of flaming Harmattan Christmas angels, Hechebi Christmas, four miniature Osonor Christmas lamps, two Jacob's ladders, and two miniature African drums are selected from a group consisting of talking figurines and accessories, robotic figurines and accessories, and movable figurines and accessories.

According to further aspects, the simulated lit-able Christmas palm fruit bunch ornament assumes both its natural colors as well as other colors.

According to further aspects, the material is selected from a group consisting of bamboo, wood, cork, fabric, plastic, metal, edible material, and recipes, and a combination thereof, or any suitable material available now or in the future.

According to further aspects, the material for making stackable collapsible boxes is selected from a group consisting of bamboo, wood, cork, fabric, plastic, metal, edible material, and recipes, and a combination thereof, or any suitable material available now or in the future.

According to further aspects, the weaving techniques of simulated materials include any pattern used for weaving coconut fronds and other palms now and in the future.

According to further aspects, the mechanism for collapsing boxes is selected from folding and modular systems now available and in the future.

According to further aspects, the mechanism for stacking collapsible boxes is selected from stacking systems now available and in the future.

According to further aspects, the material is selected from simulated materials of bamboo, wood, cork, fabric, plastic, metals, edible material, and recipes, and a combination thereof, or any suitable material available now or in the future.

According to further aspects, the weaving techniques of simulated materials include any pattern used in weaving coconut fronds and other palms now and in the future.

According to further aspects, the twelve figurines of flaming Harmattan angels, Hechebi Christmas, four miniature Osonor Christmas lamps, two Jacob's ladders, and two miniature African drums are comprised of a material. Further, the material is selected from simulated materials of bamboo, wood, cork, fabric, plastic, metals, edible material and recipes, and a combination thereof, or any suitable material available now and in the future.

According to further aspects, the collapsible stackable huts, roofs, and support base are of polygonal shapes.

According to further aspects, the collapsible stackable huts, roofs, and support base are made of simulated materials that can assume both natural coconut fronds colors as well as other colors.

According to some embodiments, a simulated Ghana Christmas hut kit, is disclosed. Accordingly, the simulated Ghana Christmas hut kit may include a simulated Ghana Christmas hut, a plurality of figurines, and a plurality of decorating objects. Further, the simulated Ghana Christmas hut may include a base structure, a plurality of huts, and a plurality of skirts. Further, the simulated Ghana Christmas hut may be made of a combination of simulated weaving patterns of coconut fronds/palm branches. Further, the base structure may be configured to be disposed on at least one surface. Further, the base structure may include a bed panel parallel to the at least one surface. Further, the plurality of huts may be supported on the base structure. Further, the plurality of huts may include a bottom hut, a middle hut, and a top hut. Further, the plurality of huts may be stackable on the base structure in a vertical direction based on a hut size of the plurality of huts. Further, the plurality of huts may be configured to be transitioned between a folded state and an erected state. Further, the hut size decrease along the vertical direction from the bottom hut to the top hut. Further, each hut of the plurality of huts may include at least one side wall and a roof corresponding to the hut size of each hut. Further, the roof may be attached to the at least one side wall along at least one top edge of the at least one side wall for forming a hut interior space. Further, the at least one side wall of each hut may include at least one opening leading into the hut interior space of each hut. Further, the at least one side wall and the roof of each hut may be comprised of coconut fronds. Further, the bottom hut may be disposed on the bed panel. Further, the middle hut may be disposed on a bottom roof of the bottom hut. Further, the top hut may be disposed on a middle roof of the middle hut. Further, the plurality of skirts attached to the plurality of huts. Further, a skirt of the plurality of skirts may include an elongated panel. Further, a first end of the elongated panel may be fastened to a second end of the elongated panel for forming the skirt using at least one fastener. Further, the elongated panel may include a fixed periphery and a free periphery. Further, the fixed periphery may be configured to be attached to the at least one side wall of a hut of the plurality of huts along at least one base edge of the at least one side wall. Further, the free periphery extends away from the at least one side wall. Further, the plurality of figurines may be disposable on at least one of a first ledge formed on the bed panel based on disposing of the bottom hut on the bed panel, a second ledge formed on the bottom roof based on disposing of the middle hut on the bottom roof, and a third ledge formed on the middle roof based on disposing of the top hut on the middle roof. Further, the plurality of figurines may include a plurality of flaming Harmattan Christmas angels and a Hechebi Christmas figurine. Further, the plurality of flaming Harmattan Christmas angels may be Africanized figurines accessorized with wings of flame and shrouded in Harmattan clouds. Further, the plurality of decorating objects may be configured to be attached to at least one of the plurality of huts and the base structure for decorating the simulated Ghana Christmas hut. Further, the plurality of decorating objects may include a plurality of miniature LED light Osonor Christmas lamps, a plurality of miniature African drums, a Lantikila Christmas garland, a simulated wild Maracuja LED light string Christmas wreath, and a simulated lit-able Christmas palm fruit bunch ornament.

Although the present disclosure has been explained in relation to its preferred embodiment, it is to be understood that many other possible modifications and variations can be made without departing from the spirit and scope of the disclosure.

What is claimed is:

1. A simulated Ghana Christmas hut comprising:
a base structure configured to be disposed on at least one surface, wherein the base structure comprises a bed panel parallel to the at least one surface;
a plurality of huts supported on the base structure, wherein the plurality of huts comprises a bottom hut, a middle hut, and a top hut, wherein the plurality of huts are stackable on the base structure in a vertical direction based on a hut size of the plurality of huts, wherein the plurality of huts is configured to be transitioned between a folded state and an erected state, wherein the hut size decrease along the vertical direction from the bottom hut to the top hut, wherein each hut of the plurality of huts comprises at least one side wall and a roof corresponding to the hut size of each hut, wherein the roof is attached to the at least one side wall along at least one top edge of the at least one side wall for forming a hut interior space, wherein the at least one side wall of each hut comprises at least one opening leading into the hut interior space of each hut, wherein the at least one side wall and the roof of each hut is comprised of coconut fronds, wherein the bottom hut is disposed on the bed panel, wherein the middle hut is disposed on a bottom roof of the bottom hut, wherein the top hut is disposed on a middle roof of the middle hut.

2. The simulated Ghana Christmas hut of claim 1, wherein a side wall of the at least one side wall of a hut of the plurality of huts comprises a first side wall portion and a second side wall portion, wherein the first side wall portion is pivotally attached to the second side wall portion for pivoting in relation to the second side wall along a side wall axis, wherein the hut is configured for collapsing based on the pivoting of the first side wall portion in relation to the second side wall portion, wherein the plurality of huts transitioned from the erected state to the folded state based on the collapsing.

3. The simulated Ghana Christmas hut of claim 1, wherein the base structure comprises a plurality of wheels, wherein a wheel of the plurality of wheels is configured to be rotated around a wheel axis for propelling the simulated Ghana Christmas hut on the at least one surface.

4. The simulated Ghana Christmas hut of claim 3, wherein the base structure comprises at least one brake operationally coupled with the plurality of wheels, wherein the at least one brake is configured to be transitioned between an engaged state and a disengaged state, wherein the at least one brake allows at least one movement of the simulated Ghana Christmas hut on the at least one surface in the disengaged state, wherein the at least one brake prevents the at least one movement of the simulated Ghana Christmas hut in the engaged state.

5. The simulated Ghana Christmas hut of claim 3, wherein the wheel is configured to retractably extended from the base structure for transitioning between a retracted state and an extended state, wherein the wheel does not engage with the at least one surface in the retracted state, wherein the wheel engages with the at least one surface in the extended state, wherein the propelling of the simulated Ghana Christmas hut on the at least one surface is restricted in the disengaged state and the propelling of the simulated Ghana Christmas hut on the at least one surface is allowed in the engaged state.

6. The simulated Ghana Christmas hut of claim 1, wherein the bottom roof comprises a bottom roof opening and the middle roof comprises a middle roof opening, wherein the bottom roof opening of the bottom roof provides access to a middle hut interior space of the middle hut from a bottom hut interior space of the bottom hut, wherein the middle roof opening of the middle roof provided access to a top hut interior space of the top hut from the middle hut interior space of the middle hut.

7. The simulated Ghana Christmas hut of claim 6 further comprising at least one ladder disposed in the plurality of huts, wherein the at least one ladder allows access to the middle hut interior space of the middle hut from the bottom hut interior space of the bottom hut through the bottom roof opening of the bottom roof, wherein the at least one ladder allows access to the top hut interior space of the top hut from the middle hut interior space of the middle hut through the middle roof opening of the middle roof.

8. The simulated Ghana Christmas hut of claim 1, wherein a hut of the plurality of huts is associated with a hut shape, wherein the at least one side wall of the hut comprises a plurality of side walls, wherein the plurality of side walls of a side wall shape and the roof of a roof shape are arranged in at least one arrangement for forming the hut shape.

9. The simulated Ghana Christmas hut of claim 8, wherein the hut shape comprises at least one geometrical shape, wherein the at least one geometrical shape comprises a 3D geometrical shape.

10. The simulated Ghana Christmas hut of claim 1 further comprising a plurality of skirts attached to the plurality of huts, wherein a skirt of the plurality of skirts comprises an elongated panel, wherein a first end of the elongated panel is fastened to a second end of the elongated panel for forming the skirt using at least one fastener, wherein the elongated panel comprises a fixed periphery and a free periphery, wherein the fixed periphery is configured to be attached to the at least one side wall of a hut of the plurality of huts along at least one base edge of the at least one side wall, wherein the free periphery extends away from the at least one side wall.

11. The simulated Ghana Christmas hut of claim 10, wherein the plurality of skirts is comprised of at least one skirt material, wherein the at least one skirt material comprises the coconut fronds.

12. The simulated Ghana Christmas hut of claim 1 further comprising a plurality of figurines disposable on at least one of a first ledge formed on the bed panel based on disposing of the bottom hut on the bed panel, a second ledge formed on the bottom roof based on disposing of the middle hut on the bottom roof, and a third ledge formed on the middle roof based on disposing of the top hut on the middle roof.

13. The simulated Ghana Christmas hut of claim 1 further comprising a plurality of decorating objects configured to be attached to at least one of the plurality of huts and the base structure for decorating the simulated Ghana Christmas hut.

14. The simulated Ghana Christmas hut of claim 1, wherein the base structure is comprised of at least one material, wherein the at least one material comprises at least one of a bamboo, a wood, a cork, a fabric, a plastic, a metal, and an edible material.

15. The simulated Ghana Christmas hut of claim 1, wherein at least one the at least one side wall and the roof of each hut is further comprised of at least one material, wherein the at least one material comprises at least one of a bamboo, a wood, a cork, a fabric, a plastic, a metal, and an edible material.

16. The simulated Ghana Christmas hut of claim 1, wherein the coconut fronds are woven using at least one weaving technique for forming at least one of the at least one side wall and the roof.

17. The simulated Ghana Christmas hut of claim 1 further comprising a plurality of spines extending away from the plurality of huts, wherein the plurality of spines is configured for supporting at least one ornament on the plurality of spines.

18. The simulated Ghana Christmas hut of claim 1, wherein the at least one side wall and the roof of each hut are erectably foldable for transitioning the plurality of huts between a 2D configuration and a 3D configuration, wherein the plurality of huts in the 2D configuration is hangable on at least one hanging member.

19. A simulated Ghana Christmas hut comprising:
  a base structure configured to be disposed on at least one surface, wherein the base structure comprises a bed panel parallel to the at least one surface;
  a plurality of huts supported on the base structure, wherein the plurality of huts comprises a bottom hut, a middle hut, and a top hut, wherein the plurality of huts are stackable on the base structure in a vertical direction based on a hut size of the plurality of huts, wherein the plurality of huts is configured to be transitioned between a folded state and an erected state, wherein the hut size decrease along the vertical direction from the bottom hut to the top hut, wherein each hut of the plurality of huts comprises at least one side wall and a roof corresponding to the hut size of each hut, wherein the roof is attached to the at least one side wall along at least one top edge for forming a hut interior space, wherein the at least one side wall of each hut comprises at least one opening leading into the hut interior space of each hut, wherein the at least one side wall and the roof of each hut is comprised of coconut fronds, wherein the bottom hut is disposed on the bed panel, wherein the middle hut is disposed on a bottom roof of the bottom hut, wherein the top hut is disposed on a middle roof of the middle hut; and
  a plurality of skirts attached to the plurality of huts, wherein a skirt of the plurality of skirts comprises an elongated panel, wherein a first end of the elongated panel is fastened to a second end of the elongated panel for forming the skirt using at least one fastener, wherein the elongated panel comprises a fixed periphery and a free periphery, wherein the fixed periphery is configured to be attached to the at least one side wall of a hut of the plurality of huts along at least one base edge of the at least one side wall, wherein the free periphery extends away from the at least one side wall.

20. A simulated Ghana Christmas hut kit comprising:
  a simulated Ghana Christmas hut comprising:
    a base structure configured to be disposed on at least one surface, wherein the base structure comprises a bed panel parallel to the at least one surface;
    a plurality of huts supported on the base structure, wherein the plurality of huts comprises a bottom hut, a middle hut, and a top hut, wherein the plurality of huts are stackable on the base structure in a vertical direction based on a hut size of the plurality of huts, wherein the plurality of huts is configured to be transitioned between a folded state and an erected state, wherein the hut size decrease along the vertical direction from the bottom hut to the top hut, wherein each hut of the plurality of huts comprises at least one side wall and a roof corresponding to the hut size of each hut, wherein the roof is attached to the at least one side wall along at least one top edge for forming a hut interior space, wherein the at least one side wall of each hut comprises at least one opening leading into the hut interior space of each hut, wherein the at least one side wall and the roof of each hut is comprised of coconut fronds, wherein the bottom hut is disposed on the bed panel, wherein the middle hut is disposed on a bottom roof of the bottom hut, wherein the top hut is disposed on a middle roof of the middle hut; and
    a plurality of skirts attached to the plurality of huts, wherein a skirt of the plurality of skirts comprises an elongated panel, wherein a first end of the elongated panel is fastened to a second end of the elongated panel for forming the skirt using at least one fastener, wherein the elongated panel comprises a fixed periphery and a free periphery, wherein the fixed periphery is configured to be attached to the at least one side wall of a hut of the plurality of huts along at least one base edge of the at least one side wall, wherein the free periphery extends away from the at least one side wall;
  a plurality of figurines disposable on at least one of a first ledge formed on the bed panel based on disposing of the bottom hut on the bed panel, a second ledge formed on the bottom roof based on disposing of the middle hut on the bottom roof, and a third ledge formed on the middle roof based on disposing of the top hut on the middle roof, wherein the plurality of figurines comprises a plurality of flaming Harmattan Christmas angels and a Hechebi Christmas figurine, wherein the plurality of flaming Harmattan Christmas angels are Africanized figurines accessorized with wings of flame and shrouded in Harmattan clouds; and
  a plurality of decorating objects configured to be attached to at least one of the plurality of huts and the base structure for decorating the simulated Ghana Christmas hut, wherein the plurality of decorating objects comprises a plurality of miniature LED light Osonor Christmas lamps, a plurality of miniature African drums, a Lantikila Christmas garland, a simulated wild Maracuja LED light string Christmas wreath, and a simulated lit-able Christmas palm fruit bunch ornament.

* * * * *